United States Patent [19]
Miyamori et al.

[11] Patent Number: 5,978,937
[45] Date of Patent: Nov. 2, 1999

[54] MICROPROCESSOR AND DEBUG SYSTEM

[75] Inventors: Takashi Miyamori, Yokohama; Tatsuo Yano, Kobe, both of Japan

[73] Assignees: Kabushiki Kaisha Toshiba, Kawasaki, Japan; Hewlett-Packard Co., Palo Alto, Calif.

[21] Appl. No.: 08/580,158

[22] Filed: Dec. 28, 1995

[30] Foreign Application Priority Data

Dec. 28, 1994 [JP] Japan ................................. 6-328993

[51] Int. Cl.$^6$ ................................................. G06F 11/00
[52] U.S. Cl. ........................................ 714/45; 395/500.05
[58] Field of Search ................... 395/183.21, 183.22, 395/185.01, 183.04, 183.1, 183.11, 500.05, 500.42, 500.49; 364/550, 578; 714/2, 10, 25, 28, 29, 30, 31, 32, 43, 47, 45, 733, 742

[56] References Cited

U.S. PATENT DOCUMENTS

| | | | |
|---|---|---|---|
| 5,493,723 | 2/1996 | Beck et al. | 395/500 |
| 5,533,192 | 7/1996 | Hawley et al. | 395/183.04 |
| 5,539,901 | 7/1996 | Ramirez | 395/500 |
| 5,544,307 | 8/1996 | Maemura | 395/180 |
| 5,544,311 | 8/1996 | Harenberg et al. | 395/183.16 |
| 5,581,695 | 12/1996 | Knoke et al. | 395/183.04 |
| 5,608,867 | 3/1997 | Ishihara | 395/184.01 |
| 5,615,331 | 3/1997 | Toorians et al. | 395/182.07 |
| 5,630,052 | 5/1997 | Shah | 395/183.14 |
| 5,630,102 | 5/1997 | Johnson et al. | 395/500 |

FOREIGN PATENT DOCUMENTS

| | | |
|---|---|---|
| 0 271 910 | 6/1988 | European Pat. Off. . |
| 0 313 848 | 5/1989 | European Pat. Off. . |
| 0 453 268 | 10/1991 | European Pat. Off. . |
| 2 200 482 | 8/1988 | United Kingdom . |

OTHER PUBLICATIONS

Electronic Design, vol. 38, No. 9, May 10, 1990, pp. 29–30, Bursky, "Dedicated Emulation Logic On Chip Debugs Digital Processor's Hardware and Software".

Primary Examiner—Robert W. Beausoliel, Jr.
Assistant Examiner—Nadeem Iqbal
Attorney, Agent, or Firm—Foley & Lardner

[57] ABSTRACT

A microprocessor 10 has a processor core 20 and a debug module 30. The processor core 20 executes a user program and a monitor program for debugging a user target system 70. The debug module 30 serves as an interface with a debug tool 60, to let the processor core 20 execute the monitor program stored in the debug tool 60. The debug module 30 makes an interrupt or exception request to switch the processor core 20 from the user program to the monitor program.

22 Claims, 35 Drawing Sheets

DCR(DEBUG CONTROL REGISTER)

IBA0(INSTRUCTION BREAK ADDRESS 0) REGISTER

IBC0(INSTRUCTION BREAK CONTROL 0) REGISTER

IBS(INSTRUCTION BREAK STATUS) REGISTER

DBA0(DATA BREAK ADDRESS 0) REGISTER

DBC0(DATA BREAK CONTROL 0) REGISTER

DBS(DATA BREAK STATUS) REGISTER

PBA0(PROCESSOR BUS BREAK ADDRESS 0) REGISTER

PBD0(PROCESSOR BUS BREAK DATA 0) REGISTER

PBM0(PROCESSOR BUS MASK 0) REGISTER

PBC0(PROCESSOR BUS CONTROL 0) REGISTER

PBS(PROCESSOR BUS BREAK STATUS) REGISTER

FIG.43

| 0 0 0 0 | BCN

1111 | 0 0 0 0 0 0 0 0 | 0 | BS14 | BS13 | BS12 | BS11 | BS10 | BS9 | BS8 | BS7 | BS6 | BS5 | BS4 | BS3 | BS2 | BS1 | BS0 |

MICROPROCESSOR AND DEBUG SYSTEM

BACKGROUND OF THE INVENTION

1. Field of the Invention

The present invention relates to a microprocessor and debug system having a function of tracing a program counter and a function of externally notifying that a preset address or data has been accessed.

2. Description of the Prior Art

FIG. 1 shows a debug system called an in-circuit emulator according to a prior art.

The system includes a user target system 500 and a debugger 505 for debugging the target system 500. The target system 500 has a microprocessor 501, a memory 503, and an I/O unit 502. The debugger 505 has a debugging microprocessor 506 and a monitor program memory 507.

To debug the target system 500, the microprocessor 501 is removed or disabled, and probes of the debugger 505 are connected to the place of the microprocessor 501 so that the microprocessor 506 may operate instead of the microprocessor 501. The microprocessor 506 executes a monitor program stored in the memory 507, to control a user program stored in the memory 503.

The microprocessor 506 executes the user program, accesses data in the memory 503, and accesses the I/O unit 502. The debugger 505 has a trace memory 508, so that the microprocessor 506 may provide trace information about an internal state such as the value of a program counter that is usually not provided by the microprocessor 501 through a processor bus 504.

The prior art of FIG. 1, however, must connect the debugger 505 to all pins of the microprocessor 501 of the target system 500. The microprocessor 501 has, for example, 70 pins for 30 address signals, four byte-enable signals, a read signal, a write signal, a read acknowledge signal, a write acknowledge signal, and 32 data signals. The debugger 505 must have probes for these pins, and therefore, is expensive and unstable. The microprocessor 506 must switch buses from one to another to access the memory 503 of the target system 500 and the memory 507 of the debugger 505, and therefore, is not applicable to a high-speed microprocessor.

If the target microprocessor has peripheral elements, it may have a different pin arrangement. In this case, the debugger must have probes proper for such a pin arrangement. When connected to the target system 500, the probes of the debugger 505 may influence and destabilize signals in the target system 500.

FIG. 2 shows a debug system called a ROM monitor according to another prior art.

A user target system 510 has a serial interface 512 connected to a host computer 517. A memory 513 stores a monitor program 514. A microprocessor 511 executes the monitor program 514 to access the memory 513, an I/O unit 515, and a register 516. A software break instruction is used to execute and control a user program.

This prior art employs the user memory 513 to store the monitor program 514. If the memory system of the target system 510 is imperfect, the monitor program 514 itself will be unstable. If the capacity of the memory 513 is small, there will be no space to store the monitor program 514. Since a monitor mode is started by a user interrupt, some program may not be debugged. The serial interface 512 mounted on the target system 510 is imperative for debugging but is useless after debugging. The debugging performance of this prior art is poor because it has no hardware break point and because it is incapable of tracing a program counter.

FIG. 3 shows a debug system according to still another prior art.

A user target system 520 has a microprocessor 521, which incorporates a serial interface 526 and a sequencer 525. The serial interface 526 communicates with a debug tool 529. The debug tool 529 sends signals to the interface 526, and the sequencer 525 interprets the signals. In response to the signals, the sequencer 525 temporarily stops the execution of a user program, accesses a register 528, uses a bus controller 527 to access an I/O unit 523 and a memory 524, and controls the user program. The serial interface 526 is usually incapable of directly communicating with a host computer 530. Accordingly, the debug tool 529 converts a command from the host computer 530 into a signal understandable by the microprocessor 521, and a signal from the microprocessor 521 into a data format understandable by the host computer 530.

The microprocessor 521 incorporates the sequencer 525, which must access the microprocessor 521 as well as the debug tool 529. In this way, this prior art employs a complicated connection logic to increase a chip area. If the target system 520 is provided with an additional register, the sequencer 525 must be modified accordingly through a complicated work. This prior art is incapable of tracing a program counter.

As explained above, the prior arts are incapable of tracing a program counter, or even if they can, they must connect many signals between a debug processor and a target system through a processor bus. According to the prior art of FIG. 1, the microprocessor 506 of the debugger 505 must access the memory 503 and I/O unit 502 of the target system 500, and it is difficult to control the timing of these access operations.

The prior art of FIG. 2 stores a monitor program in the user memory 513, to reduce a user memory space. Debugging by this prior is unsure and insufficient.

The prior art of FIG. 3 incorporates the sequencer 525 in the microprocessor 521 of the target system 520, to interpret and execute signals sent from the debug tool 529. Namely, this prior art involves a complicated connection between a target system and a debug tool. If it is required to modify the microprocessor 521, the sequencer 525 must also be modified through a complicated work.

The prior arts of FIGS. 2 and 3 have no trigger function. The prior art of FIG. 1 may have the trigger function in the debugging microprocessor 506 but with additional signals for providing trigger information.

SUMMARY OF THE INVENTION

An object of the present invention is to provide a microprocessor disposed in a user target system, for achieving a debugging function with a small number of signals between the target system and a debugger.

Another object of the present invention is to provide a microprocessor disposed in a user target system, for achieving a debugging function with the microprocessor operating on the target system to easily access memories and I/O units of the target system.

Still another object of the present invention is to provide a microprocessor disposed in a user target system, for achieving a debugging function to trace a program counter with a small number of signals.

Still another object of the present invention is to provide a microprocessor disposed in a user target system, for achieving a debugging function with minimum hardware by sharing address and data comparators with a hardware break function and trigger function and by sharing output signals with program counter information and trigger information.

In order to accomplish the objects, a first aspect of the present invention provides a microprocessor having a processor core and a debug module. The processor core executes a user program as well as a monitor program for debugging a user target system. The debug module is connected to the processor core through an internal debug interface and a processor bus. The debug module has an interface that enables the processor core to execute a monitor program stored in a debug tool. The debug module also has an execution controller for making an interrupt or exception request to the processor core for switching the processor core from the user program to the monitor program.

A second aspect of the present invention provides a debug system. In the system, a debug tool stores a monitor program for debugging a user target system. The target system includes a microprocessor, a memory, and an I/O unit. The microprocessor has a processor core and a debug module. The processor core executes a user program or the monitor program. The debug module is connected to the processor core through an internal debug interface and a processor bus, and to the debug tool through an external debug interface. The interfaces of the debug module enable the processor core to execute the monitor program. The debug module also has an execution controller for making an interrupt or exception request to the processor core for switching the processor core from the user program to the monitor program. The memory is connected to the microprocessor through the processor bus and stores information necessary for the microprocessor to execute the user program. The I/O unit is connected to the microprocessor through the processor bus.

According to the first and second aspects, the microprocessor of the target system has the debugging function, to reduce the number of signals between the target system and the debug tool. The first and second aspects operate the microprocessor during debugging, to easily access the memory and I/O unit of the target system.

A third aspect of the present invention provides a microprocessor having a processor core for executing a program and a tracer for tracing a program counter. The tracer is connected to the processor core through an internal debug interface and provides a program counter signal representing the address of an instruction to be executed by the processor core. The number of signal lines for transmitting the output signal is smaller than the number of bits of the instruction address.

According to the third aspect, the microprocessor of the target system has the debugging function, to reduce the number of interface signals used for tracing the program counter.

A fourth aspect of the present invention provides a microprocessor having a processor core for executing programs, a break circuit, and a program counter tracer. The break circuit provides the processor core with a break request or a trigger request when an accessed address coincides with a set address or when an accessed address and data coincide with set address and data. The tracer provides an external status signal informing that the trigger request has been enabled.

According to the fourth aspect, the microprocessor of the target system has the debugging function, an address com-parator is shared by the hardware break function and trigger function, and the output of the tracer is used to provide trigger information, to minimize hardware.

BRIEF DESCRIPTION OF THE DRAWINGS

These and other objects, features, and advantages of the present invention will be more apparent from the following description of preferred embodiments taken in conjunction with the accompanying drawings in which:

FIG. 43 shows an expanded IBS register; and

DETAILED DESCRIPTION OF THE EMBODIMENTS

Figure 4:
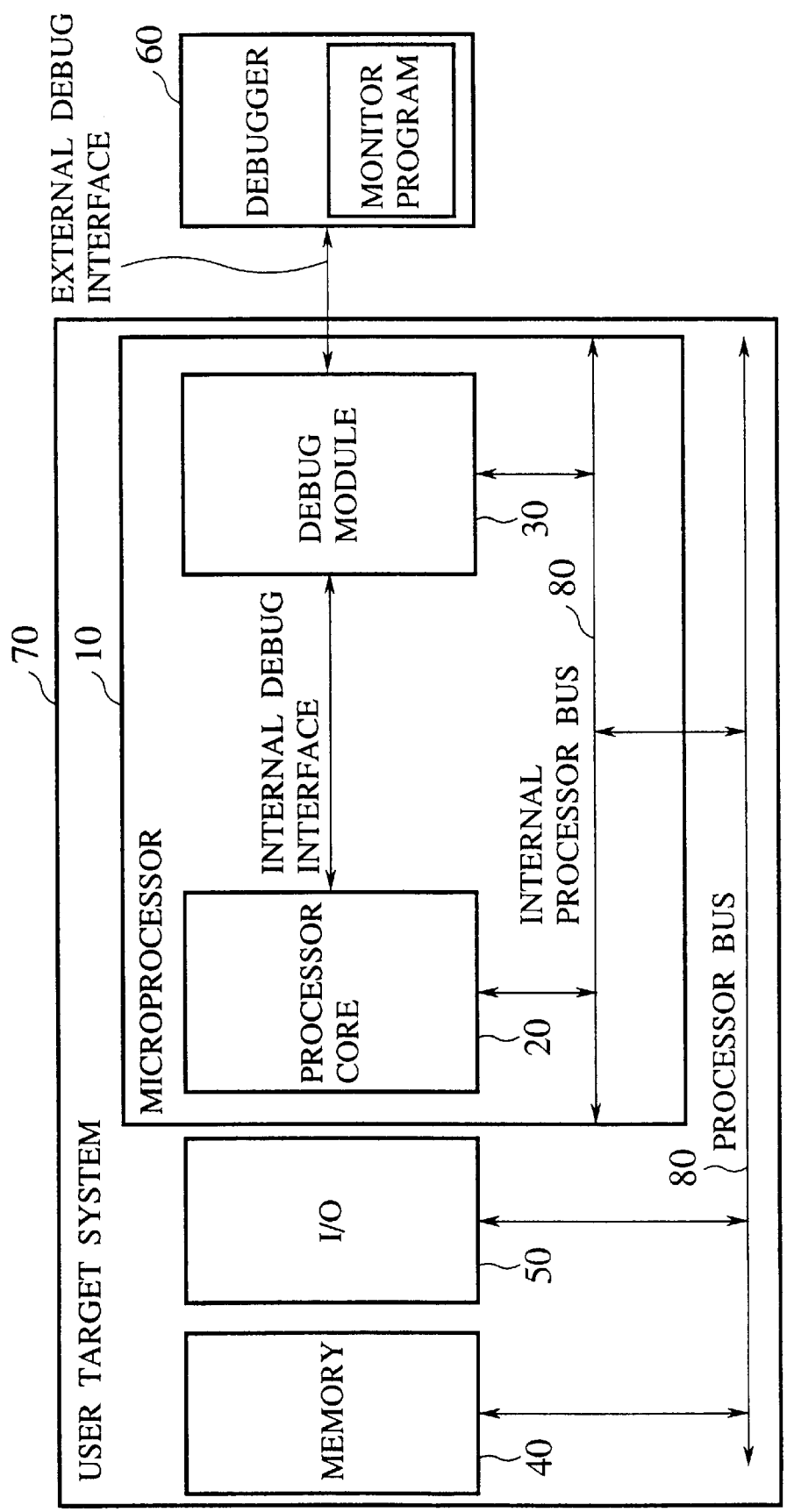
FIG. 4 shows a debug system and a microprocessor according to an embodiment of the present invention.

FIG. 4 shows a debug system and a microprocessor according to an embodiment of the present invention.

The debug system has a user target system 70 and a debugger 60.

The target system 70 has the microprocessor 10, a memory 40, and an I/O unit 50. The microprocessor 10 has a debugging function.

The microprocessor 10 has a processor core 20 and a debug module 30. The processor core 20 accesses the memory 40 and I/O unit 50 through a processor bus 80 and executes a program. The processor core 20 is connected to the debug module 30 through an internal debug interface and the processor bus 80. The debug module 30 is connected to the debugger 60 through an external debug interface.

The debug system takes a debug mode to execute a monitor program and a normal mode to execute a user program.

<Debug mode>

The processor core 20 generates a debug exception or a debug reset to start the debug mode. The processor core 20 jumps to a debug exception vector address FF20_0200 or a debug reset vector address FF20_0000 and asserts a debug mode signal DM. A memory accessed with these vector addresses is in the debugger 60. The processor core 20 executes the monitor program stored in the debugger 60 through the debug module 30. The monitor program executes and controls the user program by reading and writing memories and registers and by specifying start and end addresses of the user program. The processor core 20 may execute a return instruction to return to the normal mode and execute the user program. In this case, the processor core 20 jumps to an address specified by the return instruction and negates the debug mode signal DM.

<Normal mode>

Under the normal mode, the debug system executes the user program, and at the same time, traces a program counter. The debug system may switch from the normal mode to the debug mode by generating a debug exception or a debug reset for the processor core 20 through a hardware break, software break, or debug interrupt.

The program counter trace function, hardware break function, software break function, debug interrupt function, debug reset function, and trace trigger function that are enabled under the normal mode will be explained.

The program counter trace function traces a value in the program counter while the processor core 20 is executing the user program stored in the memory 40. While the processor core 20 is executing the user program, the program counter information is sent to the internal debug interface. The debug module 30 processes the information and sends the processed information to the debugger 60 through the external debug interface.

The hardware break function produces a debug exception when an instruction having a predetermined address is executed, or when data at a predetermined address is accessed, to let the processor core 20 execute the monitor program. More precisely, the debug module 30 compares the address of an instruction to be executed by the processor core 20 with an instruction address stored in the debug module 30, or the address of data to be accessed by the processor core 20 with a data address stored in the debug module 30, or data provided by the processor core 20 with data stored in the debug module 30, and if they coincide with each other, provides the processor core 20 with a debug exception request or a debug interrupt request.

The software break function produces a software break instruction to generate a debug exception, to let the processor core 20 execute the monitor program.

The debug interrupt function asserts a debug interrupt signal to produce a debug exception, to let the processor core 20 execute the monitor program.

The debug reset function asserts a debug reset signal to cause a debug reset, to initialize the internal states of the processor core 20 and debug module 30. Then, the processor core 20 is put in the debug mode to start the debug program from the debug reset vector address FF20_0000.

The trace trigger function lets the microprocessor 10 send an external signal indicating that an instruction having a predetermined address is executed, or that data at a predetermined address is accessed. In response to the signal, the debugger 60 turns ON/OFF the program counter trace function. This function is carried out to provide the debugger 60 with trigger information after the debug module 30 compares the address of an instruction to be executed by the processor core 20 with the instruction address stored in the debug module 30, or the address of data to be accessed by the processor core 20 with the data address stored in the debug module 30, or data sent from the processor core 20 to the internal debug interface and processor bus 80 with the data stored in the debug module 30, and if they coincide with each other.

The details of the debug module 30 will be explained.

Figure 5:
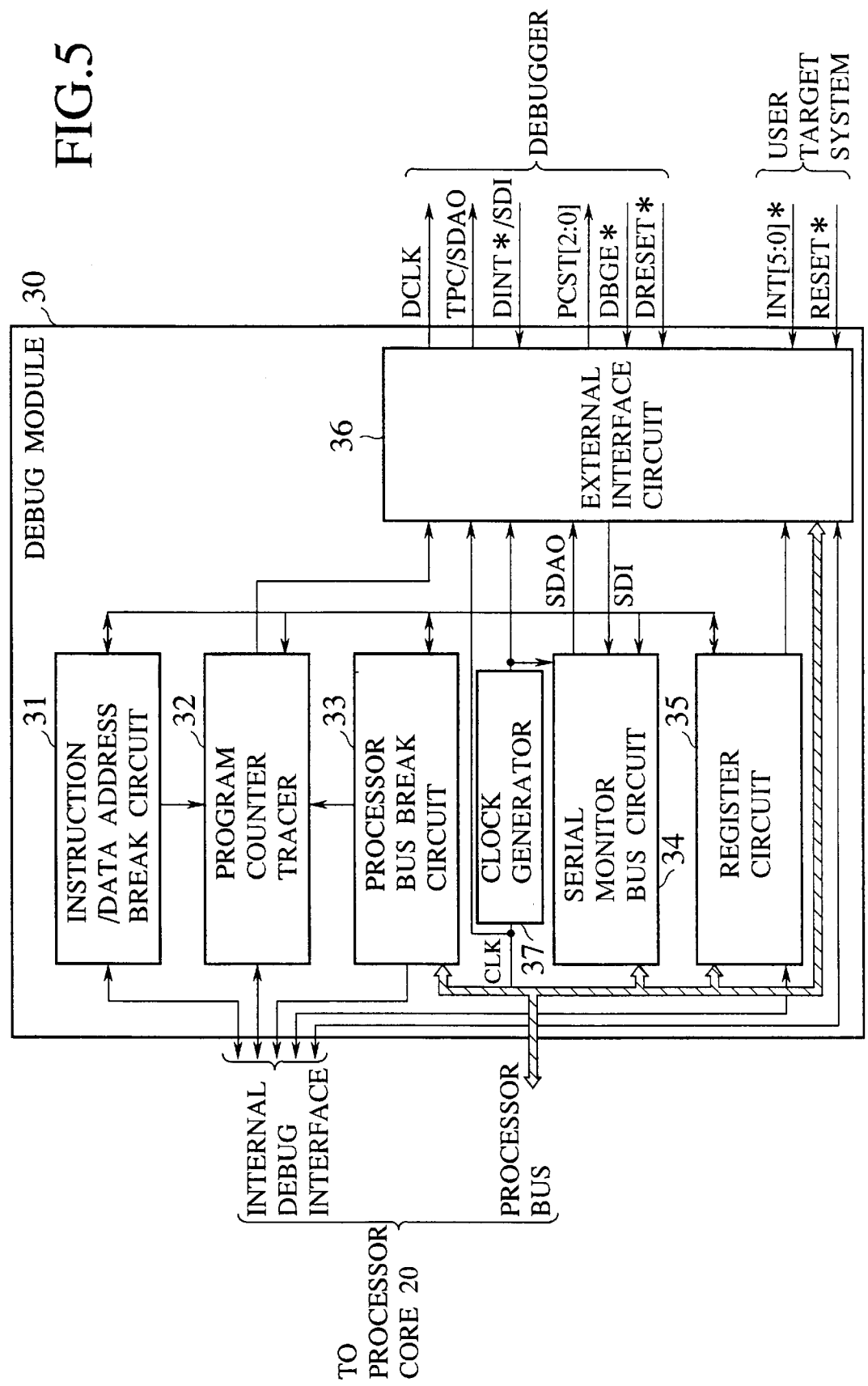
FIG. 5 shows a debug module of the embodiment of FIG. 4.

FIG. 5 shows internal blocks of the debug module 30.

The debug module 30 has an instruction/data address break circuit 31, a program counter tracer 32, a processor bus break circuit 33, a serial monitor bus circuit 34, a register circuit 35, an external interface circuit 36, and a clock generator 37.

The instruction/data address break circuit 31 is connected to the processor core 20 through the internal debug interface. The circuit 31 compares an instruction address provided by the processor core 20 with an instruction address set in the register circuit 35, and if they coincide with each other, provides the processor core 20 with an instruction address break exception request. The circuit 31 also compares a data address provided by the processor core 20 with a data address set in the register circuit 35, and if they coincide with each other, provides the processor core 20 with a data address break exception request.

The program counter tracer 32 is connected to the processor core 20 through the internal debug interface, to process program counter trace information provided by the processor core 20 and provide the external interface circuit 36 with the processed information.

The processor bus break circuit 33 is connected to the processor core 20 through the processor bus 80. The circuit 33 monitors bus cycles in the processor bus 80, and when a bus cycle for the address and data set in the register circuit 35 is carried out, provides the processor core 20 with an exception request.

The serial monitor bus circuit 34 is connected to the processor core 20 through the processor bus 80 and serves as an interface when the processor core 20 executes the monitor program of the debugger 60.

The register circuit 35 includes control registers to control the functions of the debug module 30. The register circuit 35 is connected to the processor core 20 through the processor bus 80 and internal debug interface, so that the processor core 20 may read and write the contents of the control registers. The contents of the control registers are supplied to the elements of the debug module 30 and the processor core 20, to control the debug functions.

The external interface circuit 36 interfaces the program counter tracer 32 and serial monitor bus circuit 34 of the debug module 30 and the processor core 20 with the debugger 60.

The clock generator 37 divides the frequency of a clock signal CLK and provides the serial monitor bus circuit 34 with a clock signal CLK2.

<External signals>

The debug module 30 employs the following eight dedicated interface signals to communicate with the external debugger 60:

1. SDA0/TPC (output)
2. SDI/DINT* (input)
3. DCLK (output)
4. DRESET* (input)
5 to 7. PCST[2:0] (output)
8. DBGE* (input)

(1) Debug clock signal DCLK (output)

This signal is an output clock signal to the debugger 60, to control the timing of signals in a serial monitor bus and program counter trace interface. For the operation of the serial monitor bus, this signal is formed by halving the frequency of an operation clock signal of the processor core 20.

(2) Debug reset signal DRESET* (input to pull-up terminal)

This signal is a low-active signal and is asserted to initialize the debug module 30 without regard to the input signal DBGE*. A terminal for this signal is disconnected when the debugger 60 is not used.

(3) Program counter trace status signal PCST[2:0] (output)

This signal represents the following program counter tracing states and a serial monitor bus mode:

111: pipeline stall state (STL)
110: branch/jump taken state (JMP) (with-program counter output)
101: branch/jump taken state (BRT) (without program counter output)
100: exception state (EXP) (with exception vector code output)
011: sequential execution state (SEQ) (instruction execution)
010: trace trigger output state (TST) in pipeline stall
001: trace trigger output state (TSQ) in execution
000: debug mode (DBM) (0: low level, 1: high level)

(4) Debugger enable signal DBGE* (input to pull-up terminal)

This signal indicates whether or not the debugger 60 is connected. If the debugger 60 is not connected, the signal is high, and if it is connected, the signal is low.

If the signal DBGE* is high to indicate that the debugger 60 is not connected, a signal DEV of the processor core 20 is low, and a debug exception vector address is FF200200. A user reset signal RESET* initializes the functions of the debug module 30 and disables the functions of the debugger 60. At this time, the output signals SDA0/TPC, DCLK, and PCST[2:0] become high.

If the signal DBGE* is low to indicate that the debugger 60 is connected, the signal DEV is high, and a debug exception vector address is FF20_0200 (in a monitor area). The user reset signal RESET* does not initialize the debug module 30.

(5) Serial data and address output/target program counter signal SDA0/TPC (output)

This signal serves as a serial data and address output signal SDA0 when the signal PCST[2:0] indicates the debug mode (DBM), and as a target program counter signal TPC when the signal PCST[2:0] does not indicate the debug mode.

When the signal PCST[2:0] indicates the debug mode, the signal SDA0 provides data, address, read/write, and byte-enable signals bit by bit in series. Before starting a bus cycle, a low-level start bit signal is provided for a clock period.

In a read operation, the signals are provided in order of the low-level start bit, address bits A[2] to A[19], read/write bit R/W*, and byte-enable bits BE[0]* to BE[3]*. In a write operation, the signals are provided in order of the low-level start bit, A[2] to A[19], R/W*, BE[0]* to BE[3]*, and data bits D[0] to D[31].

When the signal PCST[2:0] indicates the normal mode, the signal TPC provides the target address of a branch/jump instruction and the vector number of an exception/interrupt. The target address is sequentially provided from a bit A[2] to a bit A[31].

(6) Serial data input/debug interrupt signal SDI/DINT* (input to pull-up terminal)

This signal serves as a serial monitor bus interface signal SDI when the signal PCST[2:0] indicates the debug mode, and as a program counter trace interface signal DINT* when the signal PCST[2:0] indicates the normal mode.

The signal SDI is a data input signal. When an external start bit, which is low for a clock period, is received in a read operation, a data input operation starts from the next clock. When there is a low-level input in a write operation, the bus cycle ends.

In a read operation, bits are provided in order of a low-level start bit and data bits D[0] to D[31]. In a write operation, only a low-level end bit is received.

The signal DINT* is a debug interrupt input signal from the debugger 60. When the debugger 60 is not used, the terminal is disconnected.

Figure 6:
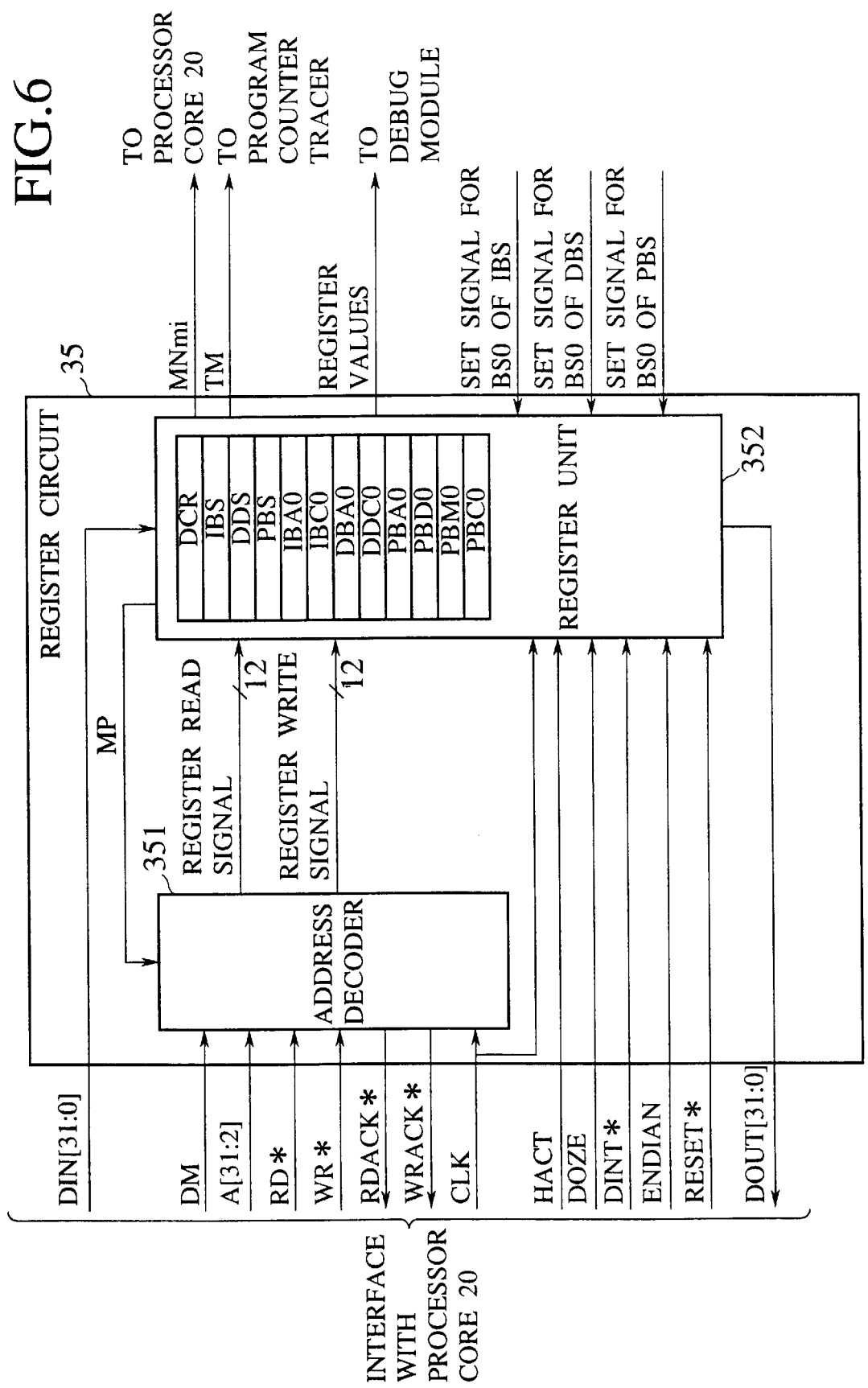
FIG. 6 shows a register circuit of the embodiment of FIG. 4.

FIG. 6 shows the details of the register circuit 35.

read acknowledge signal RDACK* to the processor core 20 in a read bus cycle and the write acknowledge signal WRACK* to the processor core 20 in a write bus cycle. As a result, a value to be read is undefined, and write data is ignored.

Even under the debug mode, the registers of the register unit 352 except the register DCR are inaccessible if a memory protection bit MP of the register DCR is set. In this case, the address decoder 351 only asserts the read acknowledge signal RDACK* in a read bus cycle and the write acknowledge signal WRACK* in a write bus cycle. As a result, a value to be read is undefined, and write data is ignored.

Table 1 shows the operation of the address decoder 351.

TABLE 1

| Accessed register | Address A[31:2] | Read RD* | Write WR* | DM | MP | Read ack. RDACK* | Write ack. WRACK* | Asserted signal |
|---|---|---|---|---|---|---|---|---|
| DCR | FF300000 | Low | High | High | x | Low | High | DCR Read |
|  |  | High | Low |  |  | High | Low | DCR Write |
| IBS | FF300004 | Low | High | High | 0 | Low | High | IBS Read |
|  |  | High | Low |  |  | High | Low | IBS Write |
| DBS | FF300008 | Low | High | High | 0 | Low | High | DBS Read |
|  |  | High | Low |  |  | High | Low | DBS Write |
| PBS | FF30000C | Low | High | High | 0 | Low | High | PBS Read |
|  |  | High | Low |  |  | High | Low | PBS Write |
| IBA0 | FF300010 | Low | High | High | 0 | Low | High | IBA0 Read |
|  |  | High | Low |  |  | High | Low | IBA0 Write |
| IBC0 | FF300014 | Low | High | High | 0 | Low | High | IBC0 Read |
|  |  | High | Low |  |  | High | Low | IBC0 Write |
| DBA0 | FF300020 | Low | High | High | 0 | Low | High | DBA0 Read |
|  |  | High | Low |  |  | High | Low | DBA0 Write |
| DBC0 | FF300024 | Low | High | High | 0 | Low | High | DBC0 Read |
|  |  | High | Low |  |  | High | Low | DBC0 Write |
| PBA0 | FF300030 | Low | High | High | 0 | Low | High | PBA0 Read |
|  |  | High | Low |  |  | High | Low | PBA0 Write |
| PBD0 | FF300034 | Low | High | High | 0 | Low | High | PBD0 Read |
|  |  | High | Low |  |  | High | Low | PBD0 Write |
| PBM0 | FF300038 | Low | High | High | 0 | Low | High | PBM0 Read |
|  |  | High | Low |  |  | High | Low | PBM0 Write |
| PBC0 | FF30003C | Low | High | High | 0 | Low | High | PBC0 Read |
|  |  | High | Low |  |  | High | Low | PBC0 Write |
| — | FF300xxx | Low | High | Low | x | Low | High | — |
|  |  | High | Low |  |  | High | Low | — |
| — | FF300004 ~ FF300FFC | Low | High | High | 1 | Low | High | — |
|  |  | High | Low |  |  | High | Low | — |

The register circuit 35 consists of an address decoder 351 and a register unit 352.

The address decoder 351 receives, from the processor core 20 through the processor bus 80, an address input signal A[31:0], read signal RD*, write signal WR*, debug mode signal DM, and core clock signal CLK. When reading a register in the register unit 352, the address decoder 351 receives an address indicating the register, decodes the address, asserts a register read signal corresponding to the register, and asserts a read acknowledge signal RDACK* to the processor core 20.

When writing data to a register in the register unit 352 corresponding to a given address, the address decoder 351 asserts a register write signal corresponding to the register, the read acknowledge signal RDACK*, and a write acknowledge signal WRACK*.

The register unit 352 is inaccessible under the normal mode. In this case, the address decoder 351 only asserts the The register unit 352 includes a debug control register (DCR), instruction break status (IBS) register, data break status (DBS) register, processor bus break status (PBS) register, instruction break address 0 (IBA0) register, instruction break control 0 (IBC0) register, data break address 0 (DBA0) register, data break control 0 (DBC0) register, processor bus break address 0 (PBA0) register, processor bus break data 0 (PBD0) register, processor bus break data mask 0 (PBM0) register, and processor bus break control 0 (PBC0) register.

The registers are reset when the debug reset signal DRESET* is asserted, or when the user reset signal RESET* is activated with the signal DBGE* being high to indicate that the debugger 60 is disconnected.

The functions of the registers will be explained.

Figure 7:
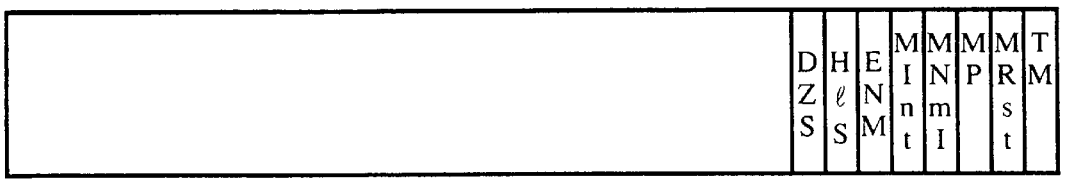
FIG. 7 shows a debug control register (DCR) of the register circuit of FIG. 6.

FIG. 7 shows the debug control register (DCR).

Trace mode bit TM (reset to 0)

This bit specifies a program counter trace operation.

0: provide program counter trace information in real time

1: provide complete program counter trace information (without assuring a real-time operation)

Figure 8:
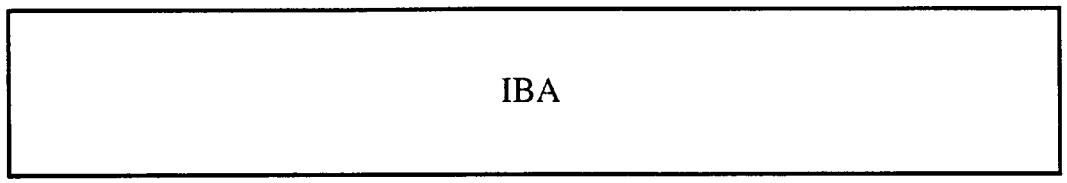
FIG. 8 shows an instruction break address 0 (IBA0) register of the register circuit of FIG. 6.
Figure 9:
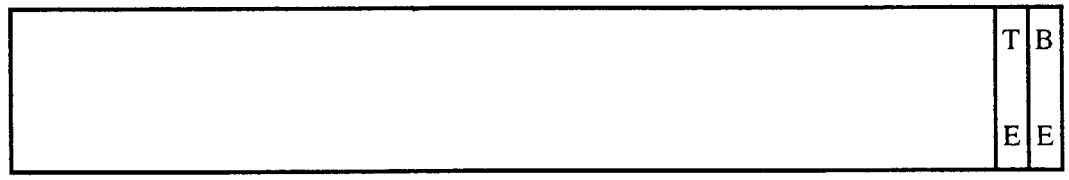
FIG. 9 shows an instruction break control 0 (IBC0) register of the register circuit of FIG. 6.
Figure 10:
FIG. 10 shows an instruction break status (IBS) register of the register circuit of FIG. 6.

The bit TM is supplied to the program counter tracer 32.
Mask user reset bit MRst (reset to 0)
This bit specifies a user reset mask.
0: mask user reset in debug exception
1: enable user reset in debug exception
The bit MRst is supplied to the external interface circuit 36.
Memory protection bit MP (reset to 1)
0: enable write operation to monitor area under the debug mode
1: protect monitor area (FF20_0000 to FF3F_FFFF) except the register DCR against write operation under the debug mode
The bit MP is supplied to the address decoder 351 and serial monitor bus circuit 34.
Mask non-mask interrupt bit MNmI (reset to 1)
0: mask NmI of the processor core 20
1: enable NmI
The bit MNmI is supplied to the processor core 20.
Mask interrupt bit MInt (reset to 1)
0: mask external interrupt (Int[5:0]*) of the processor core 20
1: enable external interrupt (Int[5:0]*)
The bit MInt is supplied to the external interface circuit 36.
Endian memory bit ENM
This bit indicates the value of an endian signal when a user reset operation is carried out. This bit is read-only, and a write operation to the bit is ignored.
0: little endian
1: big endian
The bit ENM is formed by latching the endian signal at a rise of the core clock signal with the user reset signal RESET* being low.
Halt status bit HIS
This bit indicates the value of a halt signal when the signal DINT* is active. The bit HIS is read-only, and a write operation to this bit is ignored.
0: not halt state
1: halt state
The bit HIS is formed by latching the halt signal at a rise edge of the debug interrupt signal DINT*.
Doze status bit DzS
This bit indicates the value of a doze signal when the signal DINT* is active. The bit DzS is read-only, and a write operation to this bit is ignored.
0: not doze state
1: doze state
The bit DzS is formed by latching the doze signal at a fall edge of the debug interrupt signal DINT*.
FIG. 8 shows the instruction break address 0 register IBA0.
Instruction break address field IBA
This field of the register IBA0 stores an instruction break address, which is a virtual address. The field IBA is supplied to the instruction/data address break circuit 31.
FIG. 9 shows the instruction break control 0 register IBC0.
Break enable bit BE (reset to 0)
This bit specifies the validity of the instruction address break function.
0: disable the instruction address break function
1: enable the instruction address break function
If the virtual address of an instruction to be executed coincides with an address set in the register IBA0 with the bit BE being 1, an instruction break request is made to the processor core 20, to set a bit BS0 of the register IBS. (The processor core 20 generates an instruction address break exception Just before executing the instruction whose address has made the coincidence.) The bit BE is supplied to the break circuit 31.
Trace trigger enable bit TE (reset to 0)
This bit specifies the validity of the instruction address trace trigger function.
0: disable the instruction address trace trigger function
1: enable the instruction address trace trigger function
If the virtual address of an instruction executed coincides with an address set in the register IBA0 with the bit TE being 1 to indicate the enabled instruction address trace trigger function, the signal PCST[2:0] represents the trace trigger output state TST(010) or TSQ(001), to set a bit BS0 of the register IBS. The bit TE is supplied to the break circuit 31.
FIG. 10 shows the instruction break status register IBS.
Break channel number field BCN
This field indicates the number of channels of an instruction break. This field is read-only, and a write operation to this field is ignored.

0000: none (reserved)
0001: one channel
. . .
1111: 15 channels (reserved)

Figure 11:
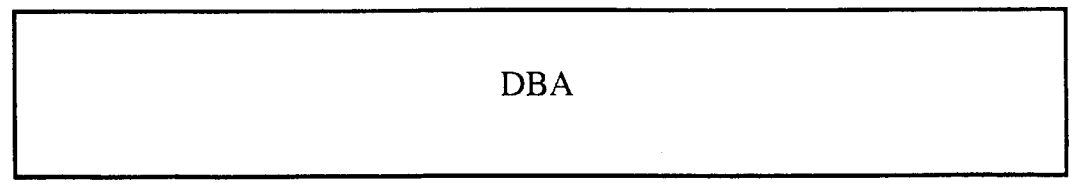
FIG. 11 shows a data break address 0 (DBA0) register of the register circuit of FIG. 6.
Figure 12:
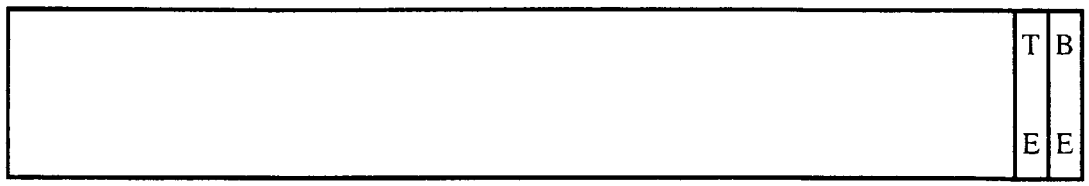
FIG. 12 shows a data break control 0 (DBC0) register of the register circuit of FIG. 6.

This is a status bit indicating the occurrence of an instruction address break or instruction address trace trigger.
0: no instruction address break nor instruction address trace trigger of channel 0
1: occurrence of instruction address break exception or instruction address trace trigger with the bit BE being 1 or TE being 1 in the register IBC0 indicating that the virtual address of an instruction coincides with a set address
The bit BS0 is cleared by writing 0 thereto and is set when a BS0 set signal from the break circuit 31 is asserted.
FIG. 11 shows the data break address 0 register DBA0.
Data break address field DBA
This field stores a data break address, which is a virtual address. This field is supplied to the break circuit 31.
FIG. 12 shows the data break control 0 register DBC0.
Break enable bit BE (reset to 0)
This bit specifies the validity of the data address break function.
0: disable the data address break function
1: enable the data address break function
If the virtual address of data to be accessed coincides with an address set in the register DBA0 with the bit BE being 1, a data break request is made to the processor core 20, and a bit BS0 of the register DBS is set. The bit BE is supplied to the break circuit 31.
Trace trigger enable bit TE (reset to 0)
This bit specifies the validity of the data address trace trigger function.
0: disable the data address trace trigger function
1: enable the data address trace trigger function
If the virtual address of data accessed coincides with an address set in the register DBA0 with the bit TE being 1 to indicate the enabled data address trace trigger function, the signal PCST[2:0] represents the trace trigger output state TST(010) or TSQ(001) and the bit BS0 of the register DBS is set. The bit TE is supplied to the break circuit 31.

Figure 13:
FIG. 13 shows a data break status (DBS) register of the register circuit of FIG. 6.

FIG. 13 shows the data break status register DBS.

Break channel number field BCN

This field indicates the number of channels of a data break. This field is read-only, and a write operation to this field is ignored.

0000: none (reserved)
0001: one channel
...
1111: 15 channels (reserved)

This is a status bit indicating that a data address break or data address trace trigger has occurred.

0: no data address break or data address trace trigger of channel 0

1: data address break exception or data address trace trigger occurred with the virtual address of data coinciding with a set address with the bit BE being 1 or TE being 1 in the register DBC0.

The bit BS0 is cleared by writing 0 thereto and is set when a BS0 set signal from the break circuit 31 is asserted.

Figure 14:
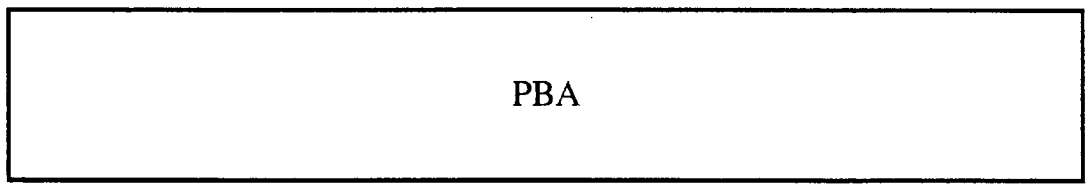
FIG. 14 shows a processor bus break address 0 (PBA0) register of the register circuit of FIG. 6.

FIG. 14 shows the processor bus break address register PBA0.

Processor bus break address filed PBA

This field stores a break address of the processor bus break/trace trigger function. This address is a physical address. The field PBA is supplied to the processor bus break circuit 33.

Figure 15:
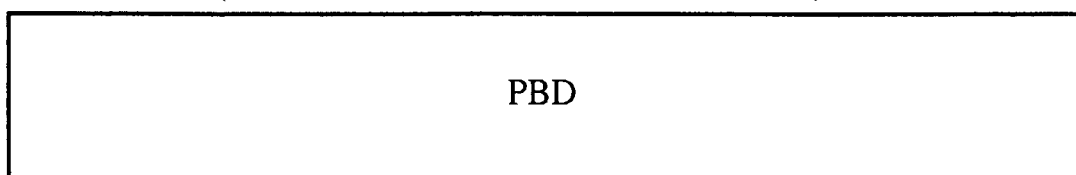
FIG. 15 shows a processor bus break data 0 (PBD0) register of the register circuit of FIG. 6.

FIG. 15 shows the processor bus break data 0 register PBD0.

Processor bus break data field PBD

This field stores break data of the processor bus break/trace trigger function. The field PBD is supplied to the processor bus break circuit 33.

Figure 16:
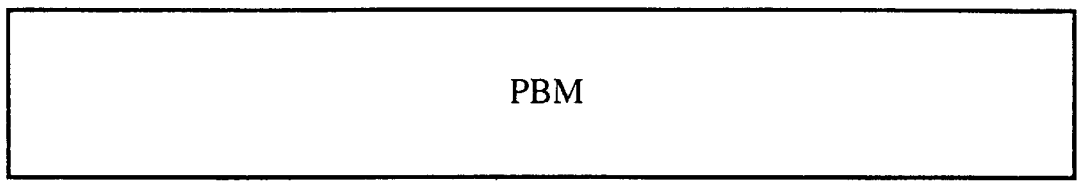
FIG. 16 shows a processor bus mask 0 (PBM0) register of the register circuit of FIG. 6.

FIG. 16 shows the processor bus mask 0 register PBM0.

Processor bus break data mask field PBM

This field indicates bits that disable (mask) the comparison of data stored in the register PBD0 according to the processor bus break/trace trigger function.

0: enable the comparison of corresponding bit of the register PBD0

1: disable the comparison of corresponding bit of the register PBD0

The field PBM is supplied to the processor bus break circuit 33.

Figure 17:
FIG. 17 shows a processor bus control 0 (PBC0) register of the register circuit of FIG. 6.

FIG. 17 shows the processor bus control 0 register PBC0.

Break enable bit BE (reset to 0)

This bit specifies the validity of a processor bus break.

0: disable processor bus break

1: enable processor bus break

If an address and data coincide with set values, a debug interrupt request is made to the processor core 20. The bit BE is supplied to the processor bus break circuit 33.

Trace trigger enable bit TE (reset to 0)

This bit specifies the validity of a processor bus trace trigger.

0: disable processor bus trace trigger

1: enable processor bus trace trigger

If an address and data coincide with set values, the signal PCST[2:0] represents the trace trigger output state TST(010) or TSQ(001). The bit TE is supplied to the processor bus break circuit 33.

Instruction-fetch-from-uncache-area bit IFUC

This bit specifies whether or not an address and data are compared with set values, for an instruction fetched from an uncache area.

0: disable the comparison

1: enable the comparison

The bit IFUC is supplied to the processor bus break circuit 33.

Data-load-from-uncache-area bit DLUC

This bit specifies whether or not the comparison of address and data is carried out according to data loaded from an uncache area.

0: disable the comparison

1: enable the comparison

The bit DLUC is supplied to the processor bus break circuit 33.

Data-store-to-uncache-area bit DSUC

This bit specifies whether or not the comparison of address and data is carried out when the data is stored in an uncache area.

0: disable the comparison

1: enable the comparison

The bit DSUC is supplied to the processor bus break circuit 33.

Data-store-to-cache-area bit DSCA

This bit specifies whether or not the comparison of address and data is carried out when the data is stored in a cache area.

0: disable the comparison

1: enable the comparison

The bit DSCA is supplied to the processor break circuit 33.

Figure 18:
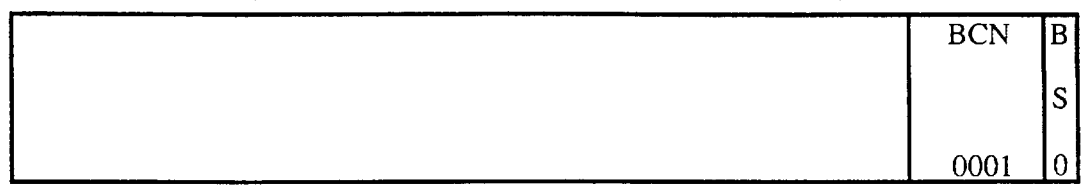
FIG. 18 shows a processor bus break status (PBS) register of the register circuit of FIG. 6.

FIG. 18 shows the processor bus break status register PBS.

Break channel number field BCN

This field indicates the number of channels of a processor bus break.

0000: 0 channel (reserved)
0061: one channel
...
1111: 15 channels (reserved)

Break status 0 bit BS0 (reset to 0)

This is a status bit indicating whether or not a processor bus break or a processor bus trace trigger has occurred.

0: no processor bus break or processor bus trace trigger of channel 0

1: processor bus break or processor bus trace trigger of channel 0 with the bit BE being 1 or TE being 1 in the register PBE0

The bit BS0 is cleared by writing 0 thereto. If the bit BE is 1, a debug interrupt request to the processor core 20 is also cleared. The bit BS0 is set when a BS0 set signal from the processor bus break circuit 33 is asserted.

Figure 19:
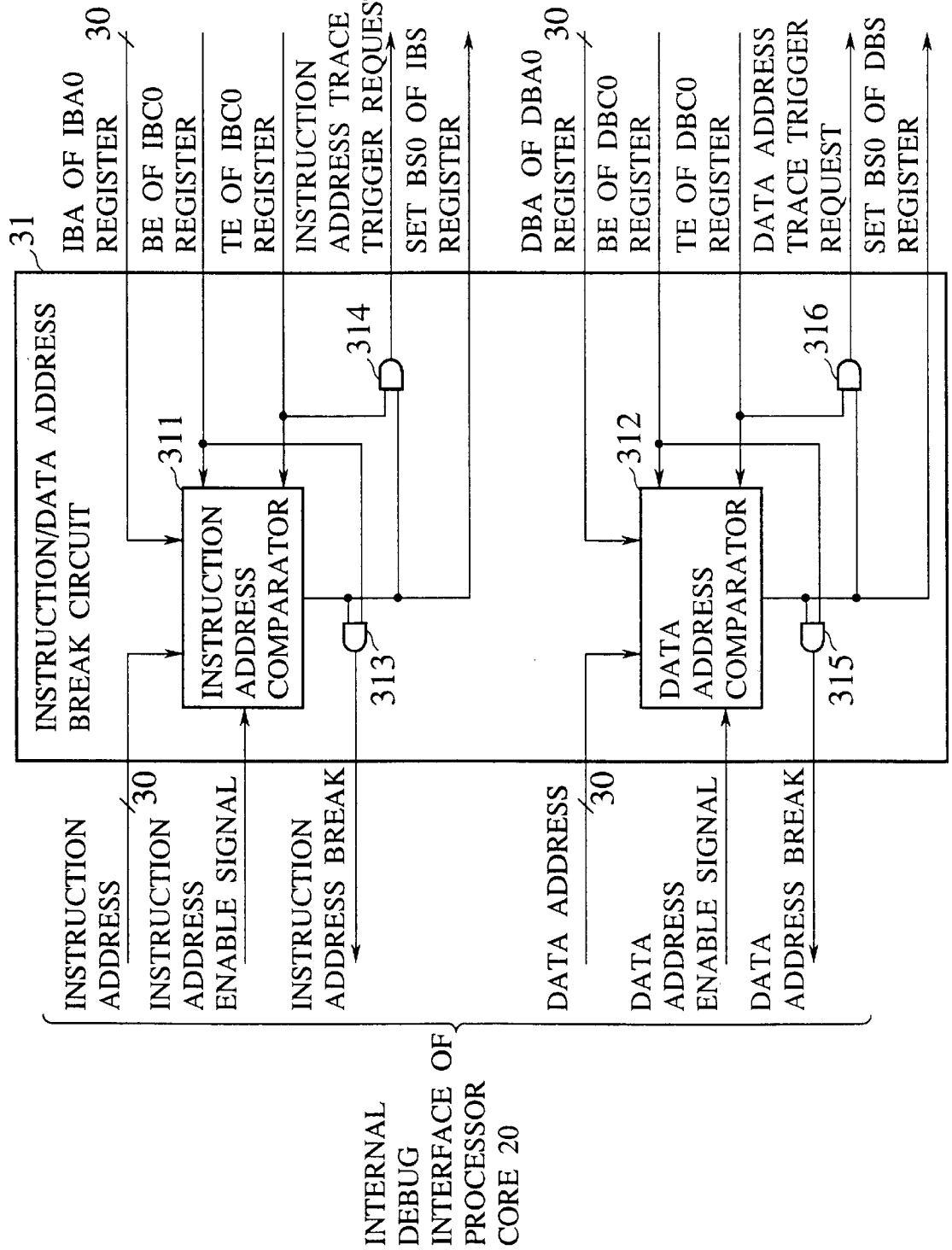
FIG. 19 shows an instruction/data address break circuit of the debug module of FIG. 5.

FIG. 19 shows the instruction/data address break circuit 31. This circuit has an instruction address comparator 311, a data address comparator 312, and AND circuits 313, 314, 315, and 316.

If the break enable bit BE or trigger enable bit TE of the register IBC0 is set and if an instruction address enable signal from the processor core 20 is asserted, the comparator 311 compares an input instruction address from the processor core 20 with an address stored in the register IBA0. If they coincide with each other, the comparator 311 provides a signal to set the bit BS0 of the register IBS. If the bit BE of the register IBC0 is set at this time, the output of the AND circuit 313 is asserted to provide the processor core 20 with an instruction address break request. If the bit TE of the register IBC0 is set, the output of the AND circuit 314 is asserted to provide the program counter tracer 32 with an instruction address trace trigger request.

If the bit BE or TE of the register DBC0 is set and if a data address enable signal from the processor core 20 is asserted, the comparator 312 compares an input data address from the processor core 20 with an address stored in the register DBA0. If they coincide with each other, the comparator 312 provides a signal to set the bit BS0 of the register DBS. If the bit BE of the register DBC0 is set at this time, the output of the AND circuit 315 is asserted to provide the processor core 20 with a data address break request. If the bit TE of the register DBC0 is set, the output of the AND circuit 316 is asserted to provide the program counter tracer 32 with a data address trace trigger request.

Figure 20:
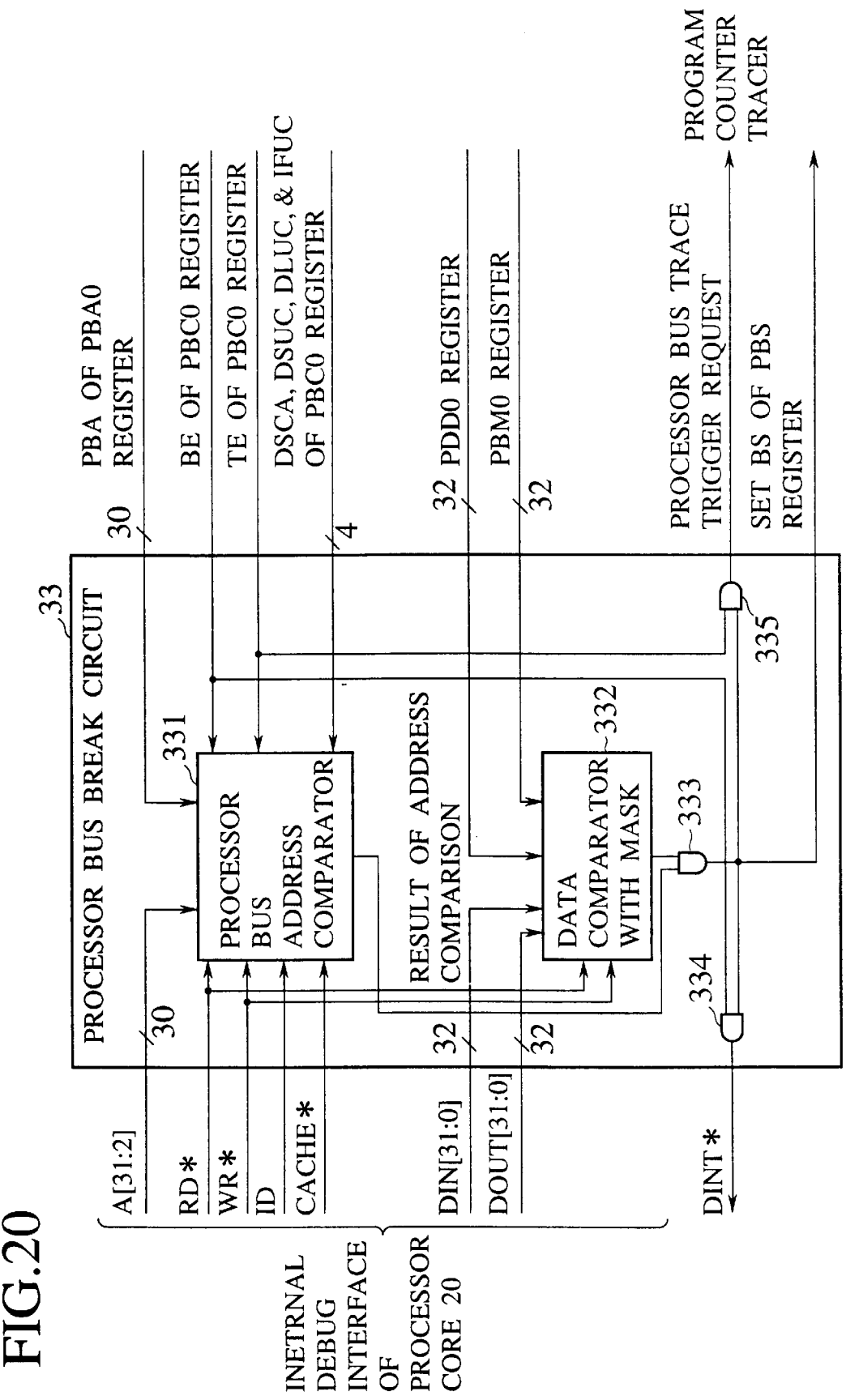
FIG. 20 shows a processor bus break circuit of the debug module of FIG. 5.

FIG. 20 shows the details of the processor bus break circuit 33.

The circuit 33 monitors a bus operation in the processor bus and provides the processor core 20 with a debug interrupt request if a bus operation for an address and data set in registers occur.

The circuit 33 has a processor bus address comparator 331, a data comparator 332 with a mask, and AND circuits 333, 334, and 335.

When the break enable bit BE or trigger enable bit TE of the register PBC0 is set, the comparator 331 compares an address in the processor bus with an address set in the register PBA0. The bits DSCA, DSUC, DLUC, and IFUC of the register PBC0 indicate the validity of comparison with respect to uncache area/cache area, data store/data load, and instruction fetch. The comparator 331 operates as shown in Table 2 according to a signal ID (indicating whether it is instruction fetch or data access), a read signal RD*, a write signal WR*, and a signal CACHE*.

is set at this time, the output of the AND circuit 334 is asserted to provide the processor core 20 with a debug interrupt request. If the bit TE of the register PBC0 is set, the output of the AND circuit 335 is asserted to provide the program counter tracer 32 with a processor bus trace trigger request.

Figure 21:
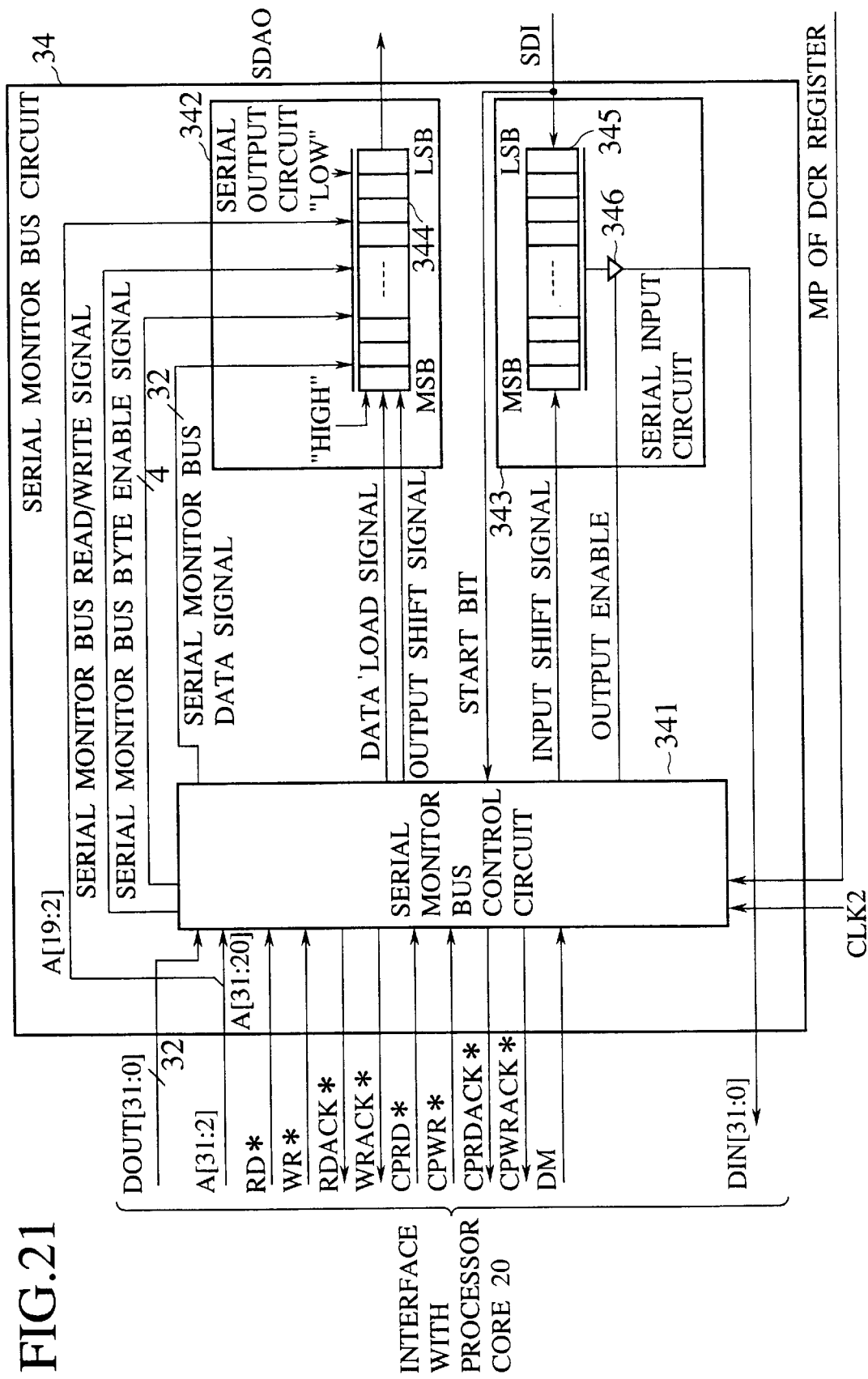
FIG. 21 shows a serial monitor bus circuit of the debug module of FIG. 5.

FIG. 21 shows the details of the serial monitor bus circuit 34. The circuit 34 has a serial monitor bus controller 341, a serial output circuit 342, and a serial input circuit 343.

The serial monitor bus controller 341 receives a data output signal DOUT[31:0], address signal A[31:20], read signal RD*, write signal WR*, coprocessor read signal CPRD*, coprocessor write signal CPWR*, and debug mode signal DM from the processor bus 80. The controller 341 also receives the clock signal CLK2 from the clock generator 37, the bit MP of the register DCR from the register circuit 35, and the signal SDI from the external interface circuit 36.

The controller 341 provides the processor bus 80 with a read acknowledge signal RDACK*, write acknowledge signal WRACK*, coprocessor read acknowledge signal CPRDACK*, and coprocessor write acknowledge signal CPWRACK*. The controller 341 provides the serial output circuit 342 with a serial monitor bus read/write signal, serial monitor bus byte enable signal, serial monitor bus data signal, and for an output shift register 344 of the circuit 342, data load signal and output shift signal. The controller 341 provides the serial input circuit 343 with an input shift signal for an input shift register 345 and an output enable signal for an output buffer 346. The serial monitor bus read/write signal is high in a read bus operation and low in a write bus operation.

When the data load signal from the controller 341 to the output shift register 344 is asserted, a start bit (fixed to low),

TABLE 2

| Kind of access | ID | RD* | WR* | CACHE* | Processor bus address- (PBA0) | IFUC | DLUC | DSUC | DSCA | Comparator output |
|---|---|---|---|---|---|---|---|---|---|---|
| Read (address mismatch) | X | L | H | X | Mismatch | X | X | X | X | L |
| Write (address mismatch) | X | H | L | X | Mismatch | X | X | X | X | L |
| Instruction fetch from uncache area | H | L | H | H | Match | 1 | X | X | X | H |
|  |  |  |  |  |  | 0 | X | X | X | L |
| Data load from uncache area | L | L | H | H | Match | X | 1 | X | X | H |
|  |  |  |  |  |  | X | 0 | X | X | L |
| Data store to uncache area | L | H | L | H | Match | X | X | 1 | X | H |
|  |  |  |  |  |  | X | X | 0 | X | L |
| Data store to cache area | L | H | L | L | Match | X | X | X | 1 | H |
|  |  |  |  |  |  | X | X | X | X | L |

In a read bus cycle with the read signal RD* being low, the data comparator 332 compares input data DIN[31:0] from the processor bus 80 with data stored in the register PBD0 only for bits whose corresponding bits in the register PBM0 are each 0. In a write bus cycle with the write signal WR* being low, the comparator 332 compares output data DOUT[31:0] of the processor bus 80 with the data stored in the register PBD0 only for bits whose corresponding bits in the register PBM0 are each 0.

If each of the outputs of the comparators 331 and 332 is high, i.e., if the address and data coincide with the set address and data, the output of the AND circuit 333 is asserted to request the register circuit 35 for setting the bit BS0 of the register PBS. If the bit BE of the register PBC0 address bits A[1] to A[19], serial monitor bus read/write signal, serial monitor bus byte enable signal, and serial monitor bus data signal are loaded from LSB to the output shift register 344. When the output shift signal to the register 344 is asserted, the value in the register 344 is shifted by one bit from MSB toward LSB, and MSB is set to high. The value of LSB of the output shift register 344 is carried by an output signal SDA0.

When the input shift signal from the controller 341 to the input shift register 345 is asserted, the value of the register 345 is shifted by one bit from LSB toward MSB, and the value of the input signal SDI is set in LSB.

The operation of the serial monitor bus circuit 34 of FIG. 21 will be explained.

When the processor core 20 accesses an area of 0xFF20_0000 to 0xFF2F_FFFF under the debug mode, or when a coprocessor read/write operation (CTC0, CFC0) is executed under the debug mode, the memory in the debugger 60 is accessed through the serial monitor bus circuit 34. In a write operation using the serial monitor bus, the circuit 34 provides, as the output signal SDA0, an address signal, a bus control signal, and a data signal bit by bit in series. In a read operation, the circuit 34 provides, as the output signal SDA0, an address signal and a bus control signal, and receives data carried by the input signal SDI bit by bit in series.

The serial monitor bus circuit 34 operates according to the clock signal CLK2, which is obtained by halving the frequency of the operation clock signal CLK of the processor core 20.

a) Access by read/write bus operation

In a read bus operation, the processor core 20 provides an address A[31:0] to access and asserts the signal RD*. When the read acknowledge signal RDACK* is asserted, data DIN[31:0] is read and the bus operation ends.

In a write bus operation, the processor core 20 sends an address A[31:0] to access and data DOUT[31:0] to be written, and asserts the signal WR*. When the write acknowledge signal WRACK* is asserted, the bus operation ends.

If the processor core 20 executes a bus operation with respect to the monitor area mentioned below under the debug mode, the debugger 60 is accessed through the serial monitor bus circuit 34.

The monitor area extends for one megabyte between 0XFF20_0000 and 0xFF2F_FFFF.

(A[31:20])=1111_1111_0010 (0: low, 1: high)

The write bus operation uses, for example, a store instruction (SW) to write data to the memory. The following is an example of the store instruction:

```
sw      r8      0x0004 (r9)
```

In this example, a memory address is obtained by adding a 16-bit offset value 0x0004 to a general register r9. To access the monitor area, the value of the general register must be set to 0xFF20_0000 to 0xFF2F_0000 in advance.

The serial monitor bus circuit 34 provides, as the output signal SDA0, the address signal A[19:2] from lower bits, and a high-level signal in a read operation or a low-level signal in a write operation. Thereafter, the byte enable signal BE[3:0]* is provided from lower bits. In a read operation, 32-bit data is received as the input signal SDI and is provided as data DIN[31:0] to the processor bus 80. In a write operation, data DOUT[31:0] from the processor bus 80 is carried by the output signal SDA0.

The 18-bit address signal A[19:2] from the processor core 20 is used to access the one-megabyte memory space.

The byte enable signal BE[3:0] of the processor core 20 is supplied to the serial monitor bus, to access a byte, a half-word, or three bytes. The serial bus, however, transfers 32-bit data D[31:0] even for byte-, half-word-, or 3-byte access. When writing data of one byte, half-word, or three bytes, bit positions of the signal BE[3:0] corresponding to the required byte positions of the data D[31:0] are set. In a read operation, byte positions of data corresponding to inactive bit positions of the signal BE[3:0] are ignored by the processor core 20.

If the monitor area is protected in the debug mode with the bit MP of the register DCR being 1, a write operation to the area from FF20_0000 to FF2F_FFFF is ignored. In this case, the serial monitor bus circuit 34 returns only the signal WRACK* to the processor core 20, to terminate the bus operation.

When reading the area of FF20_0000 to FF2F_FFFF in the debug mode, correct data is read from the serial monitor bus irrespective of the value of the bit MP.

In the normal mode, a write operation to the monitor area of FF20_0000 to FF2F_FFFF is ignored, and the result of a read operation is undefined. At this time, the serial monitor bus circuit 34 returns the signal WRACK* or RDACK* to the processor core 20 and terminates the bus operation.

b) Access by coprocessor bus operation (CTC0/CFC0)

When the instruction CFC0 is executed, the processor core 20 executes a read bus operation of the coprocessor, and when the instruction CTC0 is executed, a write bus operation of the coprocessor. In the coprocessor bus operation, the instructions CFC0 and CTC0 are provided as they are to the address A[31:0] of the processor bus as follows:

| A[31:0] | C0P0 | CT | rt | rd | 0 |
|---|---|---|---|---|---|
| A[31:0] | C0P0 | CF | rt | rd | 0 |
| CFC0 (0: low level, 1: high level) | | | | | | rt: general register rd: control register of coprocessor (no significance for serial monitor bus)

In a coprocessor read operation, the processor core 20 asserts the signal CPRD*, and when the coprocessor read acknowledge signal CPRDACK* is asserted, reads data DIN[31:0] and terminates the bus operation.

In a coprocessor write operation, the processor core 20 asserts the signal CPWR* and provides, as the data bus signal DOUT[31:0], the value of a general register in the processor core 20. When the coprocessor write acknowledge signal CPWRACK* is asserted, the processor core 20 terminates the bus operation.

The processor core 20 carries out a coprocessor bus operation with the instructions CTC0 and CFC0, to access the debugger 60 through the serial monitor bus.

The serial monitor bus circuit 34 provides, as the output signal SDA0, bus cycle signals at the rate of a bit per clock period. The address signal A[19:2] of the processor core 20 is provided from lower bits. Thereafter, a high-level signal is provided in the coprocessor read operation, and in the coprocessor write operation, a low-level signal is provided. A byte enable signal in the serial monitor bus is a low-level signal for four clock periods without regard to the signal BE[3:0] of the processor bus.

In response to the instruction CFC0, 32-bit data is received as the input signal SDI, which is supplied as the data signal DIN[31:0] to the processor bus. In response to the instruction CTC0, the data output signal DOUT[31:0] from the processor bus is supplied as the output signal SDA0.

In the debug mode, a write operation of the serial monitor bus is carried out according to the instruction CTC0 irrespective of the protection of the monitor area, i.e., irrespective of the value of the bit MP of the register DCR. Also, a read operation of the serial monitor bus is carried out according to the instruction CFC0.

In the normal mode, the write operation according to the instruction CTC0 is ignored, and the result of the read operation according to the instruction CFC0 is undefined. The debug module returns only the signals CPRDACK* and CDWRACK* to the processor core 20 and terminates the bus operation.

Timing charts of the serial monitor bus operations will be explained.

a) Read operation of serial monitor bus

Figure 22:
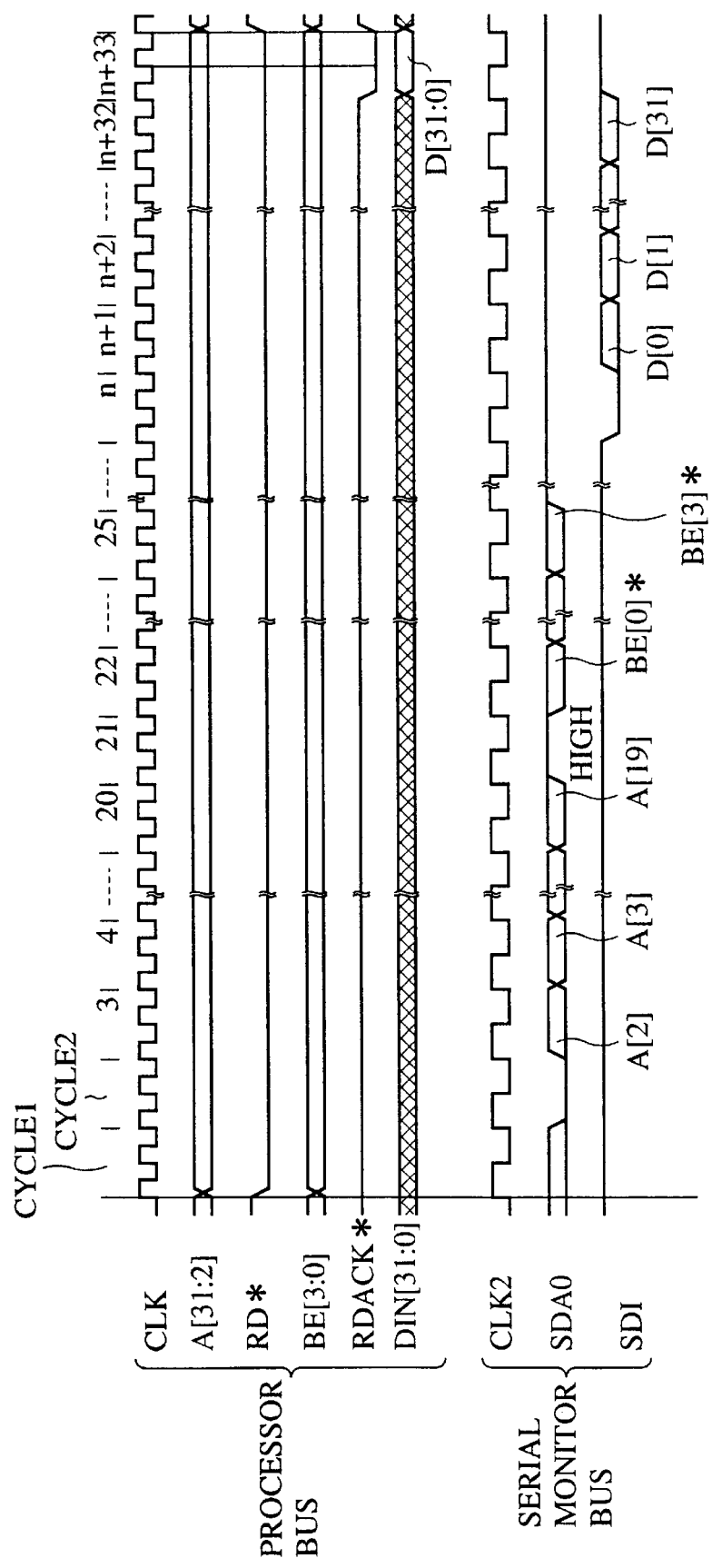
FIG. 22 is a timing chart showing a read operation of the serial monitor bus circuit.

FIG. 22 is a timing chart showing a read operation of the serial monitor bus.

(1) In cycle 1, the processor core 20 starts the read operation to the area of 0xFF20_0000 to 0xFF2F_FFFF (A[31:20]=1111_1111_0010). The processor core 20 provides an address A[31:0] to access and asserts the signal RD*. The byte enable signal BE[3:0] for byte positions to be read is asserted.

(2) In cycle 2, the serial monitor bus circuit 34 acknowledges the start of the read operation and provides, as the output signal SDA0, a low-level signal for a clock period of the clock signal CLK2 that is formed by dividing the frequency of the core clock signal CLK.

(3) In cycles 3 to 25, the circuit 34 provides, as the output signal SDA0, address bits A[21] to A[19], a high-level bit (indicating the read operation), and byte enable bits BE[0]* to BE[3]* provided by the processor core 20, every clock period of the signal CLK2.

(4) In cycle n, the debugger 60 provides, as the signal SDI, a low-level signal for one clock period before providing data. After detecting the low-level signal, the circuit 34 receives, in cycles n+1 to n+32, data D[0] to D[31] at the rate of a bit per clock period.

(5) In cycle n+33, the circuit 34 asserts the acknowledge signal RDACK* to the processor core 20 and provides, as the data signal DIN[31:0], the read 32-bit data D[31:0].

Figure 23:
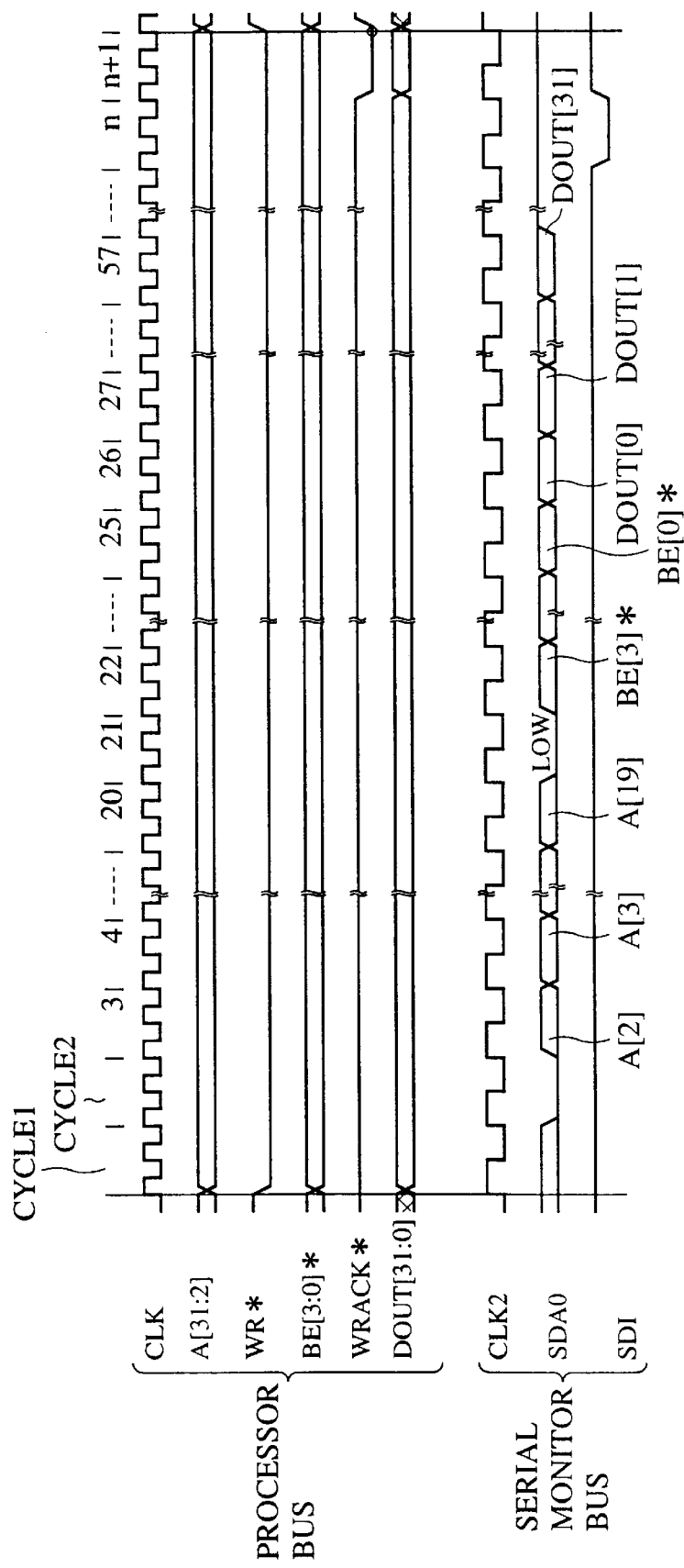
FIG. 23 is a timing chart showing a write operation of the serial monitor bus circuit.

(6) In cycle n+33, the processor core 20 reads the data signal DIN[31:0]. This completes the read operation.

b) Write operation on serial monitor bus FIG. 23 is a timing chart showing a write operation of the serial monitor bus.

(1) In cycle 1, the processor core 20 starts the write operation to the area of 0xFF20_0000 to 0xFF2F_FFFF (A[31:20]=1111_1111_0010). The processor core 20 provides an address A[31:0] to access and asserts the signal WR*. The byte enable signal BE[3:0] for byte positions where data are written is asserted.

(2) In cycle 2, the serial monitor bus circuit 34 acknowledges the start of the write operation and provides, as the output signal SDA0, a low-level signal for a clock period of the clock signal CLK2.

(3) In cycles 3 to 57, the circuit 34 provides, as the output signal SDA0, address bits A[2] to A[19], a low-level bit (indicating the write operation), byte enable bits BE[0]* to BE[3]*, and write data DOUT[0] to DOUT[31] provided by the processor core 20.

(4) In cycle n, the debugger 60 ends the writing of the data and provides, as the input signal SDI, a low-level signal for a clock period.

(5) In cycle n+1, the circuit 34 detects the low-level signal and asserts the write acknowledge signal WRACK* to the processor core 20.

(6) In cycle n+1, the processor core 20 completes the write operation.

c) Read bus operation by instruction CFC0

Figure 24:
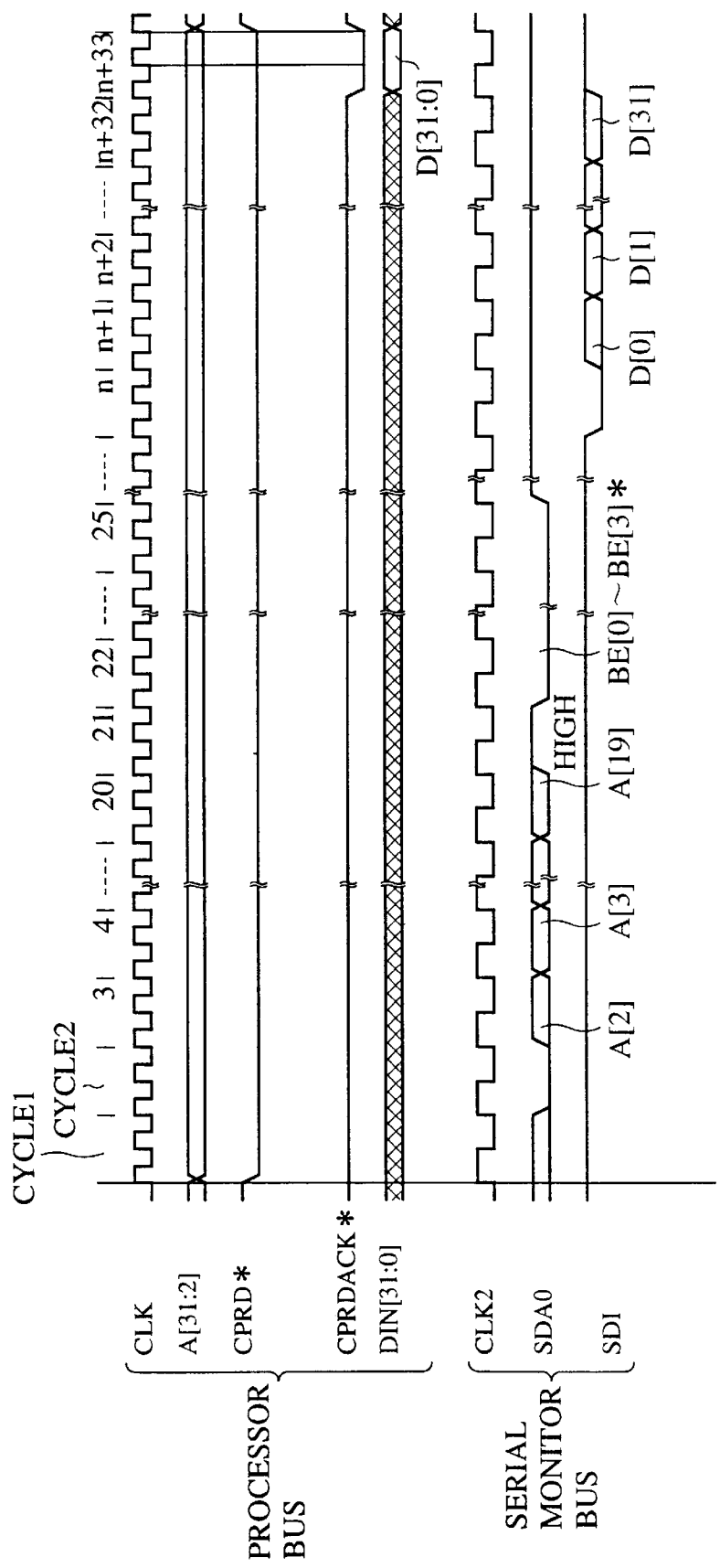
FIG. 24 is a timing chart showing a read operation of the serial monitor bus circuit according to an instruction CFC0.

FIG. 24 is a timing chart showing a read bus operation according to the instruction CFC0.

(1) In cycle 1, the processor core 20 starts the coprocessor read bus operation according to the instruction CFC0, provides an address A[31:21]=01000000010 to the processor bus, and asserts the signal CPRD*.

(2) In cycle 2, the serial monitor bus circuit 34 acknowledges the start of the read operation and provides, as the output signal SDA0, a low-level signal for a clock period of the signal CKL2.

(3) In cycles 3 to 20, the circuit 34 provides, as the output signal SDA0, address bits A[2] to A[19] of the address A[31:21]. In cycle 21, a high-level signal is provided for a clock period to indicate the read operation. In cycles 22 to 25, a low-level signal is provided for four clock periods without regard to the byte enable signal of the processor bus.

(4) In cycle n, the debugger 60 provides, as the input signal SDI, a low-level signal for a clock period before providing data. The circuit 34 detects the low-level signal and reads data D[0] to D[31] in cycles n+1 to n+32, respectively.

(5) In cycle n+33, the circuit 34 asserts the coprocessor read acknowledge signal CPRDACK* to the processor core 20 and provides, as the data bus signal DIN[31:0], the read 32-bit data D[31:0].

(6) In cycle n+33, the processor core 20 reads the signal DIN[31:0] and terminates the coprocessor read bus operation.

d) Write bus operation according to instruction CTC0

Figure 25:
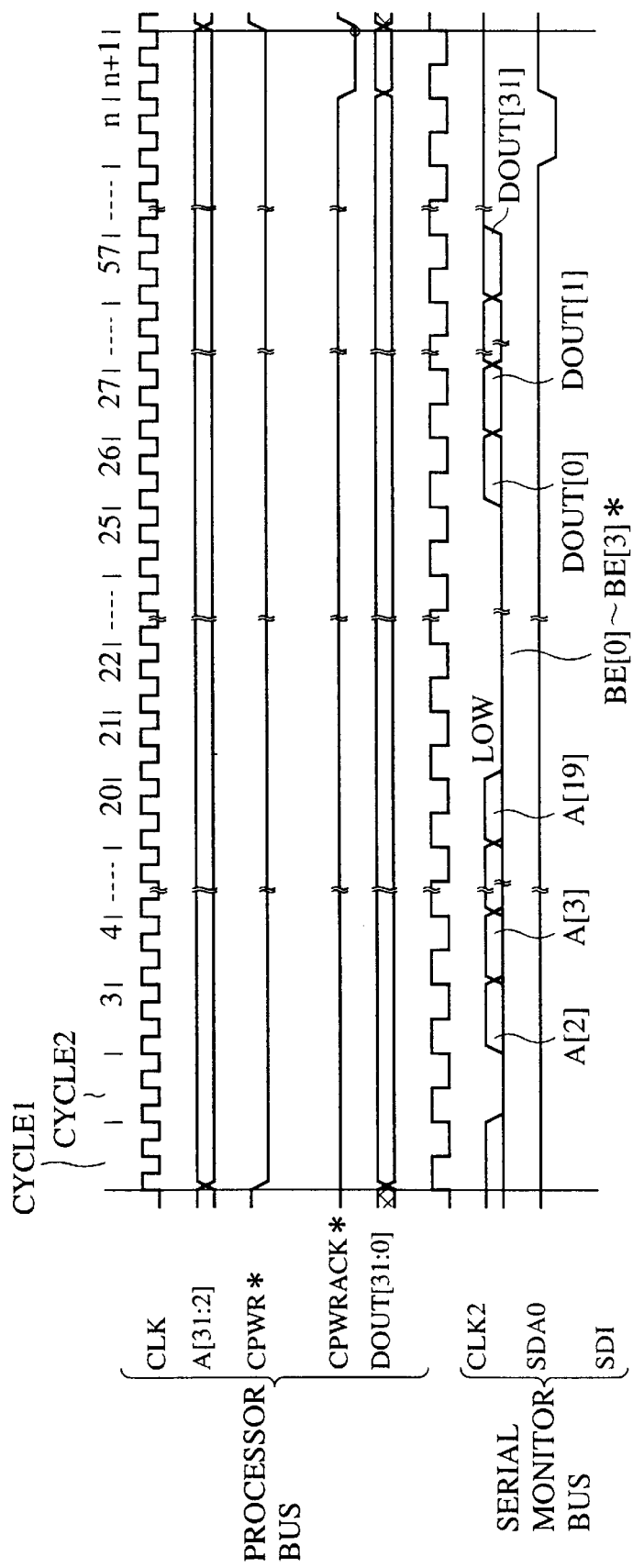
FIG. 25 is a timing chart showing a write operation of the serial monitor bus circuit according to an instruction CTC0.

FIG. 25 is a timing chart showing a write bus operation according to the instruction CTC0.

(1) In cycle 1, the processor core 20 starts the coprocessor write bus operation according to the instruction CTC0, provides an address A[31:21]=0100_0000_110 of the processor bus, and asserts the signal CPWR*.

(2) In cycle 2, the serial monitor bus circuit 34 acknowledges the start of the write operation and provides, as the output signal SDA0, a low-level signal for a clock period of the signal CLK2.

(3) In cycles 3 to 20, the circuit 34 provides, as the output signal SDA0, address bits A[2] to A[19] of the address A[31:21]. In cycle 21, a low-level signal indicating the write operation is provided for a clock period. In cycles 22 to 25, the output signal SDA0 becomes low for four clock periods without regard to the byte enable signal of the processor bus. In cycles 26 to 57, the output signal SDA0 provides data bus output bits DOUT[0] to DOUT[31].

(4) In cycle n, the debugger 60 finishes the writing of the data and provides, as the input signal SDI, a low-level signal for a clock period.

(5) In cycle n+1, the circuit 34 detects the low-level signal and asserts the coprocessor write acknowledge signal CPWRACK* to the processor core 20.

(6) In cycle n+1, the processor core 20 completes the coprocessor write bus operation.

Figure 26:
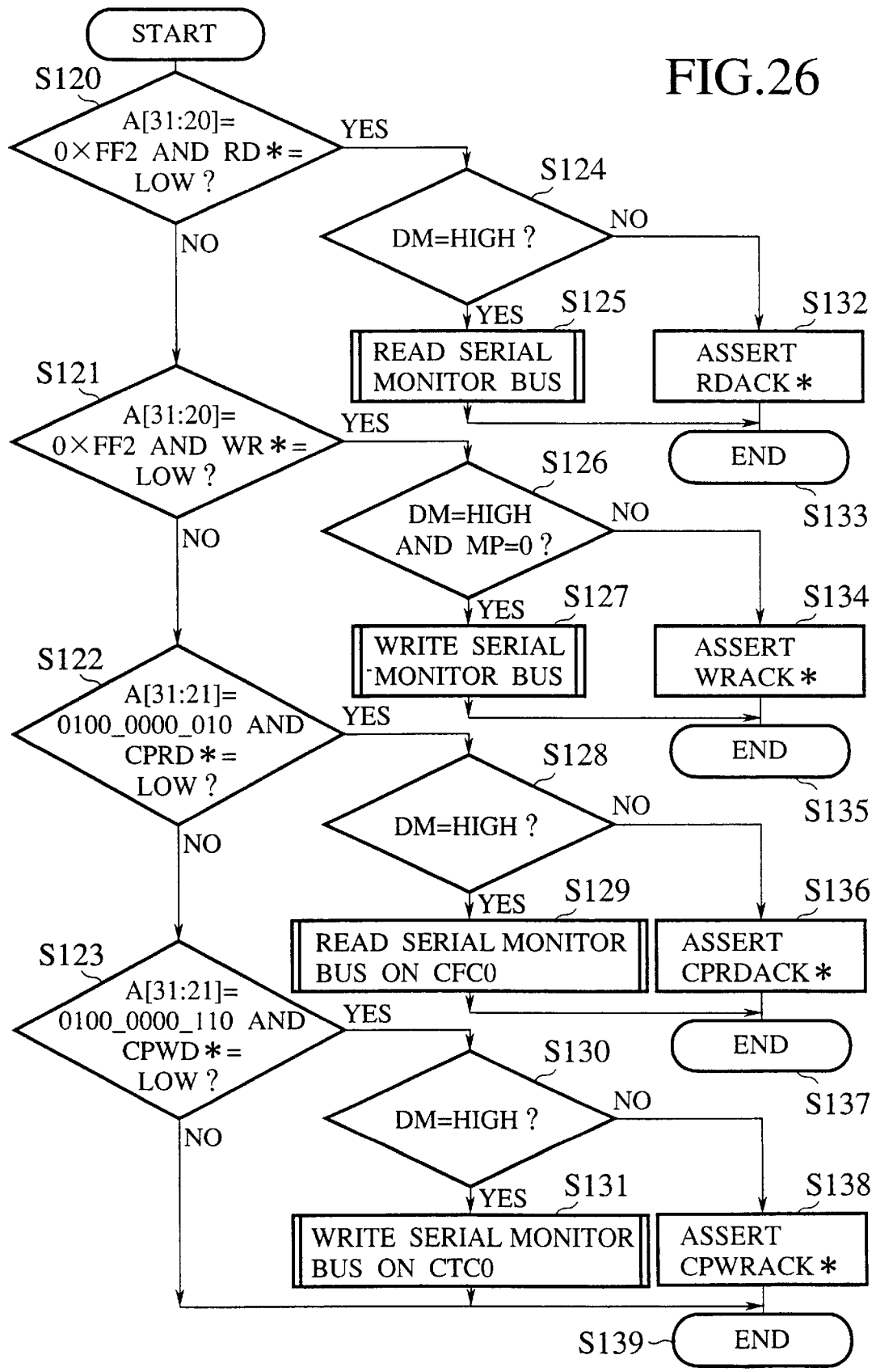
FIG. 26 is a flowchart showing the operation of the serial monitor bus circuit of FIG. 21.

FIG. 26 is a flowchart showing the operation of the serial monitor bus controller 341.

The controller 341 monitors the operations of the processor bus 80.

(1) In steps S120, S124, and S125, a read operation of the serial monitor bus starts because an address A[31:20] indicates 0xFF2, the read signal RD* is asserted (low), and the signal DM is high to indicate the debug mode.

(2) In steps S120, S124, S132, and S133, the signal RDACK* of the processor core 20 is asserted to terminate the bus operation because the signal DM is low to indicate the normal mode, although A[31:20]=0xFF2 and the signal RD* is asserted (low).

(3) In steps S120, S121, S126, and S127, a write operation of the serial monitor bus starts because A[31:20]=0xFF2, the write signal WR* is asserted (low), the signal DM is high to indicate the debug mode, and the bit MP of the register DCR is 0 to indicate a write enable state.

(4) In steps S120, S121, S126, S134, and S135, the signal WRACK* of the processor core 20 is asserted to terminate the bus operation because the signal DM is low to indicate the normal mode or the bit MP of the register DCR is 1 to indicate a write prohibited state, although A[31:20]=0xFF2 and the write signal WR* is asserted (low).

(5) In steps S120, S121, S122, S128, and S129, a coprocessor read operation of the serial monitor bus starts because A[31:21]=0100_0000_010, the coprocessor read bus operation signal CPRD* for the instruction CFC0 is asserted (low), and the signal DM is high to indicate the debug mode.

(6) In steps S120, S121, S122, S128, S136, and S137, the signal CPRDACK* of the processor core 20 is asserted to terminate the bus operation because the signal DM is low to indicate the normal mode, although A[31:21]=0100_0000_010 and the signal CPRD* for the instruction CFC0 is asserted (low).

(7) In steps S120, S121, S122, S123, S130, and S131, the coprocessor read operation of the serial monitor bus starts because A[31:21]=0100_0000_110, the coprocessor write bus operation signal CPWR* for the instruction CTC0 is asserted (low), and the signal DM is high to indicate the debug mode.

(8) In steps S120, S121, S122, S123, S138, and S139, the signal CPWRACK* of the processor core 20 is asserted to terminate the bus operation because the signal DM is low to indicate the normal mode, although A[31:21]=0100_0000_110 and the signal CPWR* for the instruction CTC0 is asserted (low).

Figure 27:
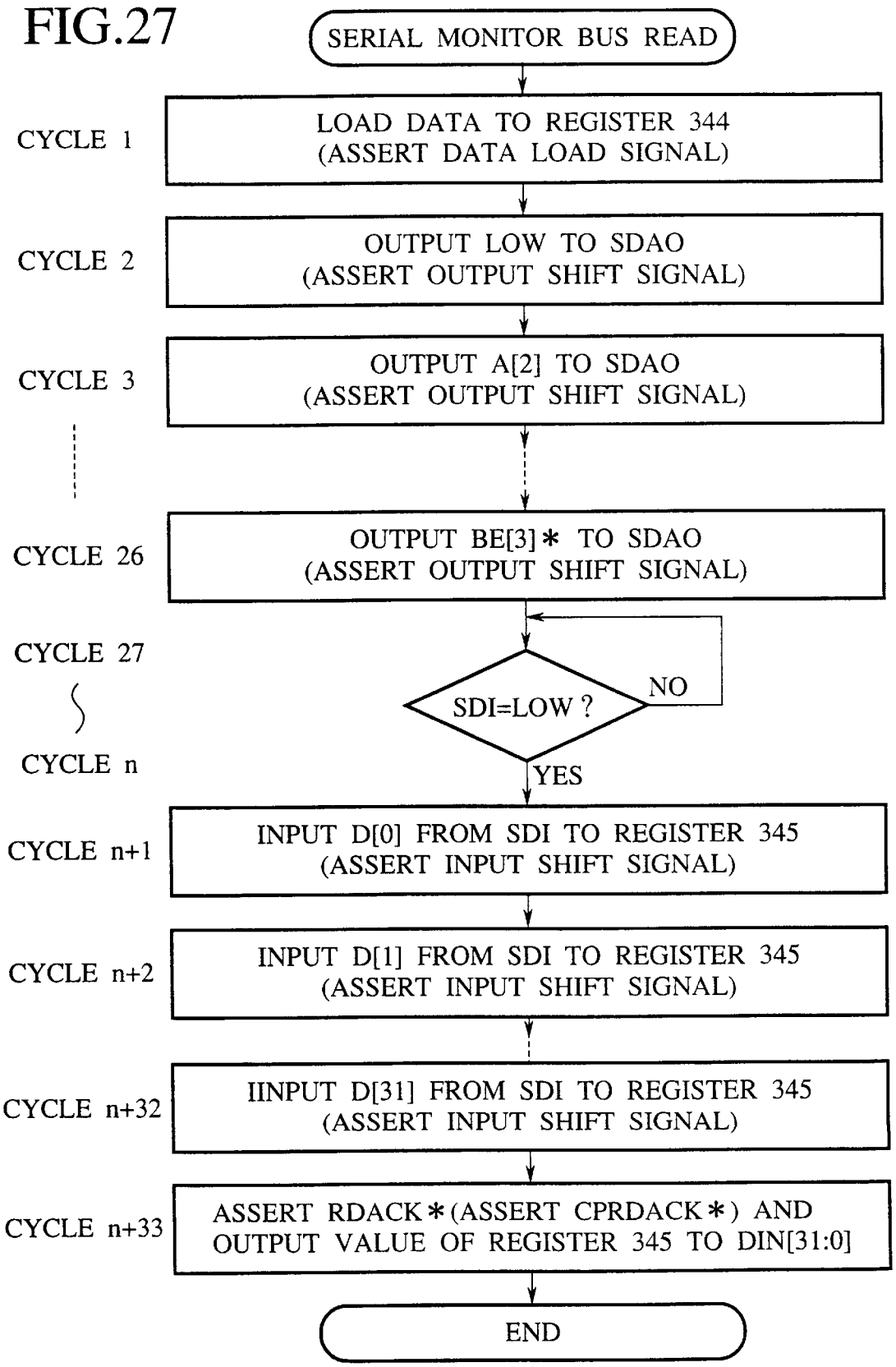
FIG. 27 is a flow chart showing a read operation of the serial monitor bus circuit.

FIG. 27 is a flowchart showing the read operation of the serial monitor bus circuit 34.

In the read operation, the serial monitor bus controller 341 provides, in cycle 1, the output shift register 344 with a high-level serial monitor bus read/write signal, a serial monitor bus byte enable signal BE[3:0], and a high-level serial monitor bus data signal, and asserts a data load signal.

In a coprocessor read bus operation according to the instruction CFC0, the serial monitor bus controller 341 provides the output shift register 344 with a high-level serial monitor bus read/write signal, a low-level byte enable signal, and a high-level serial monitor bus data signal, and asserts the data load signal. The shift register 344 latches these values and a low level at an LSB.

The output signal SBA0 is set to low. The controller 341 asserts the output shift signal in cycle 2.

In cycles 3 to 25, the controller 341 asserts the output shift signal. The bits latched by the register 344 in cycle 1 are supplied as the output signal SDA0 at the rate of a bit per clock period.

In cycles 26 to n, the controller 341 waits for the input signal SDI being asserted to low.

In cycles n+1 to n+32, the controller 341 asserts the input shift signal to the serial input circuit 343, and the input signal SDI carries input data D[0] to D[31] to the input shift register 345.

In cycle n+33, the controller 341 asserts the read acknowledge signal RDACK* of the processor bus in the read operation. In the coprocessor read bus operation, the controller 341 asserts the coprocessor read acknowledge signal CPRDACK*. The output enable signal to the serial input circuit 343 is asserted, and the data D[31:0] in the input shift register 345 is carried by the data bus input signal DIN [31:0].

Figure 28:
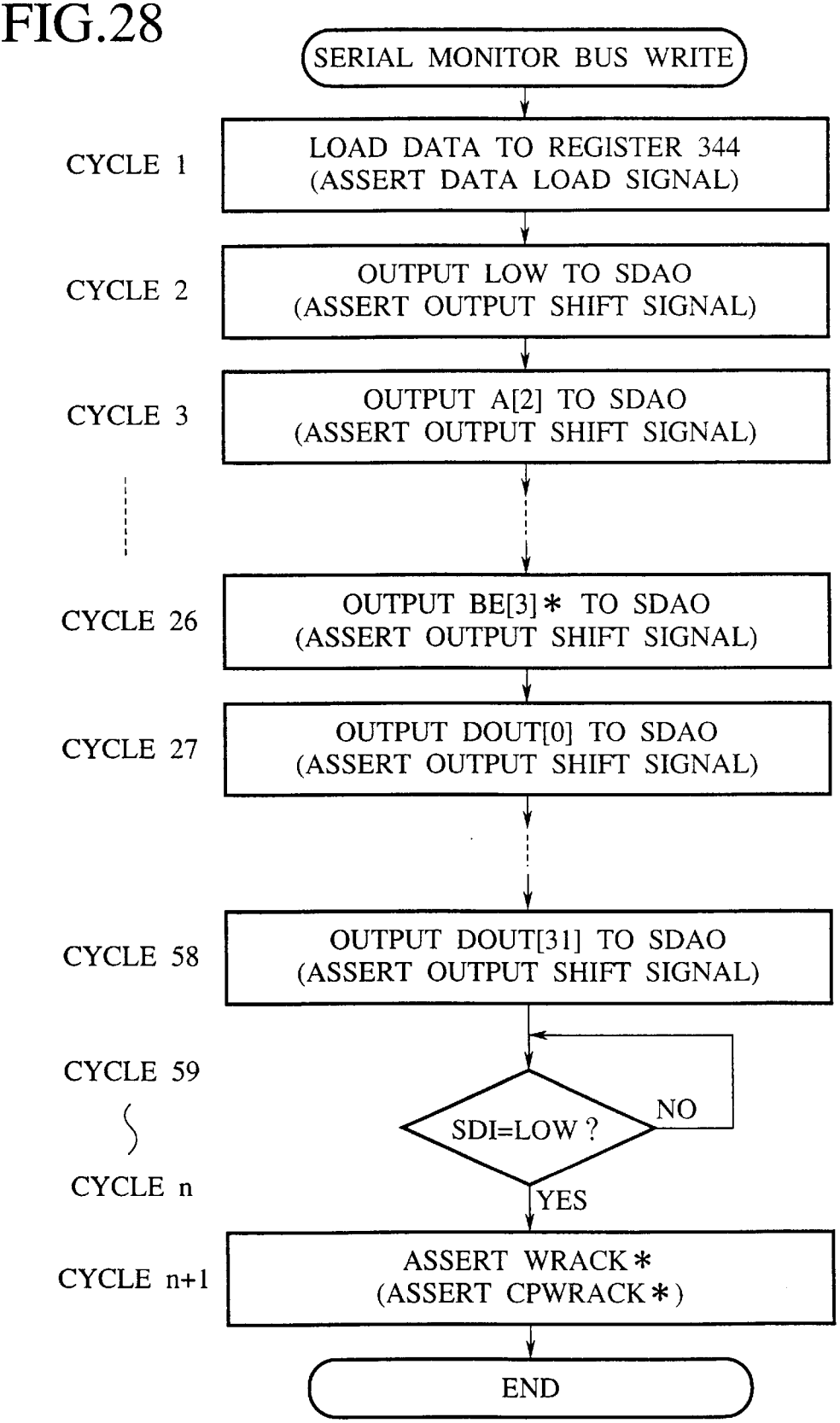
FIG. 28 is a flowchart showing a write operation of the serial monitor bus circuit.

FIG. 28 is a flowchart showing the write operation of the serial monitor bus circuit 34.

In the write operation, the serial monitor bus controller 341 provides, in cycle 1, the output shift register 344 with the low-level serial monitor bus read/write signal, serial monitor bus byte enable signal BE[3:0], and serial monitor bus data signal DOUT[31:0], and asserts the data load signal.

In the coprocessor write bus operation according to the instruction CTC0, the controller 341 provides the register 344 with the low-level serial monitor bus read/write signal, low-level 4-bit serial monitor bus byte enable signal, and serial monitor bus data signal DOUT[31:0], and asserts the data load signal. The register 344 latches these values and a low level at an LSB in cycle 1.

In cycle 2, the output signal SDA0 is set to low. The controller 341 asserts the output shift signal.

In cycles 3 to 57, the controller 341 asserts the output shift signal. The values latched by the register 344 in the cycle 1 are carried by the output signal SDA0 at the rate of a bit per clock period.

In cycles 58 to n, the controller 341 waits for the input signal SDI being asserted to low.

In cycle n+1, the controller 341 asserts the write acknowledge signal WRACK* to the processor bus in the write operation. If it is the coprocessor bus operation, the controller 341 asserts the coprocessor write acknowledge signal CPWRACK*.

The program counter tracer 32 will be explained.

An indirect jump, a direct jump, and a branching are defined as follows:

Indirect jump

A value stored in a register or memory is used as the target address of a jump. Namely, a jump instruction itself does not specify the target address of the jump.

Direct jump

The target address of a jump instruction is specified by a program counter and a code contained in the instruction.

Branching (or conditional branching)

This is a jump instruction whose destination is specified by a program counter and the sum of parts of codes contained in the instruction. Whether or not the branching is actually carried out is determined according to conditions. If the branching is actually carried out, it is called "branch taken," and if it is not carried out, it is called "branch not taken."

Figure 29:
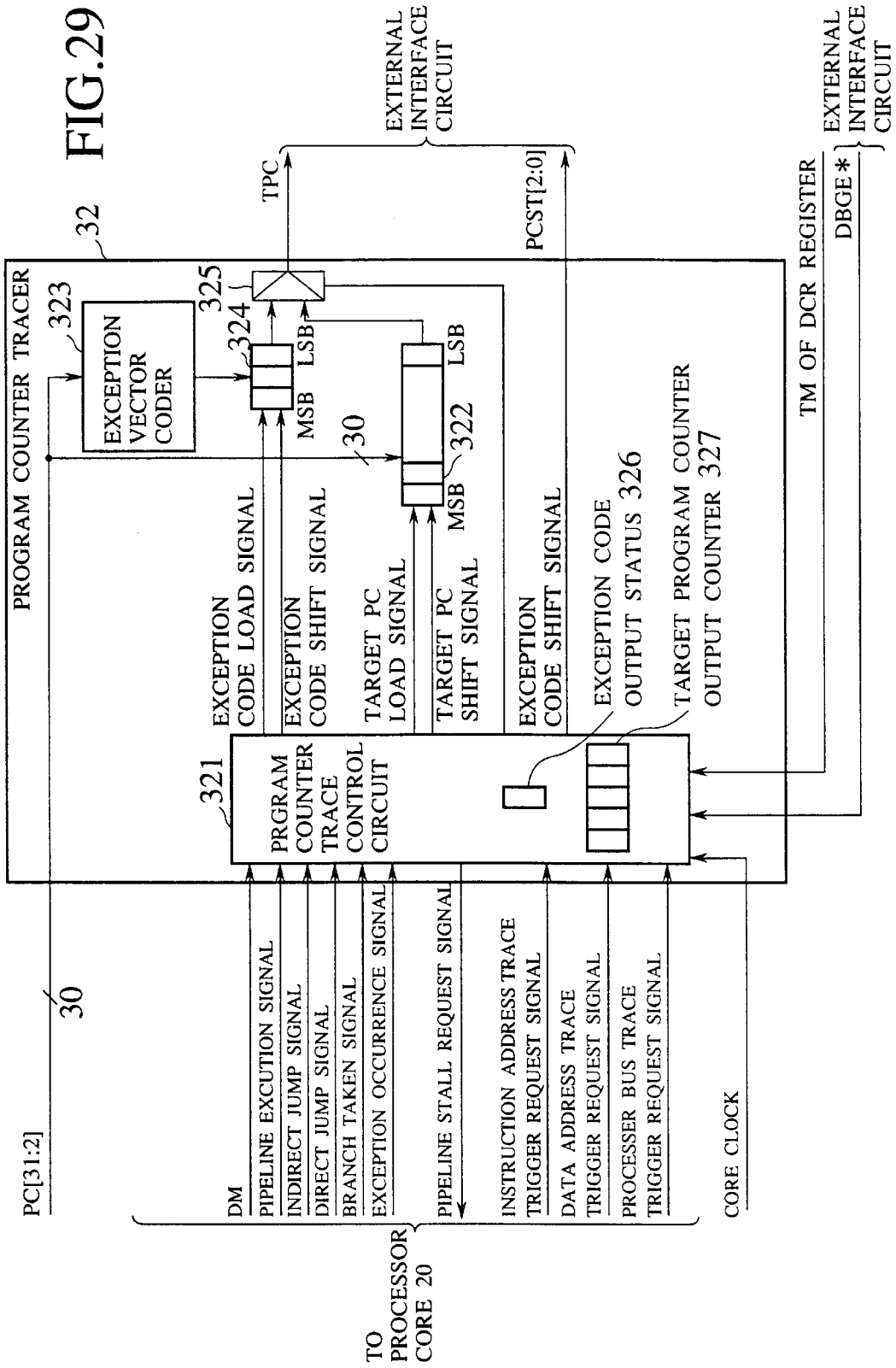
FIG. 29 shows a program counter tracer of the debug module of FIG. 5.

FIG. 29 shows the details of the program counter tracer 32. The tracer 32 receives the following signals from the processor core 20:

Debug mode signal DM

This signal indicates whether the current mode is the debug mode or normal mode.

Pipeline execution signal

This signal indicates the execution of an instruction.

30-bit target program counter [31:2] signal

This signal indicates the target address of a branch instruction or jump instruction, or the vector address of an exception and is enabled when the below-mentioned indirect jump signal, direct jump signal, branch taken signal, exception caused signal are asserted.

Indirect jump signal

This signal indicates that an indirect jump has been executed.

Direct jump signal

This signal indicates that a direct jump has been executed.

Branch taken signal

This signal indicates that a branch instruction has been executed and taken.

Exception caused signal

This signal indicates that an exception has occurred.

The tracer 32 provides the processor core 20 with the following signals to completely trace the program counter:

Pipeline stall request signal

This signal stalls a pipeline process of the processor core 20, to completely let the target program counter provide an output. If the next indirect jump occurs while the tracer 32 is receiving the target program counter signal of an indirect jump, the tracer 32 asserts the pipeline stall request signal to stall a pipeline process of the processor core 20. Once the target program counter signal completes, the pipeline stall request signal is negated to resume the pipeline process.

The tracer 32 receives a trigger request from the instruction/data address break circuit 31 or from the processor bus break circuit 33. The tracer 32 receives the bit TM of the register DCR and the debug enable signal DBGE*. If the signal DBGE* is asserted to low, it indicates that the debugger 60 is valid.

The tracer 32 converts program counter trace information provided by the processor core 20 under the normal mode into a one-bit program counter output TPC and a 3-bit status signal PCST[2:0], which are supplied to the debugger 60.

The signals PCST[2:0] and TPC will be explained.

a) PCST[2:0]

The execution state of an instruction is carried by the signal PCST[2:0] at the rate of a bit per clock period. (0: low, 1: high)

111: pipeline stall state (STL)

This state indicates that the execution of an instruction has not been finished when there is no trace trigger request.

110: branch/jump taken state (JMP) (with program counter output)

This state indicates that a taken branch or jump instruction has been executed, and the target address thereof is going to be carried by the signal TPC.

101: branch/jump taken state (BRT) (without program counter output)

This state indicates that a taken branch or direct jump instruction has been executed, and no target address is carried by the signal TPC.

100: exception state (EXP) (with exception vector code output)

This state indicates that an exception has occurred and that an exception vector code is going to be carried by the signal TPC.

011: sequential execution state (SEQ) (instruction execution)

This state indicates that an instruction has been executed not under the state JMP, BRT, or TSQ. This state is also established when a branch instruction has not been taken.

010: trace trigger output state (TST) in pipeline stall

This state indicates that an address trace trigger or processor bus trace trigger has occurred in a clock where an instruction is still being executed.

001: trace trigger output state (TSQ) in execution

This state indicates that an address trace trigger or processor bus trace trigger has occurred in a clock where the execution of an instruction is complete.

000: debug mode (DBM)

This state is unachievable under the normal mode.

The signal TPC is used to provide the target address of a branch or jump instruction. In a clock where the signal PCST[2:0] indicates the state "110" (JMP), the target address is provided from a lower bit A(2) at the rate of a bit per clock period. In a clock where the signal PCST[2:0] indicates the state "100" (EXP), a 3-bit exception vector code is provided from lower bits in order of code(0), code(1), and code(2) at the rate of a bit per clock period. The exception vector address and 3-bit code are as follows:

|  | Vector address | Code (2:0) |
|---|---|---|
| Reset, Nmi | BFC0_0000 | 4(100) |
| UTLB (BEV=0) | 8000_0000 | 0(000) |
| UTLB (BEV=1) | BFC0_0100 | 6(110) |
| Other (BEV=0) | 8000_0080 | 1(001) |
| Other (BEV=1) | BFC0_0180 | 7(111) |

Since a target address is carried by the signal TPC bit by bit in series, the next branch instruction, jump instruction, or exception may occur while the current branch/jump instruction is carried by the signal TPC. The priority of target addresses carried by the signal TPC is as follows:

a) If a new indirect jump instruction occurs while a target program counter signal is being provided, this target program counter signal is terminated, and a target program counter signal for the new indirect jump instruction is started.

b) If an exception occurs while a target program counter signal is being provided, the target program counter signal is suspended, the 3-bit vector number of the exception is provided, and thereafter, the suspended signal is resumed.

c) If a new direct jump or branch instruction occurs while a target program counter signal is being provided, the target address of the direct jump or branch instruction is not provided. Only when the target program counter signal is not being provided, a target program counter signal for the direct jump or branch instruction is provided.

Examples of program counter tracing outputs will be explained with reference to the drawings.

(Example 1) Program counter tracing of branch instruction

Figure 30:
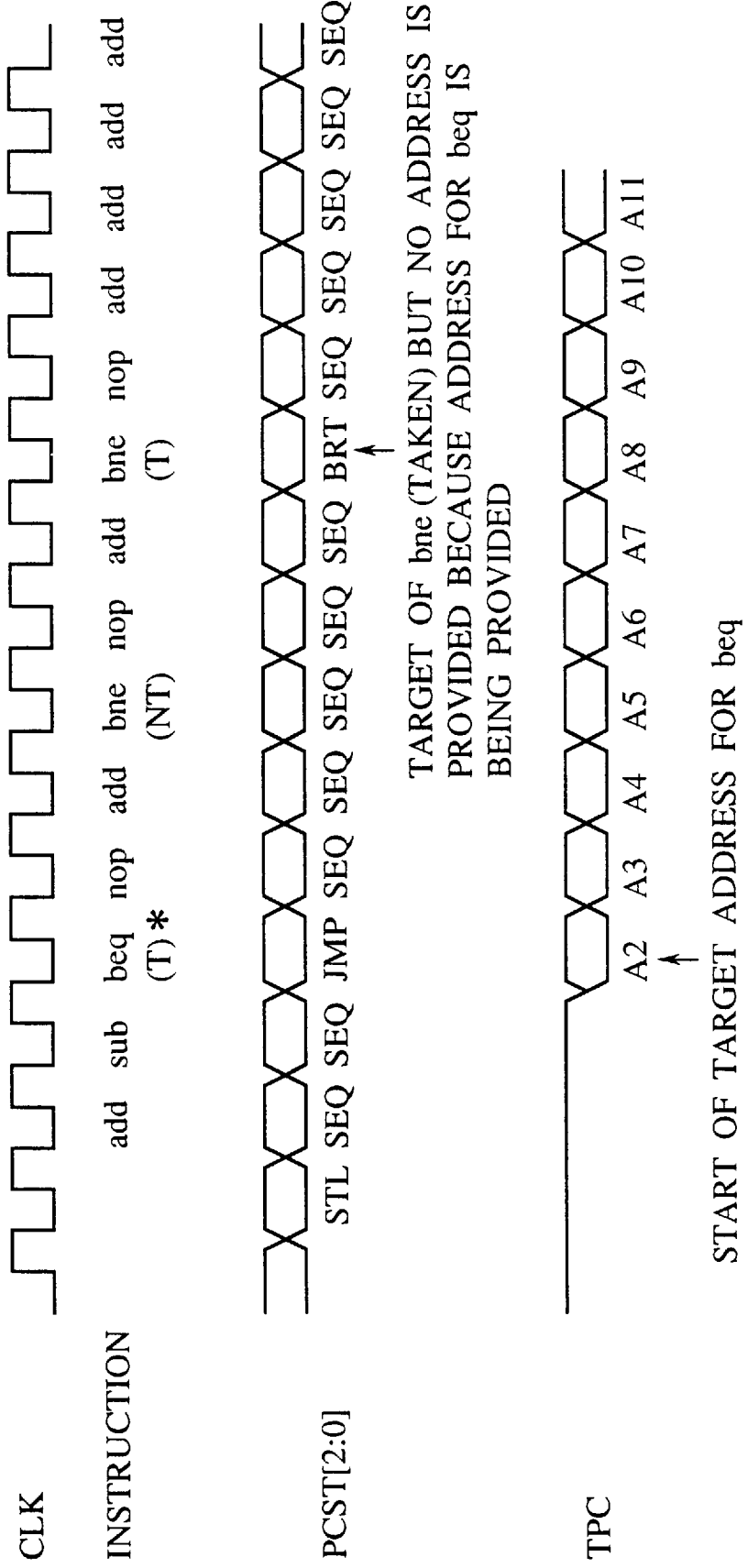
FIG. 30 is a timing chart showing a program counter output according to a branch instruction.

FIG. 30 shows an example of a program counter tracing signal for a branch instruction.

When a first taken branch instruction "beq" is executed, the output signal TPC is not carrying a target program counter signal. Accordingly, the signal PCST[2:0] indicates the state JMP, and the signal TPC start carrying a target program counter signal for the instruction "beq." In response to a not-taken branch instruction "bne," the signal PCST[2:0] indicates the code SEQ. In response to a second taken branch instruction "bne," no target program counter signal is carried by the signal TPC because the signal TPC is carrying the target program counter signal for the first branch instruction "beq." At this time, the signal PCST[2:0] indicates the state BRT.

(Example 2) Program counter tracing of indirect jump instruction

Figure 31:
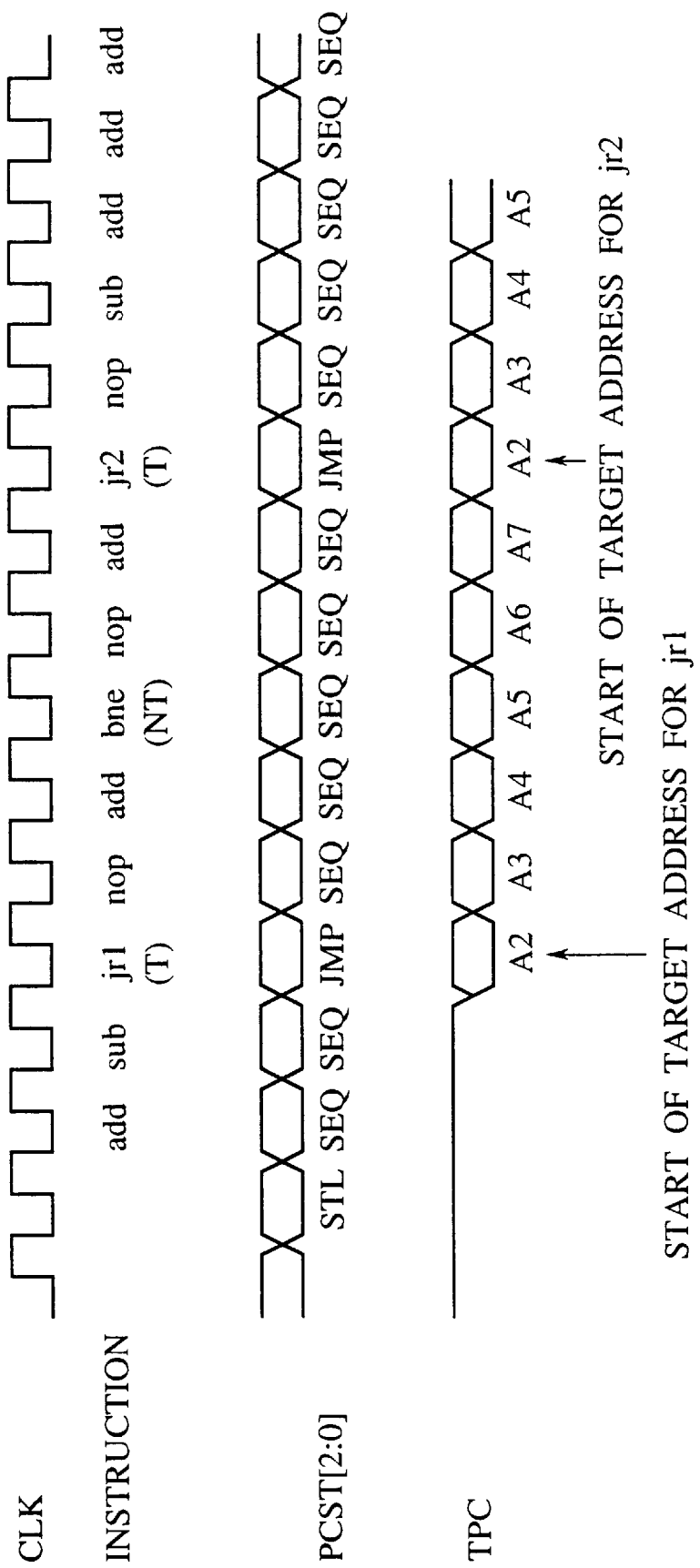
FIG. 31 is a timing chart showing a program counter output according to an indirect jump instruction.

FIG. 31 shows an example of a program counter tracing signal for an indirect jump instruction.

In response to a first indirect jump instruction "jr1," the signal PCST[2:0] indicates the state JMP, and the signal TPC starts to carry a target program counter signal. In response to a not-taken branch instruction "bne,", the signal PCST[2:0] indicates the state SEQ. In response to a second indirect jump instruction "jr2," the signal TPC stops to carry the target program counter signal for the first indirect jump instruction "jr1" and starts to carry a target program counter signal for the second instruction "jr2." At this time, the signal PCST[2:0] indicates the state JMP.

(Example 3) Program counter tracing of exception and indirect jump instruction

Figure 32:
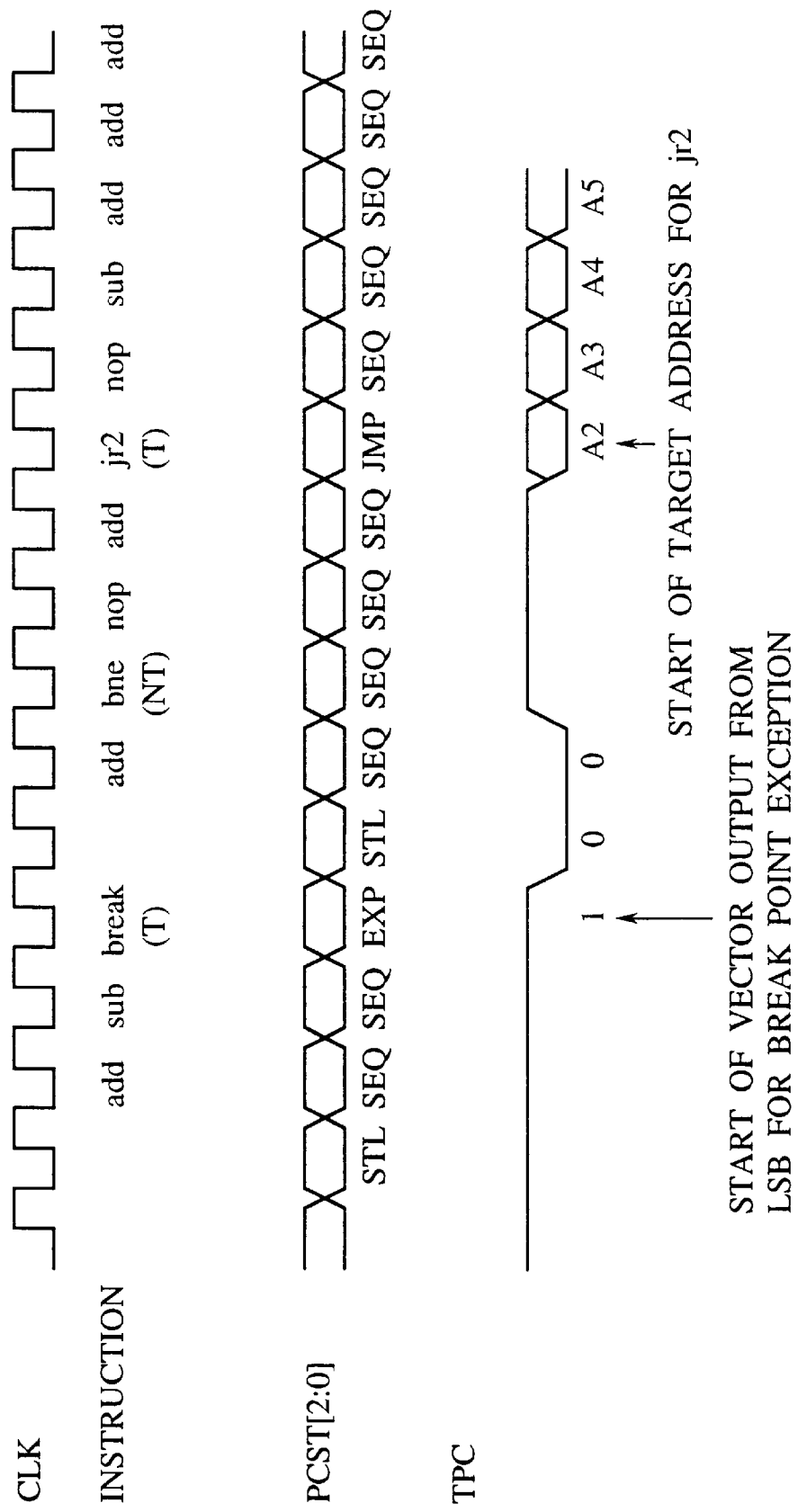
FIG. 32 is a timing chart showing a program counter output according to an exception and an indirect jump instruction.

FIG. 32 shows an example of a program counter tracing for an exception and indirect jump instruction.

In response to a software break instruction "break," an exception occurs, and the signal PCST[2:0] indicates the state EXP. At this time, the signal TPC starts to carry an exception vector code. At a not-taken branch instruction "bne," the signal PCST[2:0] indicates the state SEQ. At an indirect jump instruction "jr2," the signal TPC carries a target program counter signal for this instruction "jr2," and the signal PCST[2:0] indicates the state JMP The trace trigger state TSQ or TST of the signal PCST [2:0] will be explained.

When the coincidence of an address and data occurs in a bus cycle, an instruction/data address break or a processor bus break occurs to cause the signal PCST[2:0] to indicate the state TSQ or TST.

When an instruction address trace trigger request, data address trace trigger request, or processor bus trace trigger request is made, the signal PCST[2:0] indicates the state TSQ or TST. If the signal PCST[2:0] indicates the state JMP, BRT, or EXP, the state TSQ or TST will be delayed. If there is no trace trigger request, the signal PCST[2:0] may indicate the state TSQ or TST in a clock period where the signal PCST[2:0] is going to indicate the state SEQ or STL.

(a) Instruction/data address trace trigger

When an instruction/data address trace trigger occurs, the signal PCST[2:0] indicates the state TSQ. If a trace trigger is caused by a taken branch instruction, a jump instruction, or an instruction that does not cause the signal PCST[2:0] to indicate the state SEQ, the output of the trace trigger is delayed. If there is no trace trigger request, the signal PCST[2:0] indicates the state TSQ or TST in a clock where the signal PCST[2:0] is scheduled to indicate the state SEQ or STL.

(Example 1) Example of instruction/data address trace trigger

Figure 33:
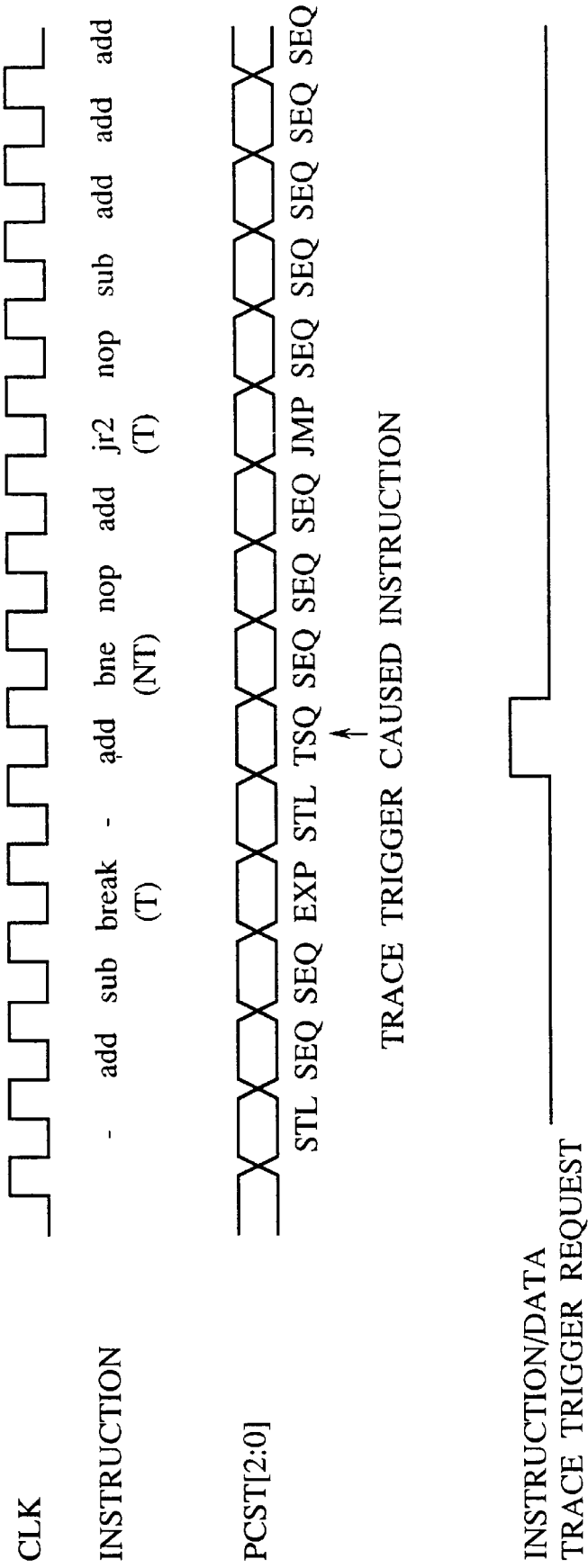
FIG. 33 is a timing chart showing an instruction/data address trace trigger.

FIG. 33 shows an example of an instruction/data address trace trigger.

In response to an instruction "add" that causes an instruction trace trigger or a data address trace trigger, the signal PCST[2:0] indicates the state TSQ.

(Example 2) Example of instruction/data address trace trigger due to exception

Figure 34:
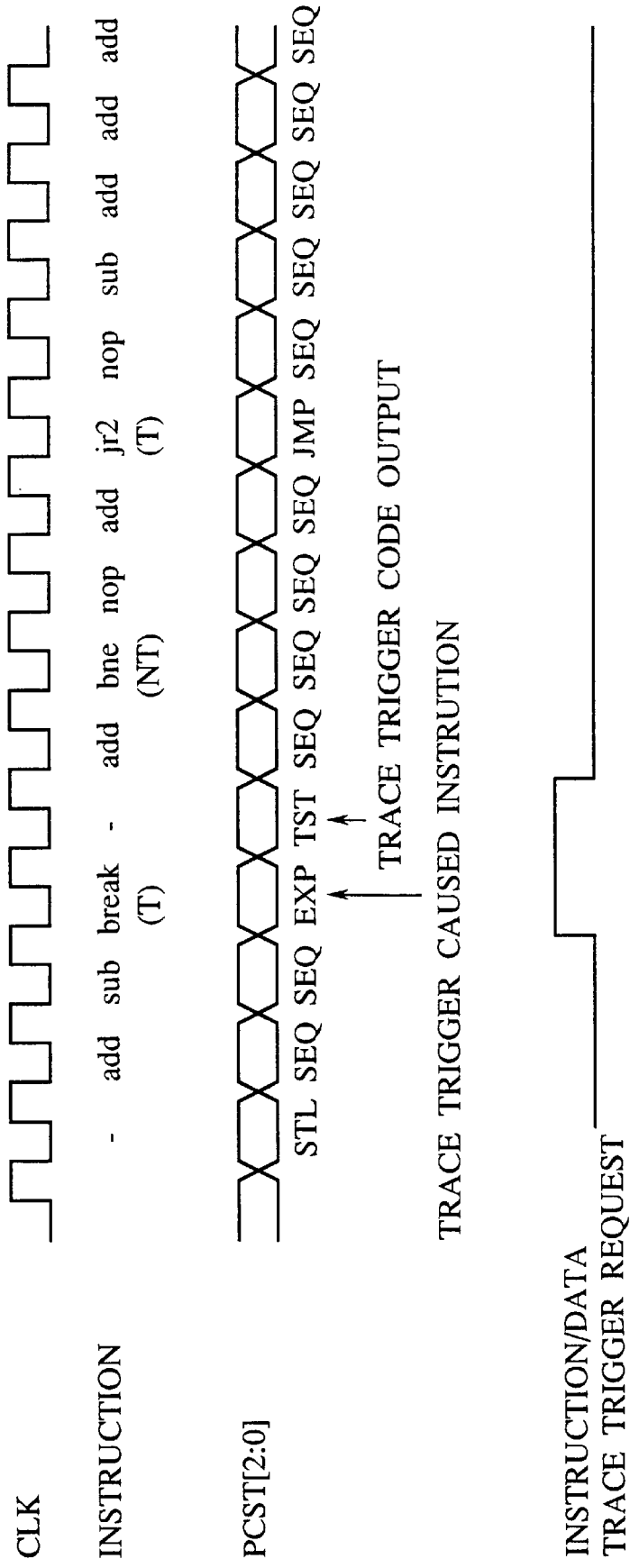
FIG. 34 is a timing chart showing an instruction/data address trace trigger generated in response to an exception generating instruction.

FIG. 34 shows an example of an instruction/data address trace trigger due to an exception.

If a software break instruction "break" causes an instruction address trace trigger or a data address trace trigger, the signal PCST[2:0] indicates the state EXP, and in the next clock, the trace trigger state TST for a pipeline stall.

Figure 35:
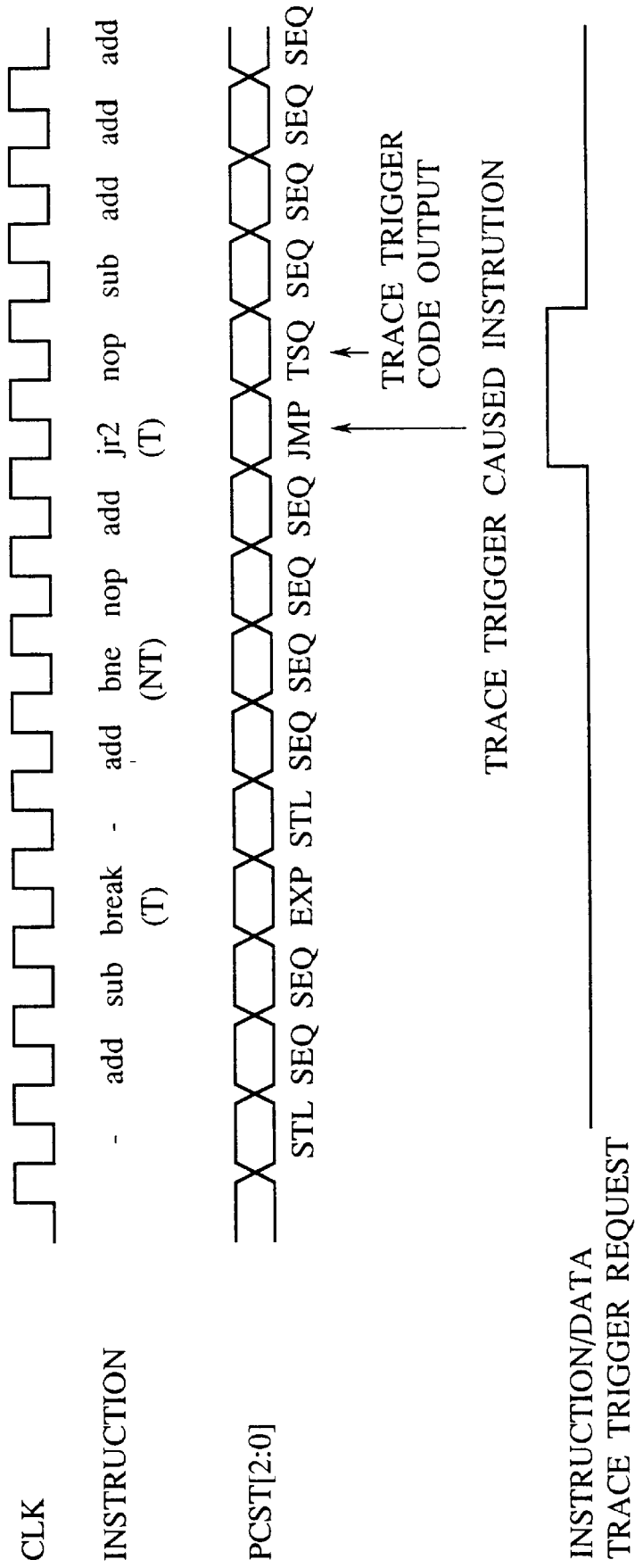
FIG. 35 is a timing chart showing an instruction/data address trace trigger generated in response to an indirect instruction.

(Example 3) Example of instruction/data address trace trigger due to indirect Jump instruction FIG. 35 shows an example of an instruction/data address trace trigger due to an indirect jump instruction.

When an indirect jump instruction "jr2" causes an instruction address trace trigger or a data address trace trigger, the signal PCST[2:0] indicates the state JMP, and in the next clock, the trace trigger state TSQ for an instruction execution condition.

(b) Processor bus trace trigger

When a processor bus trace trigger request is made, the signal PCST[2:0] indicates the state TSQ or TST. If the signal PCST[2:0] is indicating the state JMP, BRT, or EXP, the trace trigger state TSQ or TST is delayed. When there is no trace trigger request, the signal PCST[2:0] indicates the state TSQ or TST in a clock where the signal PCST[2:0] is scheduled to indicate the state SEQ or STL.

The generation of the debug mode state DBM will be explained.

If the processor core 20 causes a debug exception or a debug reset, the debug mode signal DM is asserted to high to enter the debug mode. Then, the tracer 32 provides the signal PCST[2:0] indicating the debug mode state DBM.

Figure 36:
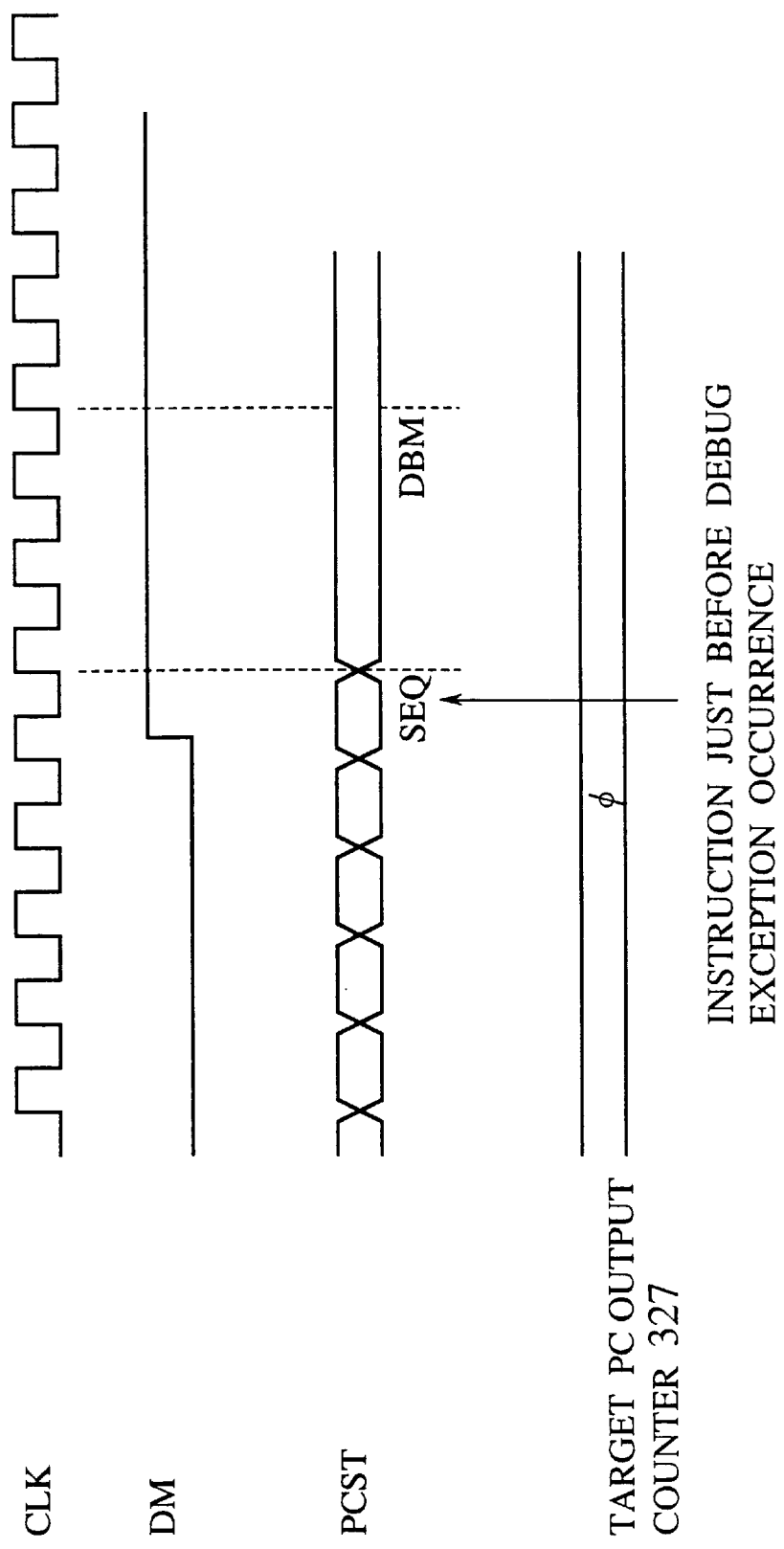
FIG. 36 is a timing chart showing an output signal PCST[2:0] when a debug exception occurs.

FIG. 36 shows the output timing of the signal PCST[2:0] when a debug exception occurs.

When no target program counter signal is provided, the debug mode starts Just after the end of the instruction that has caused the debug exception. The program counter trace information Just before the occurrence of the debug exception is provided.

Figure 37:
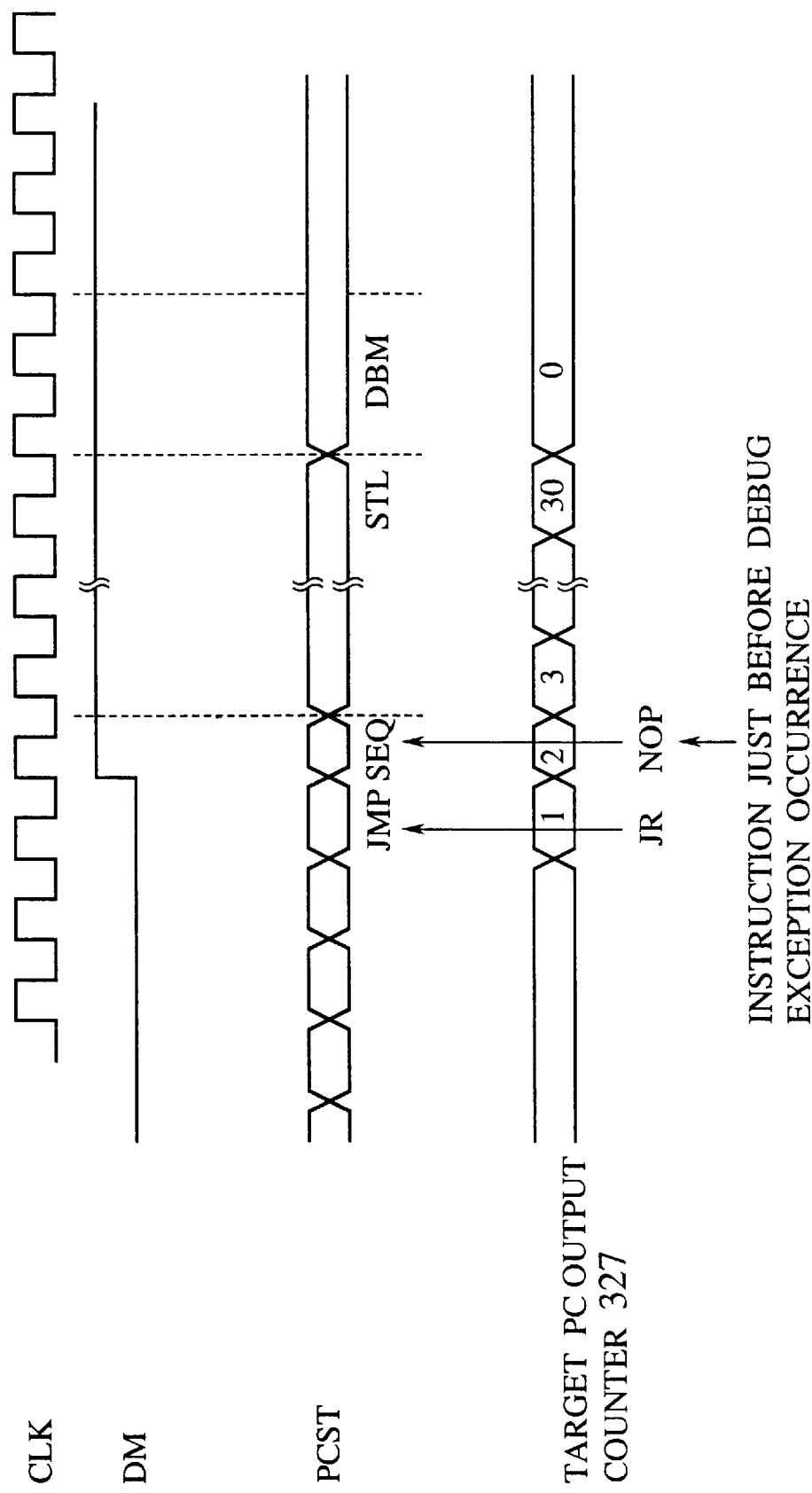
FIG. 37 is a timing chart showing the signal PCST[2:0] when a debug exception occurs while the output of a target program counter is being provided.

FIG. 37 shows the timing of the signal PCST[2:0] when a target program counter signal is being provided when a debug exception occurs.

In this case, the debug mode starts after the completion of the target program counter signal. Program counter trace information up to an instruction just before the occurrence of the debug exception is provided. While the target program counter signal is being provided, the signal PCST[2:0] indicates the state STL.

Figure 38:
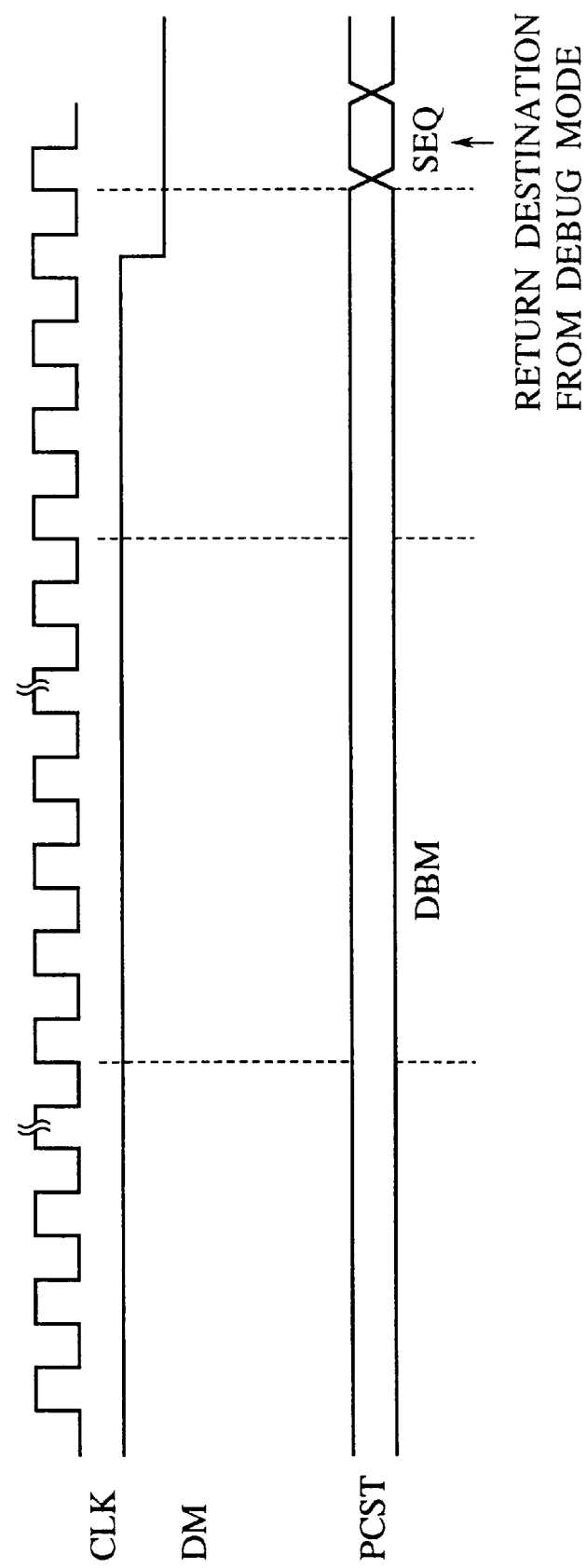
FIG. 38 is a timing chart showing the signal PCST[2:0] when a normal mode is restored after a debug mode.

FIG. 38 shows the timing of the signal PCST[2:0] when returning from the debug mode.

The debug mode continues until a branch delay slot instruction of a return instruction DERET from a debug exception or debug mode is provided. The normal mode starts from an instruction that is a target of the instruction DERET, to enable program counter tracing.

Returning to FIG. 29, the tracer 32 will be explained.

The tracer 32 has a program counter trace controller 321, a target program counter shift register 322, an exception vector coder 323, an exception code shift register 324, and a serector 325.

The controller 321 has an exception code output status bit 326 and a target program counter output counter 329.

The operation of the tracer 321 will be explained.

Table 3 shows the outputs of the signal PCST[2:0] when the bit TM of the register DCR is 0. In Table 3, "1" indicate an active state and "x" indicates a "don't care" state.

TABLE 3

| | | | | | | | | | | | | | |
|---|---|---|---|---|---|---|---|---|---|---|---|---|---|
| Debug mode signal DM | 0 | 0 | 0 | 0 | 0 | 0 | 0 | 0 | 0 | 0 | 0 | 1 | 1 |
| Indirect jump signal | 0 | 0 | 0 | 0 | 0 | 0 | 1 | 0 | 0 | 0 | 0 | x | x |
| Direct jump signal | 0 | 0 | 0 | 0 | 0 | 1 | 0 | 0 | 0 | 0 | 0 | x | x |
| Branch taken signal | 0 | 0 | 0 | 0 | 1 | 0 | 0 | 0 | 0 | 0 | 0 | x | x |
| Exception occurrence signal | 0 | 0 | 1 | 0 | 0 | 0 | 0 | 0 | 0 | 0 | 0 | x | x |
| Pipeline execution signal | 0 | 1 | 1 | 1 | 1 | 1 | 1 | 0 | 1 | 1 | 1 | x | x |
| Trigger request signal | 0 | 0 | x | x | x | x | x | x | 1 | 1 | 1 | 0 | 0 |
| Providing TPC or exception code (internal state) | x | x | x | 1 | 0 | 1 | 0 | x | x | x | x | 1 | 0 |
| PCST[2:0] output | STL | SEQ | EXP | BRT | JMP | BRT | JMP | JMP | TST | TSQ | TST | STL | DBM |

In this table, the trigger request signal is the OR of an instruction address trace trigger request signal, data address trace trigger request signal, and processor bus trace trigger request signal.

When the 5-bit counter 327 is not 0, it indicates that the signal TPC is being provided. When the exception code output status bit 326 is 1, an exception vector code is being provided. In Table 3, the internal state "outputting TPC or exception code" will be 1 if the counter 327 is not 0, or if the exception code output status bit 326 is 1. The counter 327 is updated as follows:

(1) When the signal TPC is not carrying a target program counter signal, or when a new program counter signal is going to be provided, the counter 327 is cleared to 0.

(2) When the signal TPC is carrying an exception vector, the internal status indicating that the program counter signal is being provided and the counter 327 are kept as they are.

(3) When the counter 327 reaches 30, the counter 327 is zeroed. This indicates that the output of the target program counter is complete.

(4) In a case other than the above cases (1), (2), and (3), the counter 327 is incremented by one. At this time, the signal PTC is carrying the target program counter signal.

When an exception occurs, the exception code output status bit 326 asserts, for three clock periods, an internal state indicating that an exception code is being provided. When the status bit 326 is asserted, an exception code shift signal and exception code output switch signal are asserted. An exception code load signal is asserted when the signal PCST[2:0] indicates the state EXP. At this time, the output of the exception vector coder 323 is loaded to the exception code shift register 324. A target program counter load signal is asserted, and the signal PCST[2:0] indicates the state JMP. Then, the value of the target program counter is loaded to the target program counter shift register 322. The target program counter shift signal is asserted when the counter 327 is not 0 and when the status bit 326 is not asserted.

When the bit TM of the register DCR is 1, a program counter trace is completely carried out. If the signal DBGE* is asserted, the bit TM is set, and the next indirect jump occurs while the target program counter signal for an indirect jump is being provided, the controller 321 asserts a pipeline stall request signal to stall a pipeline process of the processor core 20. When the current target program counter is completely provided, the pipeline stall request signal is negated to resume the pipeline process.

Table 4 shows the output of the signal PCST[2:0] with the bit TM being 1. In Table 4, "1" indicates an active state, and "x" indicates a "don't care" state.

TABLE 4

| | | | | | | | | | | | | | |
|---|---|---|---|---|---|---|---|---|---|---|---|---|---|
| Debug mode signal DM | 0 | 0 | 0 | 0 | 0 | 0 | 0 | 0 | 1 | 1 | | | |
| Indirect jump signal | 0 | 0 | 0 | 0 | 0 | 1 | 0 | 0 | x | x | | | |
| Direct jump signal | 0 | 0 | 0 | 0 | 1 | 0 | 0 | 0 | x | x | | | |
| Branch taken signal | 0 | 0 | 0 | 1 | 0 | 0 | 0 | 0 | x | x | | | |
| Exception occurrence signal | 0 | 0 | 1 | 0 | 0 | 0 | 0 | 0 | x | x | | | |
| Pipeline execution signal | 0 | 1 | 1 | 1 | 1 | 1 | 0 | 1 | x | x | | | |
| Trigger request signal | 0 | 0 | x | x | x | x | 1 | 1 | 1 | 0 | | | |
| Providing target program counter or exception code (internal state) | x | x | x | 1 | 0 | 1 | 0 | 1 | 0 | x | x | x | 1 | 0 |
| PCST[2:0] output | STL | SEQ | EXP | BRT | JMP | BRT | JMP | STL | JMF | TST | TSQ | TST | STL | DBM |
| Pipeline stall request signal | 0 | 0 | 0 | 0 | 0 | 0 | 0 | 1 | 0 | 0 | 0 | 0 | 0 | 0 |

When an indirect jump signal becomes active due to the execution of an indirect jump while the target program counter signal or exception code is being provided, the pipeline stall request signal to the processor core 20 is activated. The internal state indicating that the target program counter signal or exception code is being provided becomes active for 30 clock periods after the start of the target program counter signal.

The target program counter shift register 322 loads the value of a target program counter output when the target program counter load signal from the controller 321 is asserted. The register 322 shifts its value from MSB toward LSB by one bit when the target program counter shift signal from the controller 321 is asserted.

The exception vector coder 323 encodes an exception vector address according to bits A[29], A[8], and A[7] of the vector address as follows:

| | Vector address | (A29, A8, A7) | Code |
|---|---|---|---|
| Reset, Nmi | BFC0_0000 | (100) | 4 |
| UTLB (BEV=0) | 8000_0000 | (000) | 0 |
| UTLB (BEV=1) | BFC0_0100 | (110) | 6 |
| Other (BEV=0) | 8000_0080 | (001) | 1 |
| Other (BEV=1) | BFC0_0180 | (111) | 7 |

The coder 323 provides the exception code shift register 324 with the address bits A[29], A[8], and A[7] of the target program counter output.

The register 324 loads the exception vector code from the coder 323 when an exception code load signal from the controller 321 is asserted. When an exception code shift signal from the controller 321 is asserted, the value of the exception code shift register 324 is shifted from MSB toward LSB by one bit.

The selector 325 provides the signal TPC with the LSB of the register 324 when an exception code output switch signal from the controller 321 is asserted. When the exception code output switch signal is negated, the selector 325 provides the signal TPC with the LSB of the register 322.

The operation of the tracer 32 will be explained with reference to timing charts.

Figure 39:
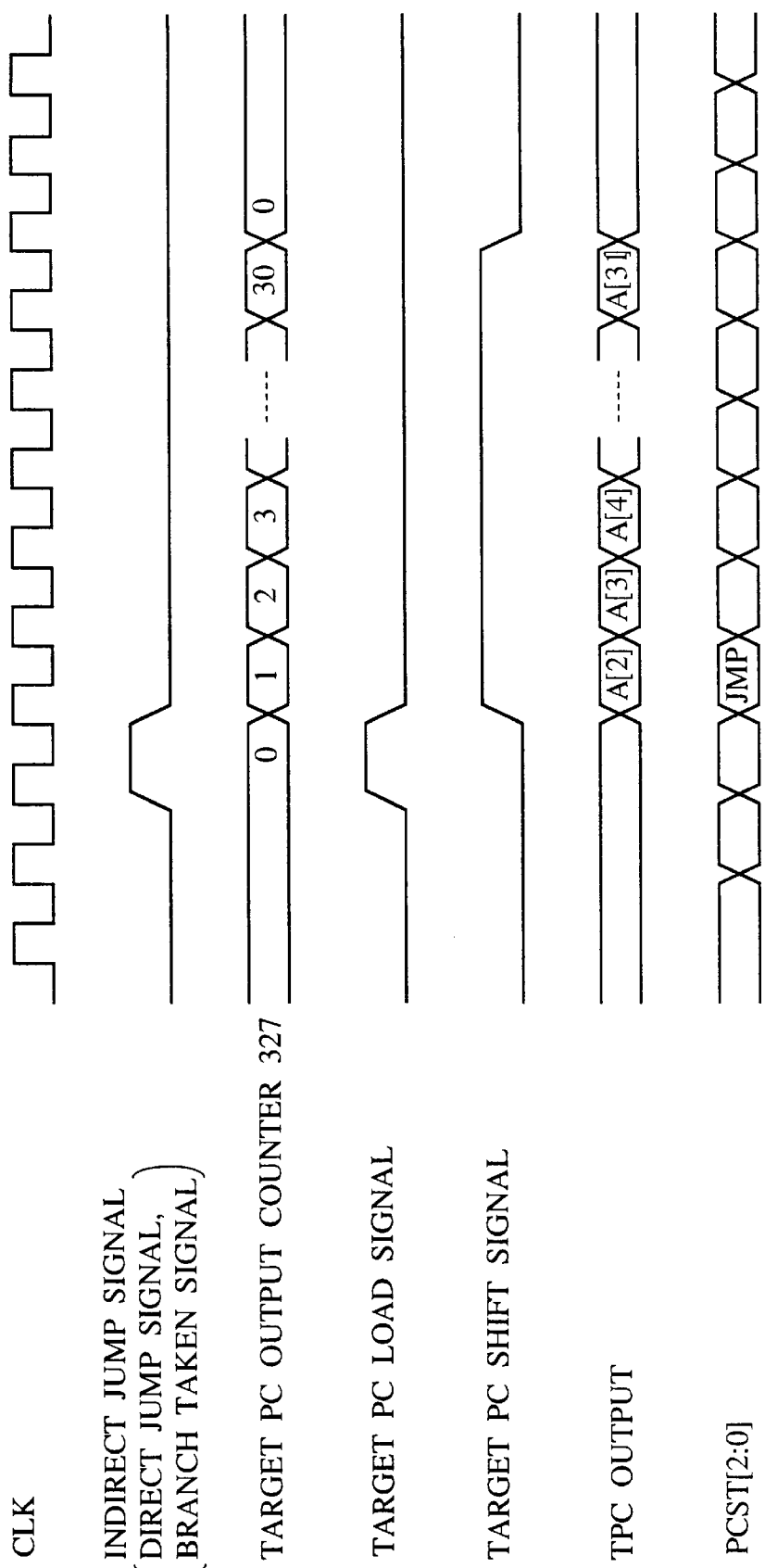
FIG. 39 is a timing chart showing the output of a target program counter.

FIG. 39 shows the operation of the tracer 32 when a target program counter signal is provided.

When the counter 327 holds 0 and when an indirect jump signal, direct jump signal, or taken branch signal is asserted, the controller 321 asserts the target program counter load signal.

In the next clock, the LSB, i.e., A[2] of the target address loaded to the register 322 is supplied to the signal TPC. At the same time, the signal PCST[2:0] indicates the state JMP, and the controller 321 asserts the target program counter shift signal. As a result, the register 322 is shifted by one bit from MSB toward LSB, and the bit A[3] is provided to the signal TPC in the next clock. The target program counter shift signal is continuously asserted to provide the signal TPC with the program counter output until the counter 327 counts 30. When the counter 327 counts 30, the counter 327 is cleared to 0, and the target program counter shift signal is negated to terminate the target program counter output to the signal TPC.

Figure 40:
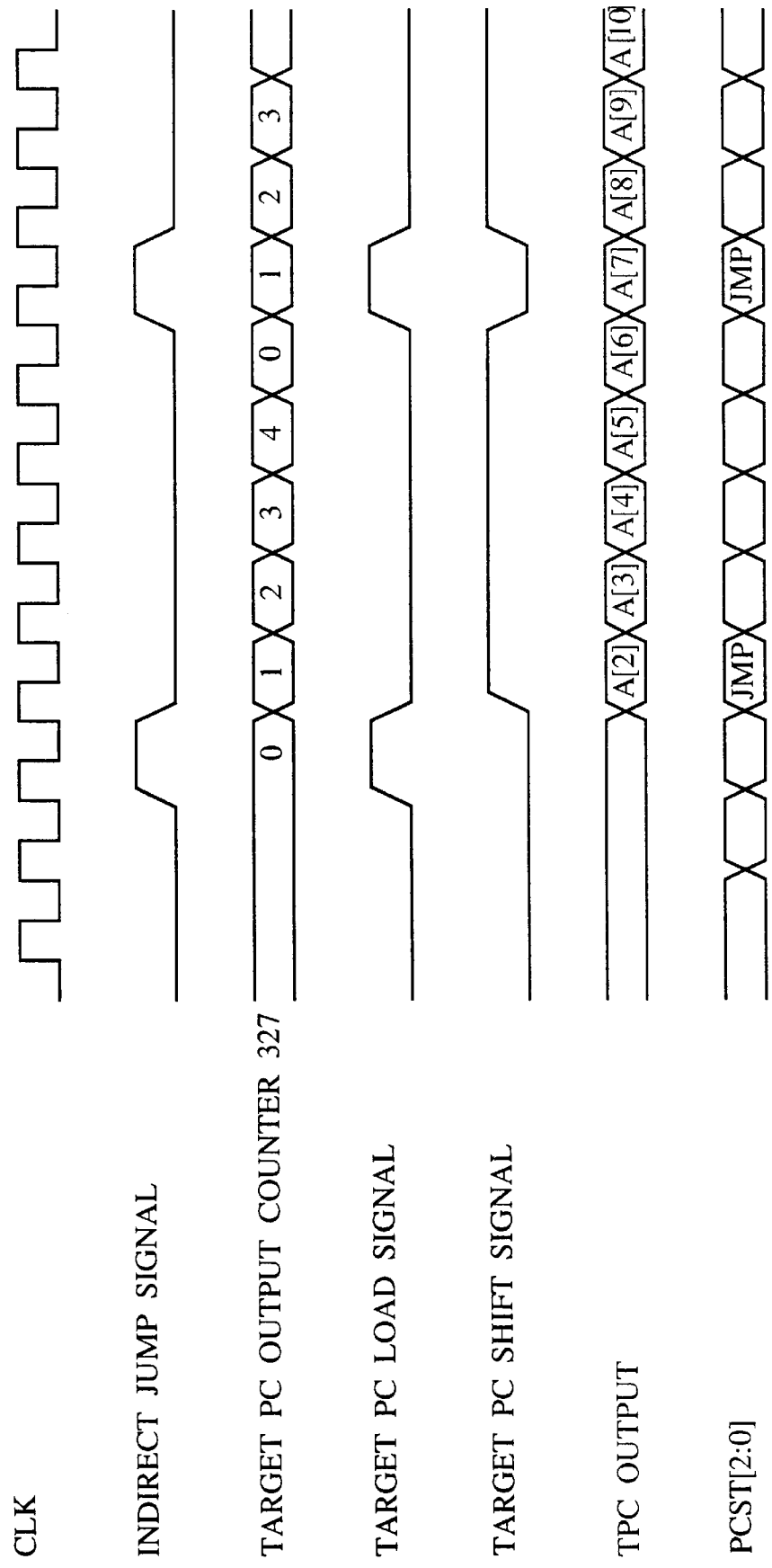
FIG. 40 is a timing chart showing the next indirect jump occurred while the output of a target program counter is being provided.

FIG. 40 shows the operation of the tracer 32 when the next indirect jump occurs while a target program counter signal is being provided.

When the second indirect jump occurs, the counter 327 is cleared to 0, and the target program counter load signal is asserted. In the next clock, the LSB, i.e., bit A[2] of the target address loaded to the register 322 is provided to the signal TPC. At the same time, the signal PCST[2:0] indicates the state JMP, and the controller 321 asserts the target program counter shift signal. From the next clock, the target address is provided to the signal TPC every cycle.

Figure 41:
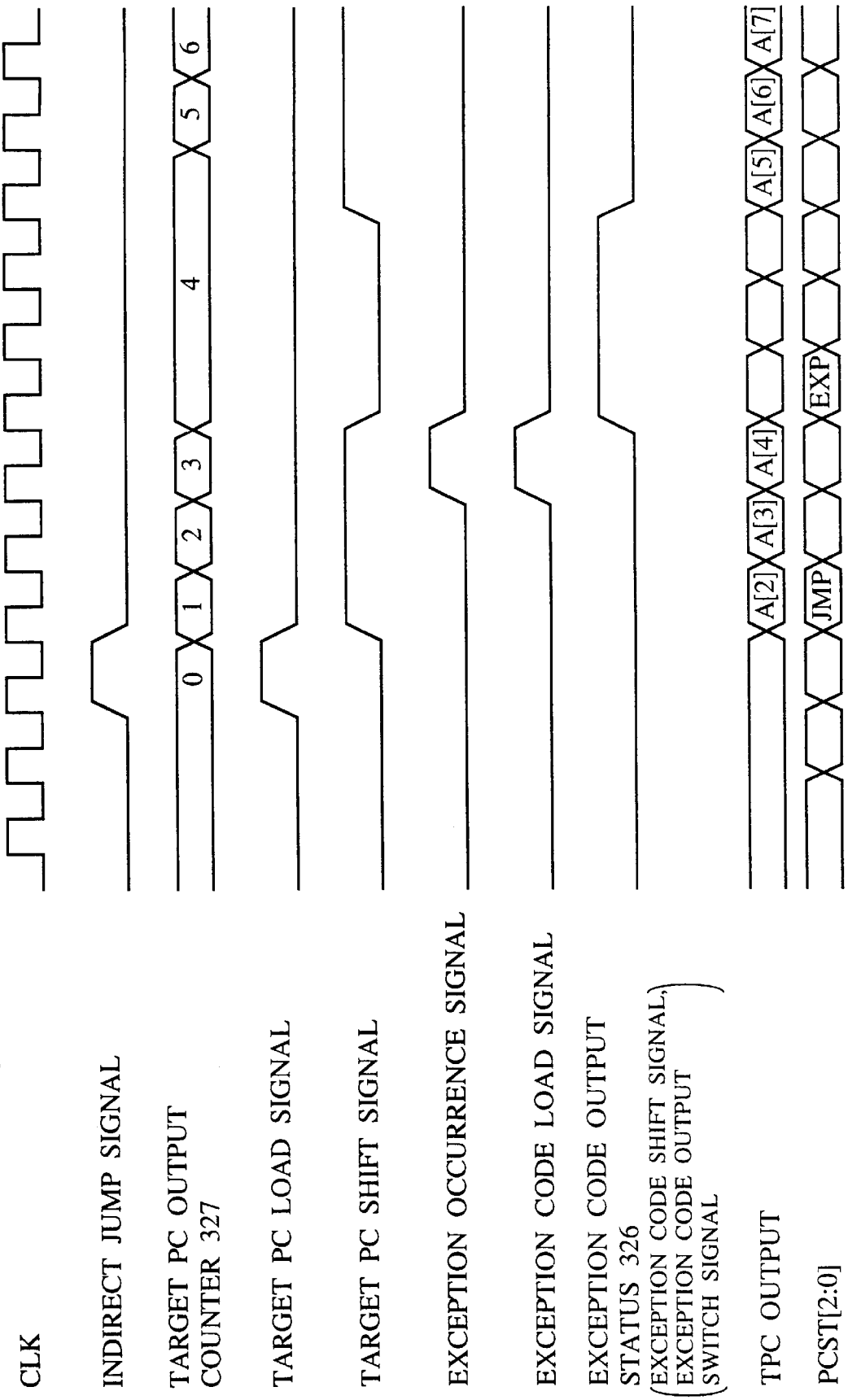
FIG. 41 is a timing chart showing an exception occurred while the output of a target program counter is being provided.

FIG. 41 shows operation timing when an exception occurs while a target program counter signal is being provided.

If the exception occurrence signal is asserted while a target program counter signal is being provided, the exception code load signal is asserted to load the exception code to the exception code shift register 324. From the next clock, the exception code output status bit 326, exception code shift signal, and exception code output switch signal are asserted. The exception code is provided for three clock periods. During this periods, the target program counter shift signal is negated. When the status bit 326 and exception code switch signal are negated, the target program counter signal is again carried by the signal TPC.

Figure 42:
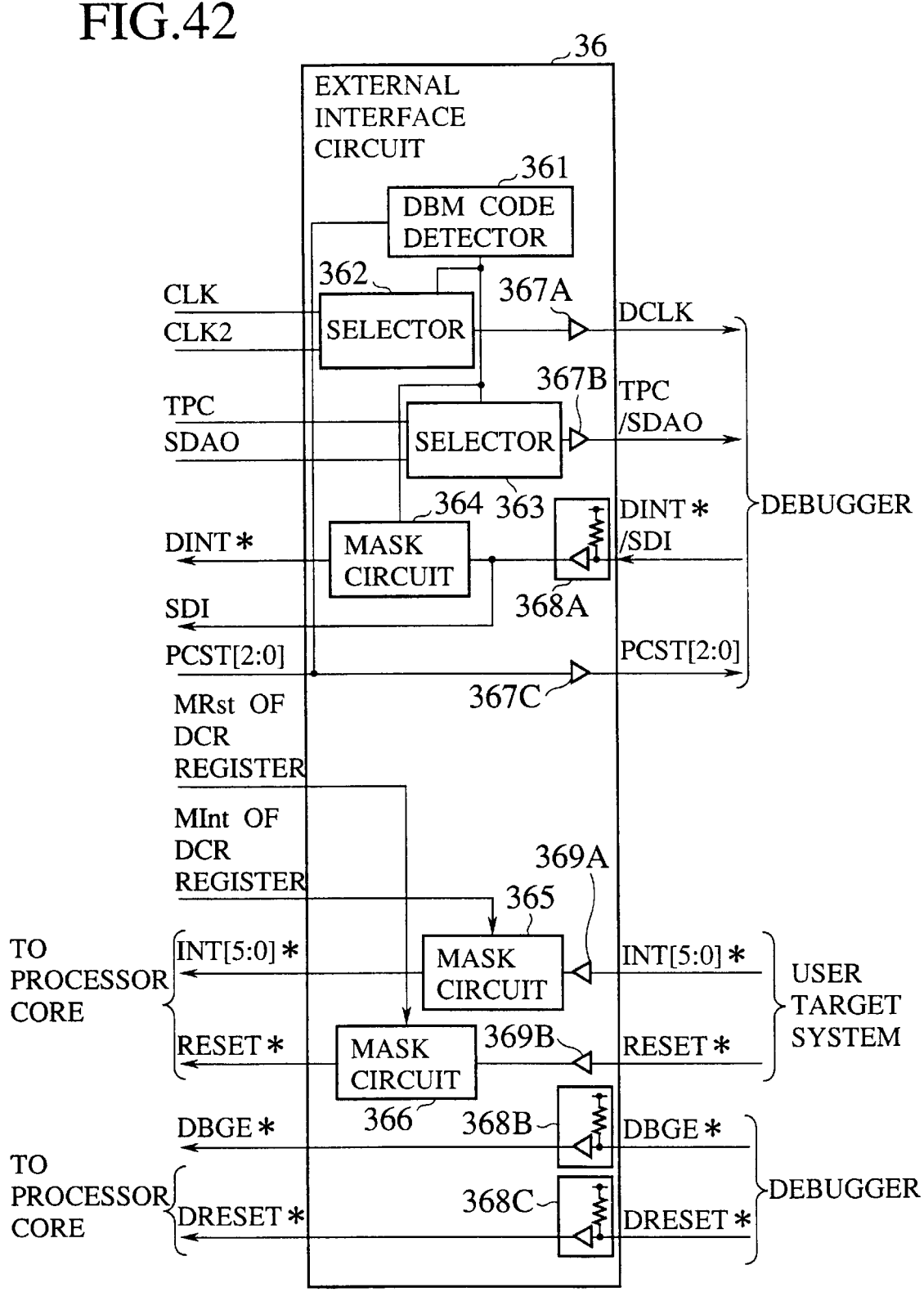
FIG. 42 shows an external interface circuit of the debug module of FIG. 5.

FIG. 42 shows the details of the external interface circuit 36.

The external interface circuit 36 has a DBM code detector 361, selectors 362 and 363, mask circuits 364, 365, and 366, output buffers 367A, 367B, and 367C, pull-up resistor input buffers 368A, 368B, and 368C, and input buffers 369A and 369B.

The DBM code detector 361 asserts an output signal when the signal PCST[2:0] indicates the debug mode state DBM (000).

The selector 362 provides the frequency-divided clock signal CLK2 when the output of the DBM code detector 361 is asserted, i.e., when it is the debug mode, and provides the core clock signal CLK when the output of the DBM code detector 361 is negated, i.e., when it is the normal mode.

The selector 363 provides the output SDA0 of the serial monitor bus circuit 34 when the output of the DBM code detector 361 is asserted, i.e., when it is the debug mode, and provides the signal TPC of the tracer 32 when the output of the DBM code detector 361 is negated, i.e., when it is the normal mode.

In the debug mode, the mask circuit 364 masks the external input signal DINT*/SDI so that the input signal DINT* to the processor core 20 is always negated.

When the bit MInt of the register DCR is 0, the mask circuit 365 sets the signal Int[5:0] to the processor core 20, to mask an interrupt.

When the bit MRst of the register DCR is 0, the mask circuit 366 masks the user reset signal RESET* during the execution of a debug exception handler (the signal DM being high).

The output buffer 367A provides the output of the selector 362 outside as the signal DCLK. The output buffer 367B provides the output of the selector 363 outside as the signal TPC/SDA0. The output buffer 367C provides the signal PCST[2:0] of the tracer 32 outside as the external signal PCST[2:0].

The pull-up resistor input buffer 368A receives the external signal DINT*/SDI. Since this buffer has a pull-up resistor, the output thereof is always high when the external signal DINT*/SDI is disconnected. The pull-up resistor input buffer 368B receives the external signal DBGE*. Since this buffer has a pull-up resistor, the output thereof is always high if the external signal DBGE* is disconnected. The pull-up resistor input buffer 368C receives the external signal DRESET*. Since this buffer has a pull-up resistor, the output thereof is always high if the external signal DRESET* is disconnected.

These external signals DINT*/SDI, DBGE*, and DRESET* are disconnected when the debugger 60 is disconnected. Then, these signals form high-level internal signals, and the functions of the debug module are disabled.

The input buffer 369A receives the external interrupt signal INT[5:0]*. The input buffer 369B receives the external user reset signal RESET*.

Figure 44:
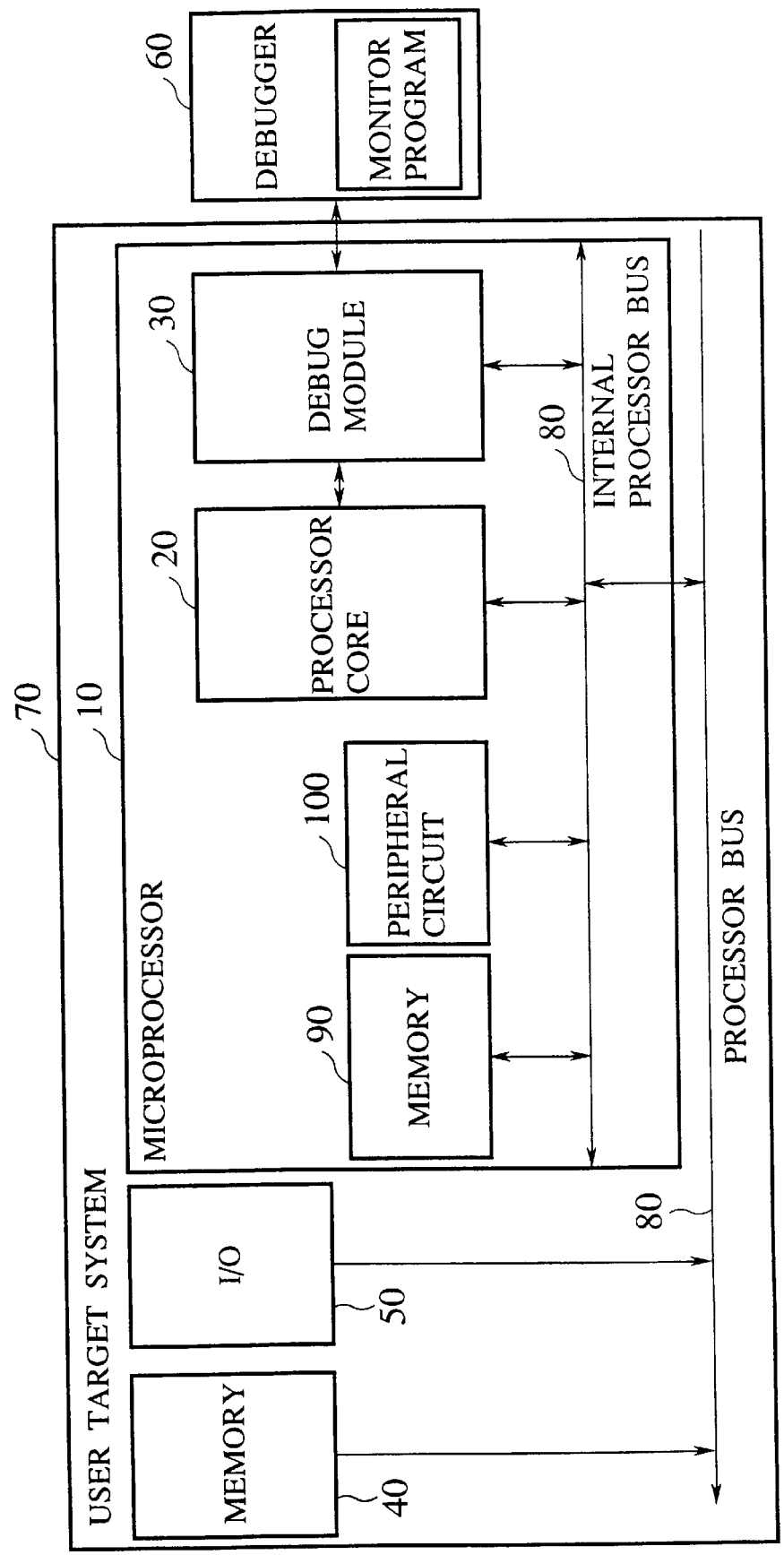
FIG. 44 shows a debug system according to an embodiment of the present invention.

FIG. 44 shows a microprocessor and debug system according to another embodiment of the present invention.

This embodiment is characterized in that the microprocessor 10 incorporates a memory 90 and a peripheral circuit 100. Other arrangements of this embodiment are the same as those of the first embodiment.

A processor core 20 reads a program out of the memory 90 through an internal processor bus 80, executes the read program, reads or writes data from or to the memory 90, and accesses the peripheral circuit 100. Under a debug mode, the processor core 20 executes a monitor program of a debugger 60 through a debug module 30.

If the functions and timing of interface signals of the debug module 30 and debugger 60 are equal to one another, the debugger 60 of the first embodiment will be used for the second embodiment irrespective of the difference of the incorporated memory 90 and peripheral circuit 100.

If the functions of the processor core 20 of the second embodiment are the same as those of the first embodiment, the same monitor program as that of the first embodiment will be used for the second embodiment.

The above two embodiments employ each an instruction/data address break channel and a processor bus break channel. The present invention is not limited to this arrangement but may employ two or more channels. FIG. 43 shows a register IBS involving 15 instruction address break channels.

The above two embodiments employ each a serial monitor bus having a bit width of one. The present invention is not limited to this arrangement. The bit width may be two or more if many microprocessor external signals are used for a serial monitor bus.

The above two embodiments employ each an external signal for carrying the output of a target program counter. The present invention is not limited to this arrangement. The output of a target program counter may be carried by a plurality of external signals if they are available.

According to the above two embodiments, the clock generator 37 halves the frequency of the clock signal CLK for the processor core. The present invention is not limited to this. The frequency of the clock signal for the serial monitor bus circuit may be the same as that of the clock signal CLK or an integer multiple or a power of 2 of that of the clock signal CLK.

As explained above, the present invention is capable of sharing the hardware of a debug tool with many functions and reducing the number of signals connected to the debug tool. The prior art must employ, for example, 30 address signals, 4 byte enable signals, a read signal, a write signal, a read acknowledge signal, a write acknowledge signal, and 32 data signals, i.e., 70 signals in total to connect a user target system to a debugger. On the other hand, the present invention requires only eight signals to connect a user target system to a debugger. This results in minimizing the number of probes and reducing costs.

According to the present invention, a microprocessor on a user target system accesses memories and I/O units, to ease conditions on the timing of a debug tool. Signals that are not connected to the debug tool are not influenced by debugging. The present invention is capable of slowing a communication speed between a debug tool and a microprocessor if the operation speed of the microprocessor is too high.

Figure 1:
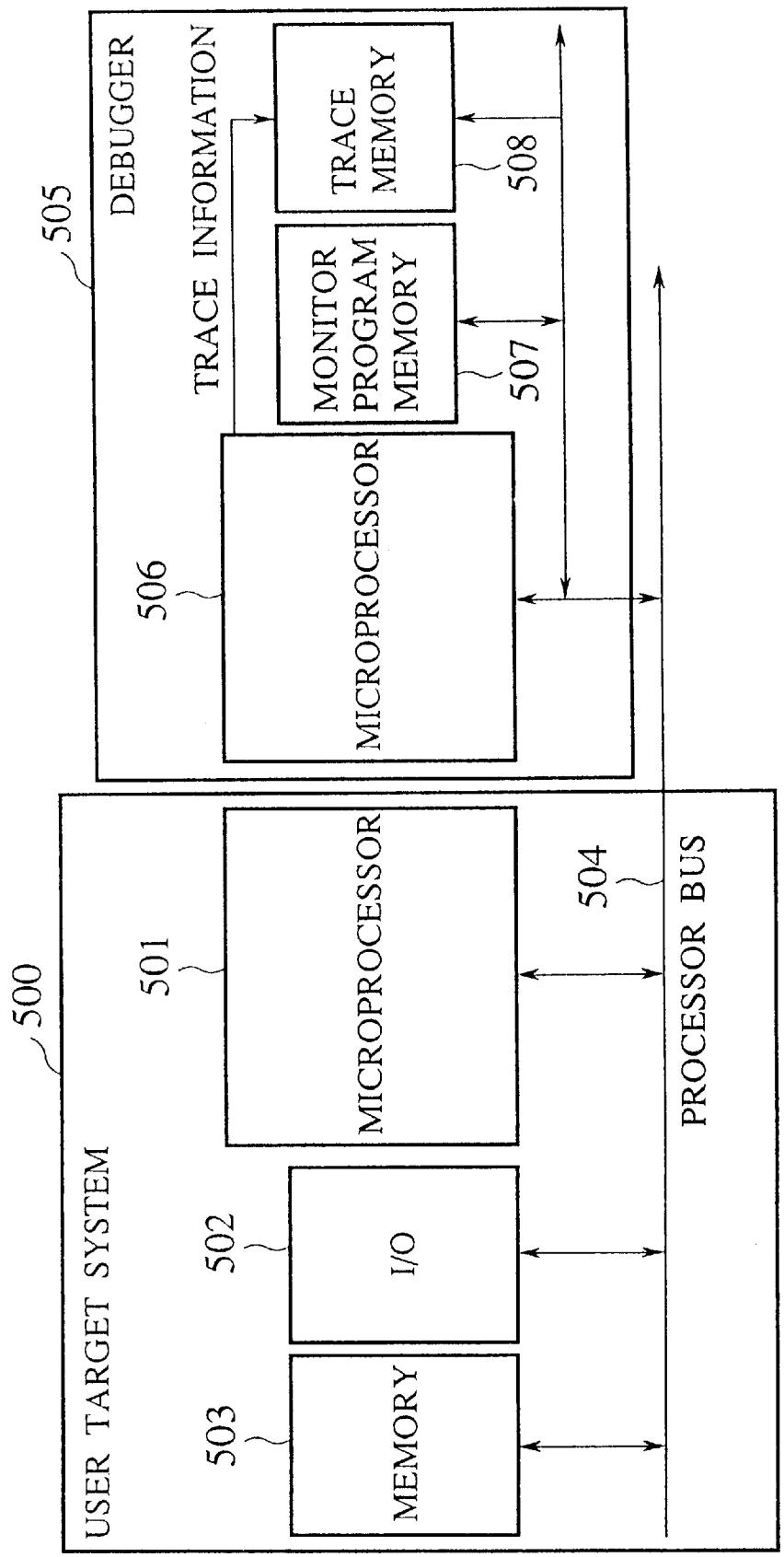
FIG. 1 shows a debug system for debugging a user target system according to a prior art.
Figure 2:
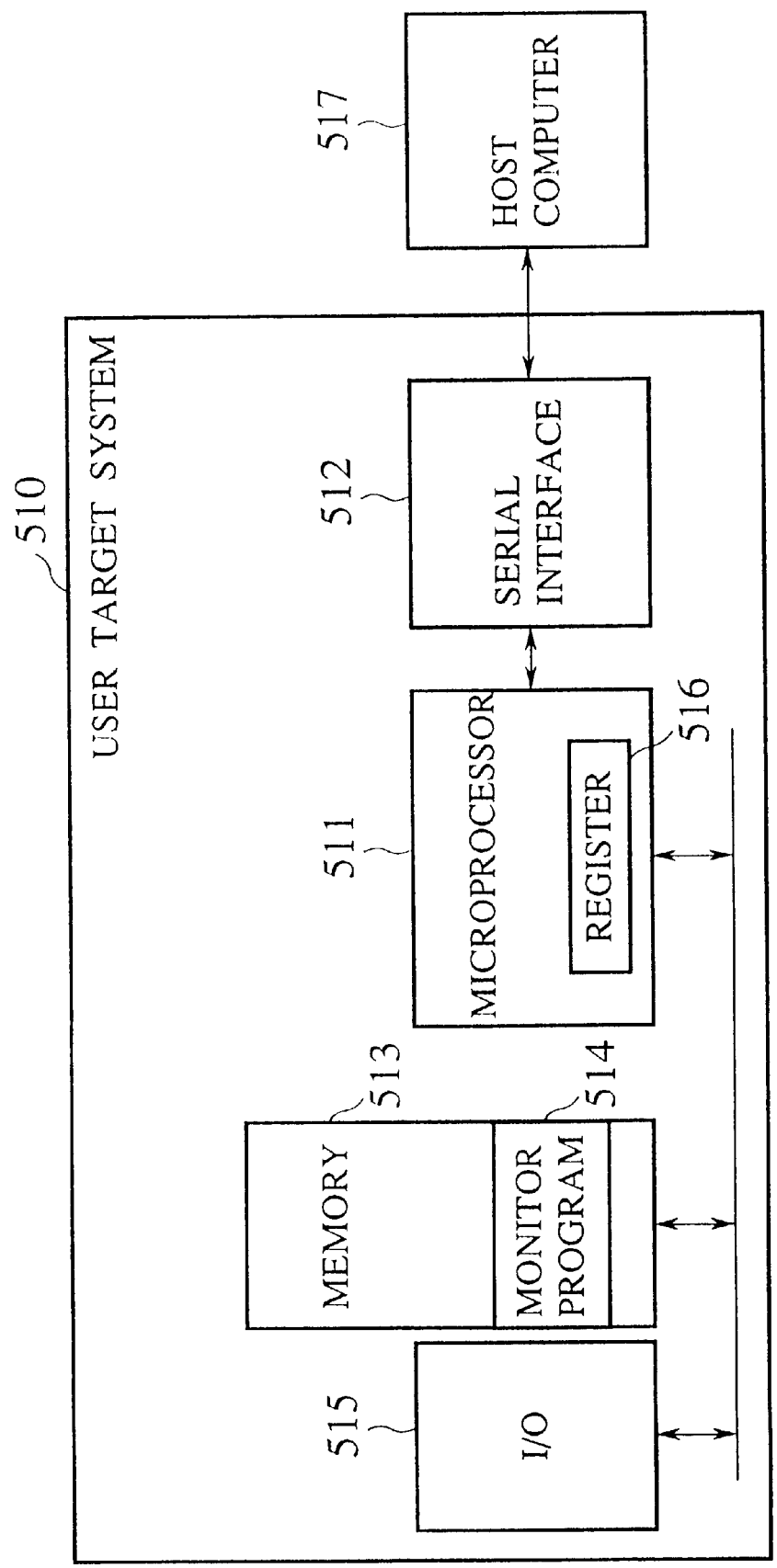
FIG. 2 shows a debug system for debugging a user target system according to another prior art.

Compared with the prior art of FIG. 2, the present invention stores a monitor program in a memory on a debug tool without using user memories. To start monitoring a target system, the present invention employs a dedicated debug exception and debug reset without restricting user interrupts. A user target system is not required to have a serial interface for debugging. The present invention is capable of using a hardware break point.

Figure 3:
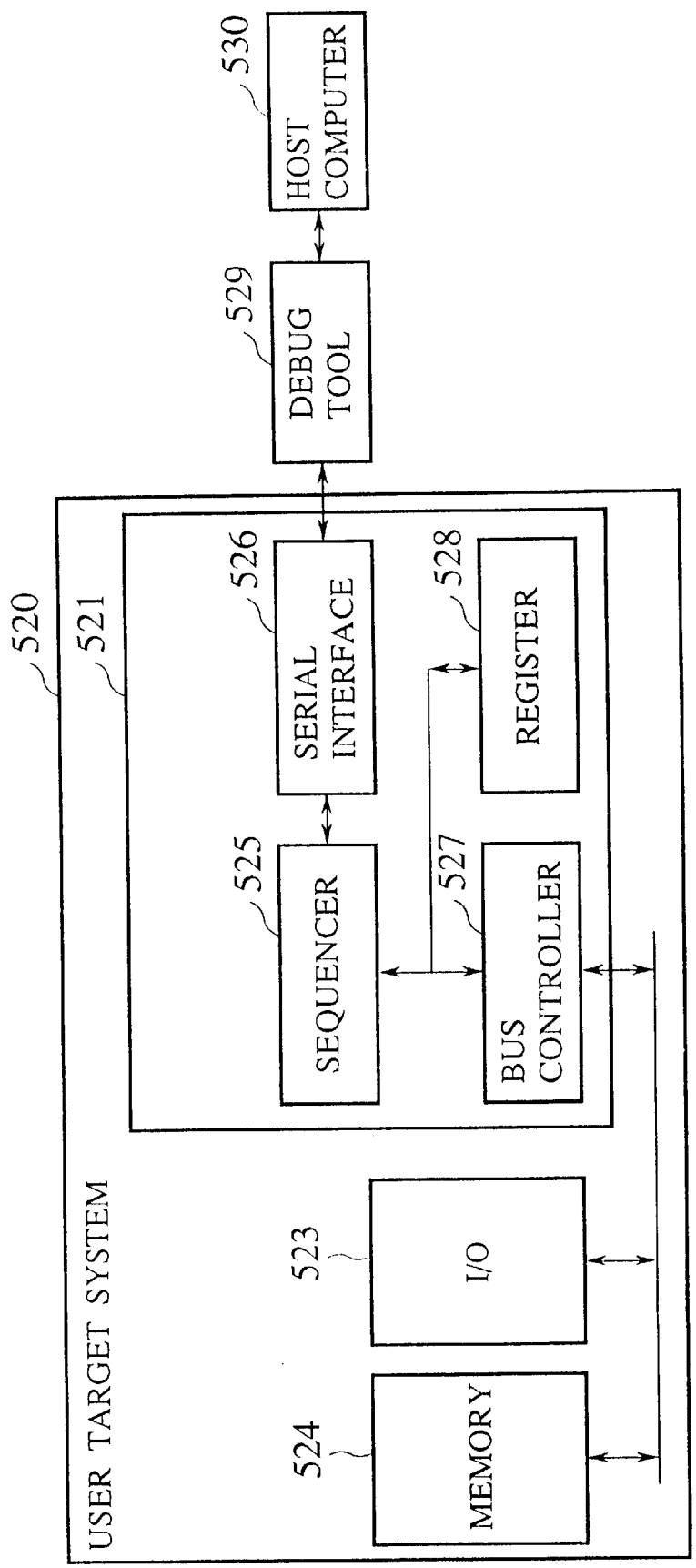
FIG. 3 shows a debug system for debugging a user target system according to still another prior art.

Compared with the prior art of FIG. 3, the present invention does not require a sequencer to be installed in a microprocessor, to thereby simplify a logic circuit for debugging. Since the present invention employs a monitor program to access registers, additional registers are accessible only by modifying the monitor program.

In summary, the present invention provides a microprocessor of a user target system with a debugging function, to reduce signals for connecting the target system with a debugger. During debugging, the present invention operates the microprocessor of the target system, to easily access memories and I/O units of the target system.

According to the present invention, control registers in the debug tool and debug module are inaccessible during the execution of a user program under a normal mode, so that the memories and registers of the debug tool will never be destroyed by the user program, to thereby improve the reliability of the system.

The present invention prohibits accessing the control registers of the debug tool and debug module even after the debug mode is started. If a write operation of the user program to the control register of the debug tool or debug module is incomplete when a debug exception to start the debug mode occurs, the write operation is prohibited by setting the bit MP of the register DCR. This prevents the memories and registers of the debug tool from being mistakenly broken by the user program, to thereby improve the reliability of the debug system.

According to the present invention, a write operation to the debug tool according to an instruction CTC0 under the debug mode is always allowed without regard to the value of the bit MP. Since the address of a monitor area is prepared separately from a memory write instruction, it is not necessary to use a general register.

Accordingly, the contents of the general register will never be broken by the write operation, and the value of the general register can be saved in the memory of the debug tool Just after the occurrence of a debug exception. In this way, the debug tool of the present invention never destroys the contents of user's general registers, to realize good transparency of the debug system.

The present invention provides a microprocessor of a user target system with a debugging function, to eliminate an interface signal for carrying a program counter trace output.

The present invention provides a microprocessor of a user target system with a debugging function and realizes a trigger function with minimum hardware.

Various modifications will become possible for those skilled in the art after receiving the teachings of the present disclosure without departing from the scope thereof.

What is claimed is:

1. A microprocessor comprising:

a processor core for executing a user program and a monitor program for debugging a user target system; and a debug module connected to said processor core through at least one of an internal debug interface and a processor bus, having interface means serving as an interface with a debug tool so that said processor core may execute the monitor program, and control means for requesting said processor core for one of an interrupt and an exception to switch said processor core from the user program to the monitor program, wherein said debug module has:

a break circuit for comparing the address of an instruction of data provided by said processor core with an preset address or data, and if they coincide with each other, sending an address break exception request to said processor core;

a processor bus break circuit connected to said processor core through the processor bus, for monitoring bus cycles in the processor bus, and if a bus cycle for preset address and data is executed, sending an exception request to said processor core;

a serial monitor bus circuit connected to said processor core through the processor bus, serving as an interface with the debug tool when said processor core executes the monitor program stored in the debug tool;

a register circuit for storing information to control the functions of said debug module, the information being accessed by said processor core;

an external interface circuit serving as an interface, serial monitor bus circuit, and processor core with the debug tool; and a clock signal generator for providing the debug tool with a clock signal that defines the transfer speed of signals transmitted between the microprocessor and the debug tool.

2. The microprocessor according to claim 1, wherein the clock signal generator supplies a clock signal whose frequency is a multiple of or a power of 2 of the frequency of a clock signal that drives said processor core.

3. A microprocessor comprising:

a processor core for executing a user program and a monitor program for debugging a user target system; and a debug module connected to said processor core through at least one of an internal debug interface and a processor bus, having interface means serving as an interface with a debug tool so that said processor core may execute the monitor program, and control means for requesting said processor core for one of an interrupt and an exception to switch said processor core from the user program to the monitor program, wherein said debug module is connected to the debug tool with dedicated signals.

4. A microprocessor comprising:

a processor core for executing a user program and a monitor program for debugging a user target system; and a debug module connected to said processor core through at least one of an internal debug interface and a processor bus, having interface means serving as an interface with a debug tool so that said processor core may execute the monitor program, and control means for requesting said processor core for one of an interrupt and an exception to switch said processor core from the user program to the monitor program, wherein said debug module is connected to the debug tool with unidirectional signals.

5. A microprocessor comprising:

a processor core for executing a user program and a monitor program for debugging a user target system; and a debug module connected to said processor core through at least one of an internal debut interface and a processor bus, having interface means serving as an interface with a debug tool so that said processor core may execute the monitor program, and control means for requesting said processor core for one of an interrupt and an exception to switch said processor core from the user program to the monitor program, wherein when said processor core accesses a specific area, said debug module sequentially transfers address and bus control signals from said processor core to the debug tool at predetermined intervals;

if the access to the specific area is a write access, said debug module sequentially transfers data signals to the debug tool at predetermined intervals; and if the access to the specific area is a read access, said debug module sequentially receives signals from the debug tool at predetermined intervals, forms a multi-bit data signal, and sends the data signal to the processor core.

6. The microprocessor according to claim 5, wherein the predetermined intervals are defined according to the output clock signal of a clock signal generator.

7. A microprocessor comprising:

a processor core for executing a user program and a monitor program for debugging a user target system; and a debug module connected to said processor core through at least one of an internal debug interface and a processor bus, having interface means serving as an interface with a debug tool so that said processor core may execute the monitor program, and control means for requesting said processor core for one of an interrupt and an exception to switch said processor core from the user program to the monitor program, wherein said debug module transfers bus interface signals from said processor core to the debug tool through a first transfer line bit by bit in series, and the debug tool transfers information to said debug module through a second transfer line bit by bit in series.

8. A microprocessor comprising:

a processor core for executing a user program and a monitor program for debugging a user target system; and a debug module connected to said processor core through at least one of an internal debug interface and a processor bus, having interface means serving as an interface with a debug tool so that said processor core may execute the monitor program, and control means for requesting said processor core for one of an interrupt and an exception to switch said processor core from the user program to the monitor program, wherein said processor core has a mode signal to be enabled when an exception or reset request for starting the monitor program is made; and said debug module allows said processor core to access the debug tool or a register circuit in said debug module only when the mode signal is enabled.

9. A microprocessor comprising:

a processor core for executing a user program and a monitor program for debugging a user target system; and a debug module connected to said processor core through at least one of an internal debug interface and a processor bus, having interface means serving as an interface with a debug tool so that said processor core may execute the monitor program, and control means for requesting said processor core for one of an interrupt and an exception to switch said processor core from the user program to the monitor program, wherein said processor core has a mode signal to be enabled when an exception or reset request for starting the monitor program is made; and said debug module has a control bit that prohibits, when enabled, said processor core from accessing the debug tool or a register circuit in said debug module even if the mode signal is enabled.

10. A microprocessor comprising:

a processor core for executing a user program and a monitor program for debugging a user target system; and a debug module connected to said processor core through at least one of an internal debug interface and a processor bus, having interface means serving as an interface with a debug tool so that said processor core may execute the monitor program, and control means for requesting said processor core for one of an interrupt and an exception to switch said processor core from the user program to the monitor program, wherein said processor core has:

a mode that is enabled when an exception or reset request for starting the monitor program is made;

a first write instruction to provide the value of a general register as a data signal and enable a first write signal; and a second write instruction to provide the value of the general register as a data signal and enable a second write signal.

11. The microprocessor according to claim 10, wherein:

said debug module has a control bit for prohibiting said processor core from accessing said debug module;

a write access to said debug module according to the first write signal is prohibited if the control bit is enabled; and a write access to said debug module according to the second write signal is enabled without regard to the control bit.

12. A microprocessor comprising:

a processor core for executing a program; and a program counter tracer connected to said processor core through an internal debug interface, for providing a program counter signal that represents an address of an instruction executed by said processor core, a number of lines that transmit the program counter signal being smaller than a number of bits of the address, wherein:
said processor core asserts an indirect jump signal when executing an indirect jump instruction and provides said program counter tracer with the target address of the indirect jump instruction; and upon receiving the asserted indirect jump signal, said program counter tracer accepts the target address, transmits the target address as the program counter signal from a lower bit thereof, and provides a program counter status signal indicating that the transmission of the target address has started.

13. A microprocessor comprising:

a processor core for executing a program; and a program counter tracer connected to said processor core through an internal debug interface, for providing a program counter signal that represents an address of an instruction executed by said processor core, a number of lines that transmit the program counter signal being smaller than a number of bits of the address, wherein:
said processor core asserts an exception signal when an exception occurs and provides said program counter tracer with the target address of the exception; and upon receiving the asserted exception signal, said program counter tracer accepts the target address, encodes the target address into information whose number of bits is smaller than that of the target address, transmits the coded information as the program counter signal, and provides a program counter status signal indicating that the transmission of the target address has started.

14. The microprocessor according to claim 12, wherein, when said processor core executes a second indirect jump instruction while said program counter tracer is transmitting the target address of a first indirect jump instruction:

said processor core asserts the indirect jump signal when executing the second indirect jump instruction and provides said program counter tracer with the target address of the second indirect jump instruction; and upon receiving the asserted indirect jump signal, said program counter tracer accepts the target address of the second indirect jump instruction, stops transmitting the target address of the first indirect jump instruction, transmits the target address of the second indirect jump instruction as the program counter signal, and provides a program counter status signal indicating that the transmission of the target address has started.

15. The microprocessor according to claim 12, wherein, when an exception occurs while said program counter tracer is transmitting the target address of an indirect jump instruction:

said processor core asserts an exception signal indicating that the exception has occurred and provides said program counter tracer with the target address of the exception; and upon receiving the asserted exception signal, said program counter tracer accepts the target address, suspends the transmission of the target address of the indirect jump instruction, encodes the target address of the exception into information whose number of bits is smaller than that of the target address, transmits the coded information as the program counter signal, provides a program counter status signal indicating that the transmission of the target address of the exception has started, and after the transmission of the coded information is complete, resumes the transmission of the target address of the indirect jump instruction.

16. A microprocessor comprising:

a processor core for executing a program; and a program counter tracer connected to said processor core through an internal debug interface, for providing a program counter signal that represents an address of an instruction executed by said processor core, a number of lines that transmit the program counter signal being smaller than a number of bits of the address, wherein:
said processor core asserts a direct jump signal when executing a direct jump instruction or a taken conditional branch instruction and provides said program counter tracer with the target address of the direct jump instruction or branch instruction;

if said program counter tracer is not transmitting the target address of an indirect jump instruction when receiving the asserted direct jump signal, said program counter tracer accepts the target address from said processor core, transmits the target address as the program counter signal from a lower bit thereof, provides a program counter status signal indicating that the transmission of the target address has started; and if said program counter tracer is transmitting the target address of an indirect jump instruction when receiving the asserted direct jump signal, said program counter tracer only provides a program counter status signal indicating that the direct jump instruction or taken conditional branch instruction has been executed.

17. A microprocessor comprising:

a processor core for executing a program; and a program counter tracer connected to said processor core through an internal debug interface, for providing a program counter signal that represents an address of an instruction executed by said processor core, a number of lines that transmit the program counter signal being smaller than a number of bits of the address, wherein:
said processor core asserts a pipeline signal when executing an instruction;

when the pipeline signal is asserted and is received by said program counter tracer, said program counter tracer provides a program counter status signal indicating that the instruction has been executed by said processor core; and when the pipeline signal is not asserted and is received by said program counter tracer, said program counter tracer provides a program counter status signal indicating that the instruction has not been executed.

18. A microprocessor comprising:

a processor core for executing a program; and a program counter tracer connected to said processor core through an internal debug interface, for providing a program counter signal that represents an address of an instruction executed by said processor core, a number of lines that transmit the program counter signal being smaller than a number of bits of the address, wherein, when said processor core executes a second indirect jump instruction while said program counter tracer is transmitting the target address of a first indirect jump instruction:

said processor core asserts an indirect jump signal when executing the second indirect jump instruction, provides said program counter tracer with the target address of the second indirect jump instruction, and if a processor core stop signal is asserted, suspends the execution of the second indirect jump instruction; and said processor counter tracer asserts the processor core stop signal when the indirect jump signal for the second indirect jump instruction is asserted, completes the transmission of the target address of the first jump instruction, accepts the target address of the second indirect jump instruction from said processor core, transmits the target address of the second indirect jump instruction as the program counter signal, and provides a program counter status signal indicating that the transmission of the target address has started.

19. A microprocessor comprising:

a processor core for executing a program; and a program counter tracer connected to said processor core through an internal debug interface, for providing a program counter signal that represents an address of an instruction executed by said processor core, a number of lines that transmit the program counter signal being smaller than a number of bits of the address, wherein, when said processor core executes a second indirect jump instruction while said program counter tracer is transmitting the target address of a first indirect jump instruction:

said processor core asserts an indirect jump signal when executing the second indirect jump instruction, provides said program counter tracer with the target address of the second indirect jump instruction, and if a processor core stop signal is asserted, suspends the execution of the second indirect jump instruction;

said program counter tracer waits for a trace mode signal indicating whether or not the transmission of the target address of the first indirect jump instruction must be completed;

when the trace mode signal indicates to complete the transmission, said program counter tracer asserts the processor core stop signal in response to the asserted indirect jump signal for the second indirect jump instruction, completes the transmission of the target address of the first indirect jump instruction, accepts the target address of the second indirect jump instruction from said processor core, transmits the target address of the second indirect jump instruction as the program counter signal, and provides a program counter status signal indicating that the transmission of the target address has started; and when the trace mode signal indicates not to complete the transmission, said program counter tracer accepts the target address of the second indirect jump instruction from said processor core in response to the asserted indirect jump signal for the second indirect jump instruction, stops the transmission of the target address of the first indirect jump instruction, transmits the target address of the second indirect jump instruction as the program counter signal, and provides a program counter status signal indicating that the transmission of the target address has started.

20. A microprocessor comprising:

a processor core for executing a program; and a program counter tracer connected to said processor core through an internal debug interface, for providing a program counter signal that represents an address of an instruction executed by said processor core, a number of lines that transmit the program counter signal being smaller than a number of bits of the address, wherein:

if an interrupt or exception is externally requested to switch said processor core from a user program to a monitor program for debugging a user target system, said processor core suspends the user program, jumps to the monitor program, and fetches instructions of the monitor program; and if said program counter tracer is transmitting the target address of a jump instruction or an exception code when said processor core jumps to the monitor program, said processor core delays the fetching of the instructions of the monitor program until said program counter tracer completes the transmission.

21. A microprocessor comprising:

a processor core for executing a program;

a break circuit for making a break request or asserting a trigger request signal to said processor core when an accessed address coincides with a set address, or when an accessed address and data coincides with a set address and data; and a program counter tracer for providing an external status signal indicating that the trigger request signal has been asserted after said break circuit asserts that same, wherein said program counter tracer encodes the internal state of said processor core and provides an external status signal indicating the encoded internal state, when said processor core is in a first internal state and when the trigger request signal is asserted, said program counter tracer provides an external status signal indicating an internal state of no trigger request without regard to the asserted trigger request signal, and when said processor core is in a second internal state and when the trigger request signal is asserted, said program counter tracer provides an external status signal indicating that the trigger request has been made.

22. The microprocessor according to claim 21, wherein the first internal state corresponds to executing a jump instruction or producing an exception, and the second internal status corresponds to sequentially executing instructions or causing a pipeline stall.

* * * * *